US012691512B2

(12) United States Patent
Hartvigsen et al.

(10) Patent No.: US 12,691,512 B2
(45) Date of Patent: Jul. 28, 2026

(54) PORTABLE AUTOMATED PANEL CUTTER

(71) Applicant: Kobots ApS, Odense S (DK)

(72) Inventors: Peter Murmann Hartvigsen, Svendborg (DK); Kristian Dalgaard, Odense C (DK); Knud Engbjerg, Odense C (DK)

(73) Assignee: Kobots ApS, Odense S (DK)

( * ) Notice: Subject to any disclaimer, the term of this patent is extended or adjusted under 35 U.S.C. 154(b) by 1144 days.

(21) Appl. No.: 17/605,603

(22) PCT Filed: May 1, 2020

(86) PCT No.: PCT/DK2020/050123
§ 371 (c)(1),
(2) Date: Oct. 22, 2021

(87) PCT Pub. No.: WO2020/221409
PCT Pub. Date: Nov. 5, 2020

(65) Prior Publication Data
US 2022/0241876 A1     Aug. 4, 2022

(30) Foreign Application Priority Data

| May 1, 2019 | (DK) | .......................... | PA 2019 70277 |
| May 1, 2019 | (DK) | .......................... | PA 2019 70278 |
| May 1, 2019 | (DK) | .......................... | PA 2019 70279 |

(51) Int. Cl.
*B23D 47/02* (2006.01)
*B23D 45/02* (2006.01)
*B23D 59/00* (2006.01)

(52) U.S. Cl.
CPC ........... *B23D 47/02* (2013.01); *B23D 45/024* (2013.01); *B23D 45/027* (2013.01);
(Continued)

(58) Field of Classification Search
CPC .... B23D 45/027; B23D 45/02; B23D 45/024; B23D 59/007; B23D 59/0064; B27B 5/07;
(Continued)

(56) References Cited

U.S. PATENT DOCUMENTS

| 3,151,642 A | 10/1964 | Olson |
| 3,565,139 A | 2/1971 | Olson |
| (Continued) | | |

FOREIGN PATENT DOCUMENTS

| CN | 107949460 | 4/2018 |
| CN | 207904519 U | 9/2018 |
| (Continued) | | |

OTHER PUBLICATIONS

CN OA dated Jun. 17, 2024 from related CN Appln. No. 202080045965.6, 10 pages.
(Continued)

*Primary Examiner* — Laura M Lee
(74) *Attorney, Agent, or Firm* — Lee & Hayes, P.C.

(57) ABSTRACT

The invention relates to a portable automated panel cutter comprising a plurality of frame profile are releasably connected to form a support frame defining an inner support area. A carriage releasably mounted to the frame comprising a tool holder carriage movable in a second direction (Y) relative to the inner support area. The carriage is movable in a first direction (X) relative to the inner support area. A tool holder releasably mounted to the tool holder carriage. A power cutter releasably mounted to the tool holder, the power cutter is movable in a third direction (Z) relative to the inner support area and in an angle (φ) around the third direction (Z). Finally, the panel cutter comprises a controller configured for receiving input data and based hereon control the position (X, Y, Z) and orientation (φ) of the power cutter.

13 Claims, 30 Drawing Sheets

(52) U.S. Cl.
CPC ............. B23D 59/007 (2013.01); *Y10S 83/94*
(2013.01); *Y10T 83/7693* (2015.04)

(58) Field of Classification Search
CPC ...... B23Q 1/621; B23Q 1/626; B23Q 9/0014;
Y10S 83/94; B26D 7/20; B26D 5/005;
B26D 5/007; Y10T 83/7697; Y10T
83/207; Y10T 83/748; Y10T 83/7693;
Y10T 83/778
USPC .................. 83/940, 941, 168, 485, 487–489
See application file for complete search history.

(56) References Cited

U.S. PATENT DOCUMENTS

| | | | | |
|---|---|---|---|---|
| 4,150,597 | A | | 4/1979 | Striebig |
| 4,253,362 | A | | 3/1981 | Olson |
| 4,802,399 | A | | 2/1989 | Olson |
| 5,131,125 | A | | 7/1992 | Coron |
| 5,238,339 | A | | 8/1993 | Beer |
| 5,582,088 | A | | 12/1996 | Harter |
| 5,697,413 | A | * | 12/1997 | Fuller ........................ B44C 1/26 |
| | | | | 144/135.2 |
| 7,779,737 | B2 | | 8/2010 | Newman, Jr. et al. |
| 7,958,641 | B1 | | 6/2011 | Ende |
| 8,309,881 | B2 | * | 11/2012 | Li ........................ B23K 26/0876 |
| | | | | 219/121.68 |
| 8,365,714 | B2 | * | 2/2013 | Gifford .................... B28D 7/04 |
| | | | | 125/14 |
| 10,058,941 | B2 | | 8/2018 | Stone |
| 10,160,079 | B2 | * | 12/2018 | Ashworth .............. B23Q 1/621 |
| 10,275,722 | B2 | * | 4/2019 | White .............. G05B 19/40937 |
| 2002/0159853 | A1 | | 10/2002 | Barclay |
| 2006/0176002 | A1 | | 8/2006 | Scholich-Tessmann |
| 2008/0295820 | A1 | * | 12/2008 | Gifford .................... B28D 7/04 |
| | | | | 125/13.01 |
| 2008/0295821 | A1 | * | 12/2008 | Gifford .................. B27B 27/08 |
| | | | | 451/41 |
| 2016/0129508 | A1 | | 5/2016 | Stone |
| 2017/0057031 | A1 | * | 3/2017 | Li ........................ F16M 11/045 |
| 2018/0050430 | A1 | | 2/2018 | Ashworth |

FOREIGN PATENT DOCUMENTS

| | | | |
|---|---|---|---|
| DE | 202010001593 | U1 | 1/2011 |
| EP | 1952957 | A1 | 8/2008 |
| EP | 2143517 | A1 | 1/2010 |
| EP | 2674244 | A1 | 12/2013 |
| JP | 07-112402 | A | 5/1995 |

OTHER PUBLICATIONS

AXYZ Agregate Circular Saw. YouTube [online][video]. Feb. 2018 [retrieved on Oct. 2021]. Retrieved from < https://www.youtube.com/watch?v=IdK78VosHm4 > (the full video), 1 page.
Danish Search Report mailed Oct. 22, 2019 in Danish Application No. PA 2019 70278, 4 pages.
Danish Search Report mailed Nov. 22, 2019 in Danish Application No. PA 2019 70279, 4 pages.
Danish Search Report mailed Nov. 28, 2019 in Danish Application No. PA 2019 70277, 4 pages.
ISEL catalogue. Linear units with spindle drive [online]. ISEL AG, Feb. 2018 [retrieved on Oct. 2021]. Retrieved from https://vdocuments.mx/with-spindle-drive-isel-prag-withspindle-drive-les-5-with-spindle-drive-.html, 46 pages.
International Search Report and Written Opinion mailed Jul. 7, 2020 in International Application No. PCT/DK2020/050123, 17 pages.
Yeti Smartbench. YouTube [online][video]. Dec. 2018 [retrieved on Oct. 2021]. Retrieved from <https://www.youtube.com/watch?v=V_DsgCxefA0 > (the full video), 1 page.
KOBOTS. KOBOTS—Board saw—AMIGO 912. YouTube [online][video]. Oct. 27, 2018 [retrieved on Nov. 25, 2019]. Retrieved from < https://www.youtube.com/watch?v=Y2WSncmz_dg > , 1 page.

\* cited by examiner

PORTABLE AUTOMATED PANEL CUTTER

CROSS REFERENCE TO RELATED APPLICATIONS

This application is a U.S. National Phase Application of International Application No. PCT/DK2020/050123, filed May 1, 2020, which claims the benefit of Danish Application No. PA 2019 70277 filed May 1, 2019, Danish Application No. PA 2019 70278 filed May 1, 2019, and Danish Application No. PA 2019 70279 filed May 1, 2019, which are all hereby incorporated by reference in their entirety.

FIELD OF THE INVENTION

The invention relates to a portable automated panel cutter to which a power cutter can be releasably mounted and a method of assembling the portable automated panel cutter. The invention further relates to a portable automatic panel cutter upright support frame and a method of assembling such frame. The invention even further relates to a panel cutter comprising automated displacement means arranged to move a power cutter holder in a three-dimensional Cartesian coordinate system.

BACKGROUND OF THE INVENTION

A majority of board cuts made by construction workers on construction sides can be made with a manual or automated panel saw. Known panels saws are typically stationary having a complex design and therefore not suitable for use in one construction site after the other i.e. not suitable for assembling and dismantle. Examples of such panels saw can be found in EP1952957 and EP2143517.

Known panel saws suitable for assembling and dismantling are typically manually or semi-automated. Examples hereof can be found in U.S. Pat. Nos. 4,802,399 and 7,779,737.

Hence prior art panel saws suffer from lack of either flexibility in place of use and/or requires manual handling to cut.

SUMMARY OF THE INVENTION

Summary of Portable Automated Panel Cutter

The present invention solves the above problem by a portable automated panel cutter comprising: a plurality of frame profile are releasably connected to form a support frame defining an inner support area. Wherein at least a first frame profile of the plurality of frame parts comprising a first carriage transmission part. A carriage comprising a second carriage motor, a tool holder carriage movably mounted to a first tool holder transmission part and a second carriage transmission part. Wherein the second carriage motor facilitates control of movement of the tool holder carriage in a second direction Y relative to the inner support area by control of the first tool holder transmission part and wherein the carriage is releasably mounted to the first frame profile via a releasably connection between the second carriage transmission part and the first carriage transmission part. A first carriage motor facilitates control of movement of the carriage in a first direction X relative to the inner support area by control of the first carriage transmission part. A tool holder comprising at least part of a second tool drive, the tool holder being releasably mounted to the tool holder carriage. A power cutter releasably mounted to the tool holder at least partly via the part of the second tool drive.

First tool displacement means facilitating control of movement of the power cutter in a third direction Z relative to the inner support area by control of at least one first tool drive. Second tool displacement means facilitating control of movement of the power cutter in an angle φ around the third direction Z by control of the second tool drive. A controller configured for receiving input data and based hereon configured for controlling the first and second carriage motors and the first and second tool displacement means and thereby the position (X, Y, Z) and orientation φ of the power cutter relative to the inner support area. Thereby controlling the position and orientation of the cutting tool of the power cutter.

A portable automated panel cutter as describe above is advantageous in that it provides an automated and easy to use panel cutter which is easy to move between and use on different (even smaller) constructions sites. Hence, by the present invention problems of using know manual panel cutters at several locations one after the other and of the fixed located large size automated panel cutters are both solved.

It is advantageous to be able to control the orientation of the power cutter in that it has the effect, that a board can be cut in various angles between two points of the board. Thereby, not only a right-angled square or rectangles can be cut, but also geometric forms such as a rhombus, triangle, pentagon, trapezium, etc.

A portable automated panel cutter as describe above is advantageous in that it has the effect, that it is easy to carry in a few bags making transportation from construction site to construction site easy.

Automated should be understood as performing the cut of a board. It does not need to include loading and unloading the panel cutter with boards to be cut/that is cut. Automated loading and unloading features can be added to panel cutter, which in this terminology would make the panel cutter of the present invention 100% automated.

The displacement means is preferably implemented as servomotors and/or stepper motor, but other types of motors could also be used.

The different transmission/drive parts can be implemented as rack and pinion, tooth belt, spindles, chains or similar principles of transferring movement from one part (in this document a motor) to another part (in this document power cutter).

The power cutter is understood as a handheld power cutter that when not mounted to the panel cutter can be operated independent from the panel cutter by a user. The power cutter is powered either from the utility grid or from a battery. Hence the power cutter preferably comprising a sawing or cutting tool and an electrical motor for rotating the cutting tool through a drive train, wherein the drive train and the electrical motor is arranged in a power saw housing independent from the rest of the panel cutter, Accordingly, the power cutter is preferably an electric handheld device having a rotating cutting tool.

The panel cutter should therefore be understood broadly i.e. in principle the panel cutter can be adapted to operate most power cutters including angle grinder, circular saw, jigsaw, power router, etc.

The frame parts and the power cutter are among elements of the panel cutter that is releasably mounted. Releasably mounted should be understood as mounted in a way that is easy to dismantle again after use of the panel cutter. The mounting and dismantle may require a tool but could also be implemented as hand operable lever arm fasteners.

The automated panel cutter is advantageous in that no measures or readings are needed on, off or from the portable automated cutter to perform cutting operations of a board to be cut. Accordingly, the portable automated cutter is less affected by dust on reading points as is the case in prior art systems using optic readings on the frame parts as well as less affected by bumps which in prior art systems could require recalibration of such optical sensor systems. This is advantageous when the system is used in construction sites where dust and bumps are expected.

According to an embodiment of the invention, the first tool displacement means is a first tool motor comprised by the tool holder and connected to the first tool drive and wherein the second tool displacement means is a second tool motor comprised by the tool holder and connected to the second tool drive, and wherein a power cutter is releasably mounted to the first and the second tool drive, wherein the first tool motor facilitates control of the first tool drive and thereby control of movement of the power cutter in the third direction Z, and wherein the second tool motor facilitates control of the second tool drive and thereby control of movement of the power cutter in the angle φ around the third direction Z.

This is advantageous in that it has the effect, that all movement of the power cutter in Z and angle φ is controlled form the tool head and therefore the mechanical construction of the rest of the panel cutter does not have to facilitate this movement.

According to an embodiment of the invention, the first tool displacement means comprises a first motor facilitating control of a first tool drive connected to one end of the carriage, and another first motor facilitating control of another first tool drive connected to a second end of the carriage, thereby the first tool displacement means facilitates control of a movement of the carriage in the third direction Z.

This is advantageous in that it has the effect, that movement in the Z direction is facilitated via the movement of the carriage i.e. no drives or motors for movement of the power cutter in the Z direction are needed in the tool holder, the weight and complexity thereof is thereby reduced.

Preferably, the first tool drives are spindles mounted to the carriage and releasably mounted to the frame profile e.g. to a bearing movable along the longitudinal axis of the frame profile. However, the first tool drives can also be mounted e.g. to movable bearings of the frame profiles and releasably mounted to the carriage.

According to an embodiment of the invention, the second tool displacement means is a second tool motor facilitating driving the second tool drive, wherein the second tool drive is implemented as a belt or chain connecting the second tool motor to the part of the second tool drive of the tool holder which is connected to the power cutter, thereby the second tool displacement means facilitates control of a movement of the power cutter in the angle φ around the third direction (Z).

According to an embodiment of the invention, the panel cutter is an upright panel cutter position in an angle θ from vertical position.

This is advantageous in that it has the effect, that the work position of the user loading and removing the panel cutter with boards is optimised for better work environment.

According to an embodiment of the invention, the angle θ is below 90 [deg.], preferably between 45 and 85 [deg.] most preferably between 55 and 80 [deg.] measure from vertical plane.

An angle of 75 [deg.] plus/minus 4 degrees has turned out to be a sufficient inclination of the support frame. At such inclination, the upright support frame does not need any fixation to stay in position even when it is in operation. Hence, in operation, the panel cutter is preferably leaning against gypsum wagon, wall or similar construction. The gypsum wagon or other wheeled constructions are preferred in that the panel cutter then becomes mobile on the construction site i.e. does not require dismantle before being moved from one room to another room. Only power supply plug would likely need to be unplugged at least if the panel cutter is not supplied by one or more batteries. Preferably, in case of an upright support frame, the second frame profile is the upper frame profile facilitating the driving of the carriage.

According to an embodiment of the invention, the panel cutter comprises a power socket to which a power plug from the power cutter can be supplied with power.

This is advantageous in that it has the effect, that the power to and from the power cutter and thereby start and stop of the power cutter can be controlled on the panel cutter by control of the power to and from the power socket.

According to an embodiment of the invention, the inner support area is at least partly covered by board support.

This is advantageous in that it has the effect, that it provides stabile support for the board to be cut. The board support may be of the same material as the board to be cut but not a requirement, however it is preferred in order to protect the cutting tool of the power cutter that the cutting tool can is designed to cut in both materials (board and board support) if they are not the same. This is because to be able to cut through the entire board also at the outer most sides and ends of the board, the cutting tool of the power cutter would need to continue cutting even though some part of the cutting tool that previously was cutting at these positions are not cutting in the board.

As with the frame profiles, the board the material of the board support can be a combination of different materials typically with one main material. Further, the board support may be a board similar to board to be cut or lamellas i.e. elongated structures that does not cover the entire inner support area.

According to an embodiment of the invention, the board support is implemented as a diagonal support. This is advantageous in that it has the effect, that the panel cutter is faster to assemble and the frame becomes more stable.

According to an embodiment of the invention, the first carriage motor and the first carriage transmission part is embedded in the first frame profile and movement of the carriage in the first direction X is facilitated by control of the first carriage transmission part.

This is advantageous in that it has the effect, that the transmission system moving the carriage in the X direction is protected from the environment.

According to an embodiment of the invention, the first carriage transmission part is a tooth belt.

According to an embodiment of the invention, the first carriage transmission part is part of the first frame profile and wherein a third carriage transmission part in the form of a rack, spindle or belt is part of the second frame profile, and wherein the carriage comprises a fourth carriage transmission part facilitating releasably mounting the carriage to the third carriage drive part and thereby to the second frame profile.

This is advantageous in that it has the effect, that the carriage when moved in the X direction, the movement is applied via the transmission parts of both the first and second frame profiles. Hence the carriage is moved perpendicular to both the first and second frame profiles.

In the situation where the movement of the carriage is only controlled from the transmission part of the first frame profile, the movement of the carriage is preferably also controlled or guided along the second frame profile to ensure stable and precise movement in the X direction of the carriage. This guidance of the carriage can be facilitated by a second carriage bearing.

According to an embodiment of the invention, the frame profiles are made of aluminium or steel.

This is advantageous in that it has the effect that the frame parts are rigid and at same time light so that they are easy to carry.

According to an embodiment of the invention, an end of a first of two adjacent frame parts comprises sticks and an end of second of the two adjacent frame part comprises a hole plate, wherein the sticks fits in the holes of the hole plate when the two adjacent frame parts are connected.

This is advantageous in that it has the effect, that it makes the support frame fast and easy to assemble. Further, it is advantageous in that the connection parts (sticks and hole plates) do not wear i.e. the precision in the frame profile connections are maintained even when the support frame has been dismantled 100 times.

According to an embodiment of the invention, at least one of the two frame parts comprises a lock facilitating a fixation of the connection of the two adjacent frame parts.

This is advantageous in that it has the effect, that when the sticks and hole plates are connected leading to a (substantially) perpendicular connection of the two adjacent frame parts, the frame parts are locked in this position preferably by a kind of clamping levers.

According to an embodiment of the invention, the first carriage transmission part is a rack and the second carriage transmission part is a pinion suitable for engaging with the rack or the first carriage transmission part is a spindle and the second carriage transmission part is an attachment to the spindle.

This is advantageous in that it has the effect, that this way of controlling movement of the carriage in the X direction can be made very robust.

According to an embodiment of the invention, the third and fourth frame profiles are identical and defines opposite sides in the second direction Y of the support frame.

This is advantageous in that it has the effect, that manufacturing of the frame profiles is cheaper in that the number of identical parts are increased.

According to an embodiment of the invention, the panel cutter comprises board fixators with which light boards can be fixed prior to cutting.

This is advantageous in that it has the effect, that light board do not move during cutting. The board fixators may be implemented as clamps located at or attachable to predetermined locations on the support frame or on the board support.

According to an embodiment of the invention, at least two opposite frame profiles of the frame profiles comprising board support fixation, supporting the board support that is at least partly covering the inner support area.

This is advantageous in that it has the effect, that the board to be cut can rest on the board support, in principle no matter how small and how light it is. Further, in the case where the board support is of a type that allows an air flow through it, it is possible to establish a suction of dust from the cutting via the board support.

According to an embodiment of the invention, the board support fixation is implemented as one or more protruding parts or one or more recesses in the panel frames.

A plurality of protruding parts is advantageous in that it has the effect, that lamellas can be mounted with a space between allowing suction of dust from the cutting from the back of the support frame.

One protruding part in the form of an elongated plane extending along at least a part of the length of the frame profile is advantageous in that a board can rest hereon thereby preventing dust from escaping backwards out of the support frame.

Alternative are recesses in one or more of the frame profiles in which the board support (lamellas, board, etc.) can be releasably power cutter.

No matter how the board support fixations are implemented, the board support can be releasably power cutter hereto. Releasably power cutter should here be understood as positioned/resting without being locked in position. Preferably gravity force and the inclination from horizontal of the support frame is enough to ensure that the board to be cut is kept in the correct position. If not, fixation is can be made.

According to an embodiment of the invention, the support frame further comprises a board guide.

The board guide and the board support are advantageous in that they have the effect, that it allows to cut a board in its entire length/width without cutting in the support frame. Cutting in the frame is not desired in that support frame is intended for dismantle and assemble over and over again. Hence, the support frame profiles are considered non-wearing parts i.e. parts are not weakened or damaged during use of the panel cutter whereas the board support and the board guide are considered wearing parts i.e. parts that are weakened or damaged during use of the panel cutter and thereby needs replacement when their support function is not sufficient.

This is advantageous in that it has the effect, that the board guide establishes a distance between the board to be cut and the second frame part, thereby allowing the cutting tool of the power cutter to cut all the way through a board without cutting in the second frame profile. Instead the cutting tool cuts in the board guide which can be made of e.g. wood that is easy to replace after a number of cuts i.e. when the board guide can no longer support the board to be cut sufficiently.

Hence, the problem of having a portable support frame for an automatic panel cutter that is easy to assemble/dismantle, transport and at the same time sufficiently rigid to maintain its form and to facilitate a precise movement of carriage despite all forces established by the weight of the carriage and the running power cutter is hereby solved.

By precise movement is understood that the lower part of the carriage is moving at least substantially with the same speed as the upper part of the carriage also in the situation where the movement of the carriage is only applied from a motor driving the upper part of the carriage.

According to an embodiment of the invention, the board guide comprises a first guide area supporting the board to be cut at least partly along the direction X and a second guide area supporting the board to be cut at least partly along the second direction Y.

This is advantageous in that it has the effect, that such board guide enables cutting the complete length and side of a board to be cut without risking the cutting tool of the power cutter is cutting in any of the frame profiles including the second and third frame profiles.

According to an embodiment of the invention, the board guide is implemented as at least two guide parts spaced from each other in the first direction X and at least one guide part in the second direction Y.

This is advantageous in that it has the effect that the total size of needed board guide is reduced and thereby the costs are reduced. Further, the total weight of the panel cutter is reduced. The board guide parts may be mounted on the board support by means of screws, clamps or the like.

According to an embodiment of the invention, at least the second frame profile includes one or more board guide steerings, positioning the board guide in a predetermined position on the board support.

This is advantageous in that it has the effect, that board guide distances the board to be cut from the frame profile and thereby makes it possible cut the entire width of the board. This is because the board guide is made of wood, gypsum or other soft materials (compared to the material of which the frame is made of) and if not this was used to space the board to be cut from the frame profile, the cutting tool of the panel cutter would cut into the frame profile, which is not desirable in that the cutting tool is most likely not designed to cut in frame material.

According to an embodiment of the invention, the part of the board guide engaging with the board is equipped with protrusions.

This is advantageous in that it has the effect, that friction is established between the board and the board support so that when cutting in the board, it is less likely, that the board will slide on the board guide and thereby change position. It should be noted, that similar protrusions can be to the board support to prevent problems of moving boards when cut. The protrusions establish friction and can be implemented as tape, pins or other tooth like forms. Alternatively, a board fixator like stop block can be positioned and fastened on the board support or frame so as to block the board to be cut from sliding in the X direction during cutting operation.

According to an embodiment of the invention, the tool holder carriage comprises carriage fastening points to which tool holder fastening points can engage thereby connecting the tool holder to the tool holder carriage.

Flange fastening points may be protruding parts matching tool holder fastening points in the form of recesses. This is advantageous in that it has the effect, that attachment of the tool holder to the tool holder carriage can simply be made by hanging the recesses of the tool holder on the tool holder carriage protruding parts and let gravity ensure secure fastening. In case gravity is not considered enough, the fastening points can be changed slightly in size to allow friction to help fastening the tool holder to the tool holder carriage.

According to an embodiment of the invention, the first tool holder drive part is a spindle to which the tool holder carriage is mechanically attached.

The spindle is advantageous in that it has the effect that, in case power is not applied to the motor driving the spindle (second carriage motor), the spindle maintains position of the tool holder carriage even when the panel cutter is in its upright position. Further, it reduces requirement to the second carriage motor in that no braking functionality is needed. The first tool holder drive part may also be implemented as e.g. a rack, toothed belt, etc.

According to an embodiment of the invention, the carriage is mechanically releasable attached to the first frame profile by a first carriage bearing and the second carriage transmission part.

This is advantageous in that it has the effect, that it is possible to dismantle the panel frame and thereby transport it e.g. in bags or suitcases. The first carriage bearing is advantageous in that it transfers most of the weight of the carriage to the frame, when the panel cutter is in its upright position. The second carriage transmission part is advantageous in that it is fixed to the carriage and therefore is able to transfer movement of the first carriage transmission part to the carriage.

According to an embodiment of the invention, the carriage is mechanically releasable attached to the second frame profile by a second carriage bearing.

This is advantageous in that it has the effect, that the part of the carriage connected to the second carriage bearing ensures that the carriage is moving substantially perpendicular to the first and second frame profiles i.e. the main function of the second carriage bearing is for carriage steering purpose. With this said, a purpose of the second carriage bearing is also to assist the first carriage bearing in handling friction less as possible the weight of the According to an embodiment of the invention, the first carriage bearing is movably mounted on the first frame profile and the second carriage bearing is movably mounted on the second frame profile.

This is advantageous in that it has the effect, that the carriage can be attached to the frame fast and easy possibly with no hand tool required. The carriage may be removably attached to first and second bearings of the first and second frame profiles by steering pins and locks. The first and second carriage bearings may be implemented as wheel bearings or similar friction reduced sliding bearings.

According to an embodiment of the invention, the tool holder comprises a first tool drive controlled by a first tool motor and a second tool drive controlled by a second tool motor. Wherein the power cutter is mechanically connectable to the first tool drive and thereby the position of the power cutter is controllable in the third direction Z, and wherein the power cutter is furthermore connectable to the second tool drive and thereby the orientation of the power cutter is controllable in an angle of rotation ($\varphi$) around the third direction Z.

This is advantageous in that it has the effect, that the position of the cutting tool of the power cutter can be controlled and thereby the depth of the cut in the board. Further, the orientation of the cutting tool of the power cutter can be controlled and thereby a cut which is not perpendicular to sides of the board can be made.

According to an embodiment of the invention, the angle of rotation $\varphi$ of the power cutter attached to the tool holder is between 0 and 270 [deg.], preferably between 0 and 180 [deg.]±2 [deg.].

This is advantageous in that it has the effect, that it widens the number of possible cuts that are available and thereby the different types of geometric forms that can be cut. It is advantages in that the more different cuts that can be made the more the panel cutter can be used and the shorter the payback time is.

According to an embodiment of the invention, the tool holder furthermore comprises a vacuum cleaner adaptor.

This is advantageous in that it has the effect, that dust from the cutting tool cutting the board can be sucked away from the tool head and thereby from the area around the panel cutter leading to an improved environment where dust is not in the air.

According to an embodiment of the invention, a cutting tool of the power cutter or the power cutter comprises a digital readable label the information of which when received by the controller is determining the speed of movement of the power cutter when the power cutter is in cutting operation.

This is advantageous in that it has the effect, that the cutting speed of the power cutter is always in compliance with a desired cutting speed of the material of the board to be cut. Hence a source of a human error is thereby eliminated.

According to an embodiment of the invention, the controller is located external to the support frame and to the carriage.

This is advantageous in that it has the effect, that weight is removed from the support frame and from the carriage. Further, in that it can be located in a suitable location away from the workspace behind the panel cutter and in that it can be encapsulated sufficiently to resist the environment at a construction site such as dust, water, cold, etc.

According to an embodiment of the invention, the controller is communicating with a user of the panel cutter via a portable user device allowing the user to input data related to the cutting of the board remote from the panel cutter.

Preferably, the portable device is a smartphone. Further, preferably the smartphone communicates with the panel cutter via an application that is able to translate voice commands into input data usable by the panel cutter to define where on a board a cut should be made. The voice command is advantageous in that it has the effect that the user do not need to write down or memorise the measurements leading to a faster and more efficient work procedure.

According to an embodiment of the invention, the controller facilitates determining a cut start position relative to a reference point of the support frame or of the inner support area based on the input data and subsequently automatically start the cutting of the board, and wherein the start position is determined so that the movement of the cutting tool of the power cutter during cutting operation starts closest to the first frame profile.

According to an embodiment of the invention, the start position is furthermore determined so that the movement of the cutting tool of the power cutter during cutting operation starts closest to the fourth frame profile.

This is advantageous in that it has the effect, that the cutting operation forces the board to be cut downward towards the board guide thereby indirectly fixing the board during the cutting operation by the force applied from the cutting tool of the power cutter. Hence, the board to be cut is not lifted out of position by the cutting tool of the power cutter and thereby away from the its position relative to the reference point According to an embodiment of the invention, the input data are measures selected from the list comprising: desired board length, desired board width, desired center of hole in board and notch in the board, wherein the input data is measured and provided to the controller by a user of the panel cutter prior to instructing the panel cutter to cut a board.

This is advantageous in that it has the effect, that the measures and start instructions are provided by the person taking the measurements and are to use the board when cut.

According to an embodiment of the invention, the input data is received by the controller from the user via input data templates.

Advantageous in that input data is received uniform and in the same order each time it is received.

According to an embodiment of the invention, the controller facilitates control of an electric connection between the portable automated panel cutter and the utility grid in response to input data received from the user.

This is advantageous in that it has the effect, that power for both the power cutter and the movement of the power cutter by the panel cutter when the power cutter is mounted in the tool holder is controlled by the controller. It should be mentioned, that the power cutter and the panel cutter may both be powered from a battery.

According to an embodiment of the invention, the input data is provided to the controller as a voice command from the user.

This is advantageous in that it has the effect, that the user does not have to use his hands to provide input data to the controller and thereby the user is able to provide to the controller the input data while these are made. Further, the user does not have to write down measurements nor does the user need to mark up a board that needs to be cut. All this together reduces time spend on the individual cut and thereby increases the efficiency of the user.

According to an embodiment of the invention, the portable automatic panel cutter comprises a button actuator arranged to mechanically engage a power button on the power cutter.

Actively engaging the power button of the power cutter with a button actuator is advantageous in that the power cutter is then only activated when it is needed. Furthermore, such a button actuator can relatively easily be provided with a return mechanism ensuring that the button actuator will automatically retract in case of a power outage. This is advantageous in that locking the power button in an always-on state can be problematic in relation to certain rules or laws.

Moreover, the invention relates to a method of assembling a portable automated panel cutter comprising the steps of: assembling four frame profiles to form a support frame defining an inner support area, wherein a first frame profile of the four frame profiles comprise a first carriage transmission part. Positioning board support at the support frame so that the board support at least partly covers the inner support frame. Attaching a carriage comprising a tool carriage and a second carriage transmission part to the support frame so that interaction of the first and second carriage transmission parts is facilitated. Attaching a tool holder to the tool carriage and attaching a power cutter to the tool holder.

This is advantageous in that the panel cutter can be assembled exactly where it is to be used i.e. even on small constructions sides. Thereby, time spend e.g. by a carpenter on cutting boards is reduced.

According to an embodiment of the invention, the support frame is positioned in an angle θ lower than 90 [deg.] with respect to a vertical plan.

This is advantageous in that handling boards i.e. those to be cut and those that are cut is more convenient for the user of the panel cutter compared to the situation, where the support frame of the panel cutter is positioned in a horizontal plan.

According to an embodiment of the invention, the carriage is furthermore releasably mounted to a movable bearing of the first frame profile.

This is advantageous in that it has the effect, that the first carriage bearing transfers most of the weight of the carriage to the frame, when the panel cutter is in its upright position.

According to an embodiment of the invention, the carriage is furthermore releasable mounted to a second frame profile by a second carriage bearing.

This is advantageous in that it has the effect, that the second carriage bearing transfers weight of the carriage to the second frame profile and that it helps to ensure that the carriage is perpendicular to the movement of the carriage in the X direction. In an embodiment, the second carriage bearing may be controlled by a motor to ensure exact same movement of the carriage along the first and the second frame profiles.

According to an exemplary embodiment of the invention, the portable automated panel cutter is collapsible. This is advantageous in that it has the effect, that the portable automated panel cutter is collapsible and thereby be folded into a small space and unfolded at the construction site without significant mounting effort from the user.

According to an exemplary embodiment of the invention, the portable automated panel cutter is at least partly collapsible. This is advantageous in that it has the effect, that the portable automated panel cutter is at least partly collapsible and thereby be at least partly folded into a small space and unfolded at least partly at the construction site without significant mounting effort from the user.

According to an exemplary embodiment of the invention, a cutting tool of the power tool is a sawblade.

Summary of Portable Automated Panel Cutter Upright Support Frame

The present invention relates to a portable automatic panel cutter upright support frame comprising four frame profiles of a first material, at least a first and a second of the four frame profiles are parallel and spaced from each other with a fixed distance, the first and second frame profiles are releasably connected to the third and fourth of the four frame profiles thereby defining an inner support area. At least two of the frame profiles comprising board support fixation, the inner support area is at least partly covered by a board support, wherein the board support is releasably mounted on the board support fixation. Wherein a first carriage transmission part is a part of the first support frame profile and together with a first carriage bearing facilitates a releasably mounting of a carriage comprising a second carriage transmission part to the first frame profile of the support frame.

This is advantageous in that it has the effect, that it is possible to dismantle the frame into frame profiles, board support and carriage and thereby easily move the support frame from one place of use to another.

Covering the inner support area at least partly is advantageous in that it provides stabile support for the board to be cut. The board support may be of the same material as the board to be cut. The board support may be a board similar to board to be cut or lamellas. Preferably, the material of the board support is different from the material of the frame. Hence the blade of the panel cutter, is designed to cut the board material but not the frame material.

I should be mentioned that when referring to a material, that material may be a combination of different materials, typically with one single material as the main component.

Board support fixation should be understood a support for the board support i.e. the board support may not necessarily be fixed to the board support fixation but may only rest heron and be positioned by friction or gravity or a combination hereof. In the same way, when the board to be cut is located on the board support, the board is also kept in position by gravity force.

The upright position is advantageous in that it has the effect, that in the upright position, the board support and board, at least partly by gravity force, is forced towards the board support fixations (backwards) and the frame (or board guide as explained below) (downwards) and thereby fixed sufficiently in a position that allows the panel cutter to cut the board without the board moves during the cutting.

The first carriage bearing is advantageous in that it has the effect, that it transfers most of the weight of the carriage to the frame, when the panel cutter is in its upright position. The first carriage bearing is preferably part of the first frame profile, but it could also be part of the second frame profile.

According to an embodiment of the invention, the first carriage transmission part facilitates releasably mounting of the second carriage transmission part, thereby facilitating a movement of the carriage in a first direction X relative to the inner support area by control of the first or second carriage transmission part.

The first direction X is parallel to the first frame profile i.e. to the longitudinal axis of the first frame profile. The second direction Y is perpendicular to the first frame profile and thereby to the first direction X. Perpendicular to both the first and second direction is the third direction Z i.e. the X, Y and Z directions forms a Cartesian coordinate system.

Preferably the movement is provided by the first transmission part and transmitted to the carriage via the second carriage transmission part. However, in embodiments, the second transmission part may be active in providing the movement via a passive first transmission part e.g. in the form of (toothed) rack.

According to an embodiment of the invention, the carriage further includes a first carriage bearing receiver facilitating a weight reducing releasably mounting of the carriage to the first carriage bearing and thereby to the first frame profile.

As indicated, this is advantageous in that most of the weight of the carriage is transferred to the support frame via the first carriage bearing and hence not via the first transmission part.

According to an embodiment of the invention, a first carriage motor and the first carriage transmission part is embedded in the first frame profile and movement of the carriage in the first direction X is facilitated by control of the first carriage motor via of the first carriage transmission part.

This is advantageous in that it has the effect, that the transmission system moving the carriage in the X direction is protected from the environment embedded in the first profile.

It should be noted, that the second frame profile may also include an embedded transmission assisting the first carriage transmission part in moving the carriage in the X direction. In addition, the second frame profile may also comprise a carriage bearing assisting the first carriage bearing in moving the carriage in the X direction.

According to an embodiment of the invention, a third carriage transmission part is part of the second frame profile, and wherein the carriage comprises a fourth carriage transmission part facilitating releasably mounting the carriage to the third carriage drive part and thereby to the second frame profile.

This is advantageous in that it has the effect, that the carriage when moved in the X direction, the movement is applied via transmission parts of both the first and second frame profiles. Hence the carriage is moved perpendicular to both the first and second frame profiles.

In the situation where the movement of the carriage is only controlled from the transmission part of the first frame profile, the movement of the carriage is preferably also controlled or at least guided along the second frame profile by the second carriage bearing to ensure stable and precise movement in the X direction of the carriage. This guidance of the carriage can be facilitated by a second carriage bearing without the third carriage transmission part is needed in the second frame profile.

According to an embodiment of the invention, the first carriage transmission part and the third carriage transmission part is a portal axis toothed belt, rack or spindle.

According to an embodiment of the invention, the carriage facilitates releasably mounting of a power cutter.

This is advantageous in that it has the effect, that when the carriage is moved so is the power cutter.

According to an embodiment of the invention, the upright support frame further comprises a board guide.

The board guide and the board support are advantageous in that they have the effect, that it allows to cut a board in its entire length/width without cutting in the support frame. Cutting in the frame is not desired in that support frame is intended for dismantle and assemble over and over again. Hence, the support frame profiles are considered non-wearing parts i.e. parts are not weakened or damaged during use of the panel cutter whereas the board support and the board guide are considered wearing parts i.e. parts that are weakened or damaged during use of the panel cutter and thereby needs replacement when their support function is not sufficient.

This is advantageous in that it has the effect, that the board guide establishes a distance between the board to be cut and the second frame part, thereby allowing the blade of the power cutter to cut all the way through a board without cutting in the second frame profile. Instead the blade cuts in the board guide which can be made of e.g. wood that is easy to replace after a number of cuts i.e. when the board guide can no longer support the board to be cut sufficiently.

Hence, the problem of having a portable support frame for an automatic panel cutter that is easy to assemble/dismantle, transport and at the same time is sufficiently rigid to maintain its form and to facilitate a precise movement of the carriage despite all forces established by the weight of the carriage and the running power cutter is hereby solved.

By precise movement is understood that the lower part of the carriage is moving at least substantially with the same speed as the upper part of the carriage also in the situation where the movement of the carriage is only applied from a motor driving the upper part of the carriage.

According to an embodiment of the invention, wherein the board guide comprise a first guide area supporting the board to be cut at least partly along the first direction X and a second guide area supporting the board to be cut at least partly along the second direction Y.

This is advantageous in that it has the effect, that such board guide enables cutting the complete length and side of a board to be cut without risking the blade of the power cutter is cutting in any of the frame profiles including the second and third frame profiles.

According to an embodiment of the invention, the board guide is implemented as at least two guide parts spaced from each other in the first direction X and at least one guide part in the second direction Y.

This is advantageous in that it has the effect that the total size of needed board guide is reduced and thereby the costs are reduced. Further, the total weight of the panel cutter is reduced. The board guide parts may be mounted on the board support by means of screws, clamps or the like.

According to an embodiment of the invention, at least the second frame profile includes one or more board guide steerings, positioning the board guide in a predetermined position on the board support.

This is advantageous in that it has the effect, that the board guide distances the board to be cut from the frame profile and thereby makes it possible cut the entire width of the board. This is because the board guide is made of wood, gypsum or other soft materials (compared to the material of which the frame is made of) and if not this was used to space the board to be cut from the frame profile, the blade of the panel cutter would cut into the frame profile, which is not desirable in that the blade is most likely not designed to cut in frame material.

According to an embodiment of the invention, upright is defined as the angle θ below 90 [deg.], preferably between 5 and 25 [deg.] most preferably between 10 and 20 [deg.] measure from vertical plane.

An angle of 15 [deg.] plus/minus 4 degrees has turned out to be a sufficient inclination of the support frame. At such inclination, the upright support frame does not need any fixation to stay in position even when it is in operation. Hence, in operation, the panel cutter is preferably leaning against gypsum wagon, wall or similar construction. The gypsum wagon or other wheeled constructions are preferred in that the panel cutter then becomes mobile on the construction site i.e. does not require dismantle before being moved from one room to another room. Only power supply plug would likely need to be unplugged at least if the panel cutter is not supplied by one or more batteries.

Preferably, in case of an upright support frame, the second frame profile is the upper frame profile facilitating the driving of the carriage.

According to an embodiment of the invention, the ends of the four frame profiles are connected so that a first and a second frame profile are parallel in the first direction X and a third and a fourth frame profile are parallel in the second direction Y, wherein the first and second directions are perpendicular.

According to an embodiment of the invention, an end of a first of two adjacent frame parts comprises sticks and an end of second of the two adjacent frame part comprises a hole plate, wherein the sticks fits in the holes of the hole plate when the two adjacent frame parts are connected.

This is advantageous in that it has the effect, that it makes the support frame fast and easy to assemble. Further, it is advantageous in that the connection parts (sticks and hole plates) do not wear i.e. the precision in the frame profile connections are maintained even when the support frame has been dismantled 100 times.

According to an embodiment of the invention, at least one of the two frame parts comprises a lock facilitating a fixation of the connection of the two adjacent frame parts.

This is advantageous in that it has the effect, that when the sticks and hole plates are connected leading to a (substantially) perpendicular connection of the two adjacent frame parts, the frame parts are locked in this position. The lock is preferably any kind of clamping levers, thumbscrew or the like.

According to an embodiment of the invention, the mechanical connection of two ends of two of the four frame profiles are steered in a predetermined position before locking the mechanical connection in the predetermined position, wherein the steering is facilitated by steering pins of one of the four frame profiles and one or more hole plates of a second of the four frame profiles.

This is advantageous in that it has the effect, that when assembling the support frame the mechanical connection of two profiles is easy, precise and done in the same way each time. Thereby an inner support area with a sufficient tolerance with respect to the thickness of the blade of the power cutter can be established every time the support frame is assembled no matter how many times the support frame is assembled.

According to an embodiment of the invention, the mechanical connection of two ends of the four frame profiles is made by one or more hinges facilitating orienting one of the two ends in an angle between 0 [deg] and 90 [deg] relative to the other end.

This is advantageous in that it has the effect, that the assembling of the frame is fast and easy in that a first part of the hinge located at an end area of a first profile is easy to mount to a second part of the hinge located at an end area of a second profile. The mounting of the two hinge parts can be easily made e.g. with the two profiles in a first position and fastened when moving the two profiles relative to each other so as to establish a 90 degrees connection between the two profiles. A third and a fourth profile can be connected also with hinges and the two times two hinge connected profiles can be mounted e.g. by steering pins and lever arms as described above. Finally, to strengthening the frame, a diagonal support preferably between the non-hinged corners for the frame can be mounted.

According to an embodiment of the invention, the board support fixation is implemented as one or more protruding parts or one or more recesses in the panel frames.

A plurality of protruding parts is advantageous in that it has the effect, that lamellas can be mounted with a space between allowing suction of dust from the cutting from the back of the support frame.

One protruding part in the form of an elongated plane extending along at least a part of the length of the frame profile is advantageous in that a board can rest hereon thereby preventing dust from escaping backwards out of the support frame.

Alternative are recesses in one or more of the frame profiles in which the board support (lamellas, board, etc.) can be releasably power cutter.

No matter how the board support fixations are implemented, the board support can be releasably power cutter hereto. Releasably power cutter should here be understood as positioned/resting without being locked in position. Preferably gravity force and the inclination from horizontal of the support frame is enough to ensure that the board to be cut is kept in the correct position. If not, fixation is can be made.

According to an embodiment of the invention, the support frame comprises board fixators with which light boards can be fixed prior to cutting.

This is advantageous in that it has the effect, that light board do not move during cutting. The board fixators may be implemented as clamps located at or attachable to predetermined locations on the support frame or on the board support.

According to an embodiment of the invention, the part of the board guide engaging with the board is equipped with protrusions.

This is advantageous in that it has the effect, that friction is established between the board and the board support so that when cutting in the board, it is less likely, that the board will slide on the board guide and thereby change position. It should be noted, that similar protrusions can be to the board support to prevent problems of moving boards when cut. The protrusions establish friction and can be implemented as tape, pins or other tooth like forms. Alternatively, a board fixator like stop block can be positioned and fastened on the board support or frame so as to block the board to be cut from sliding in the X direction during cutting operation.

According to an embodiment of the invention, the third and fourth frame profiles are identical and defines the fixed distance between the first and second frame profiles of the support frame.

This is advantageous in that it has the effect, that assembling the support frame is faster compared to assembling of frames which does not include identical frame profiles. Further, it has the effect, that production cost is reduced in the number of different parts is reduced.

The fixed distance is greater than the board to be cut which is advantageous in that it has the effect, that the carriage can move the power cutter over and area larger than the board to be cut and thereby facilitating a full so-called end cut of the board.

According to an embodiment of the invention, the weight of each of the four frame profiles is less than 16 kg.

This is advantageous in that it has the effect, that two or more of the support frame can be transported in one bag or box, the carriage in a second bag or box and the tool holder in a third bag or box. It should be mentioned, that if the weight of parts that are packed in one bag or box exceeds local law, the box can be equipped with wheels in one end and thereby the total weight of the bag or box can be increased leading to less bags or boxes needed for the parts of the panel cutter.

According to an embodiment of the invention, the frame profiles are made of a first material selected from the list comprising: aluminium and steel.

A frame made of a metal is advantageous in that it is more robust and therefore the support frame can be moved from construction site to construction side. If the profile is made of aluminium is rigid and at same time light so that they are easy to carry.

According to an embodiment of the invention, the board to be cut is made of a second material selected from the list comprising wood gypsum, plywood, chipboard, medium-density fibreboard, concrete, (precast) masonry, clinker, steel and fiber-cement board.

According to an embodiment of the invention, the length of the at least one of the first and second support frame profiles is greater than the length of the board to be cut.

This is advantageous in that it has the effect, that the carriage can move the power cutter over and area larger than the board to be cut and thereby facilitating a full so-called side cut of the board.

According to an embodiment of the invention, the size of inner support area when the support frame is assembled is less than 300 cm (length) times less than 200 cm (wide), preferably less than 250 cm (length) times less than 150 cm (wide).

This is advantageous in that it has the effect, that boards of standard board size can be placed on the board support and thereby cut by the portable automatic panel cutter.

According to an embodiment of the invention, the first carriage drive part is a portal axis toothed belt drive embedded in the first frame profile and the second carriage drive part is a pin suitable for engaging with a slide of the portal axis toothed belt drive or the first carriage transmission part is a spindle and the second carriage transmission part is a pin suitable for engaging with the spindle.

This is advantageous in that it has the effect that this way of controlling movement of the carriage in the first X direction can be made very robust and precise.

According to an embodiment of the invention, the carriage is mechanically releasable mounted to the first frame profile via the first carriage bearing and the second carriage transmission part.

This is advantageous in that it has the effect, that it is possible to dismantle the panel frame and thereby transport it e.g. in bags or suitcases. The first carriage bearing is advantageous in that it transfers most of the weight of the carriage to the frame, when the panel cutter is in its upright position. The second carriage transmission part is advantageous in that it is fixed to the carriage and therefore is able to transfer movement of the first carriage transmission part to the carriage.

According to an embodiment of the invention, the carriage is mechanically releasable mounted to the second frame profile by a second carriage bearing.

This is advantageous in that it has the effect, that the part of the carriage connected to the second carriage bearing ensures that the carriage is moving substantially perpendicular to the first and second frame profiles i.e. the main function of the second carriage bearing is for carriage steering purpose. With this said, a purpose of the second carriage bearing is also to assist the first carriage bearing in handling friction less as possible the weight of the According to an embodiment of the invention, the first carriage bearing is movably mounted on the first frame profile and the second carriage bearing is movably mounted on the second frame profile and wherein the carriage is removably mounted to the first and second bearings by steering pins and locks This is advantageous in that it has the effect, that the carriage can be attached to the frame fast and easy possibly with no hand tool required.

According to an embodiment of the invention, the panel cutter comprises a power socket to which a power plug from the power cutter can be supplied with power.

This is advantageous in that it has the effect, that the power to and from the power cutter and thereby start and stop of the power cutter can be controlled on the panel cutter by control of the power to and from the power socket.

Moreover, the invention relates to a method of assembling a portable automatic panel cutter upright support frame, the method comprising the steps of: assembling the four frame profiles to form a support frame defining an inner support area, wherein a first frame profile of the four frame profiles comprises a first carriage transmission part and a first carriage bearing. Positioning board support at board support fixations of at least two of the four frame profiles defining the support frame so that the board support at least partly covers the inner support area. attaching a second carriage transmission part of the carriage to the first transmission part so that interaction of the first and second carriage transmission parts is facilitated, and a first carriage bearing receiver to the first carriage bearing.

This is advantageous in that it has the effect, that the support frame and the entire panel cutter can be transported in bags from one place of use to another. Thereby the flexibility in use of the panel cutter is increased. It should be mentioned, that an unpacking step including unpacking the four frame profiles and a carriage may also be included if the frame profiles and carriage is transported in a bag, vehicle etc.

According to an embodiment of the invention, the method further comprises the step of positioning the support frame in an angle θ lower than 90 [deg.] with respect to a vertical plan.

Preferably when supported against a support, the support frame is inclined in an angle between 10 and 20 [deg.] which is advantageous in that it has the effect, that handling boards to be cut is easy.

According to an embodiment of the invention, the positioning of the support frame in an upright position is done by leaning the support frame against a support.

According to an embodiment of the invention, the method further includes the step of positioning a board to be cut on the board support.

According to an embodiment of the invention, the support is selected from the list comprising: gypsum wagon, plate trolley, wheeled support and non-wheeled support.

According to an embodiment of the invention, the method further comprises the steps of unpacking a tool holder and a power cutter, wherein the tool holder is subsequently releasably mounted to the tool carriage, and wherein the power cutter is subsequently releasably mounted to the tool holder.

This is advantageous in that it has the effect, that when unpacked and mounted, a complete panel cutter is assembled. Last step is to power up the panel cutter if it is not supplied with power from one or more batteries.

According to an exemplary embodiment of the invention, the portable automated panel cutter upright support frame is collapsible. This is advantageous in that it has the effect, that the portable automated panel cutter upright support frame is collapsible and thereby be folded into a small space and unfolded at the construction site without significant mounting effort from the user.

According to an exemplary embodiment of the invention, the portable automated panel cutter upright support frame is at least partly collapsible. This is advantageous in that it has the effect, that the portable automated panel cutter upright support frame is at least partly collapsible and thereby be at least partly folded into a small space and unfolded at least partly at the construction site without significant mounting effort from the user.

According to an exemplary embodiment of the invention, a cutting tool of the power cutter is a sawblade.

Summary of a Portable Automatic Panel Cutter, a Method for Operating a Portable Automatic Panel Cutter and Use Thereof The invention provides for a portable automated panel cutter comprising a power cutter holder and automated displacement means arranged to move the power cutter holder in a three-dimensional cartesian coordinate system and to rotate the power cutter holder around a holder rotation axis parallel to an axis of the three-dimensional cartesian coordinate system. The portable automated panel cutter also comprises an independent power cutter comprising a cutter tool and an electrical cutter motor for driving the cutter tool through a drive train, wherein the drive train and the electrical motor is arranged in a power cutter housing. Furthermore, the portable automated panel cutter comprises an adaptor for releasably connecting the independent power cutter to the power cutter holder.

There are two major advantages of releasably connecting an independent power cutter to the power cutter holder by means of an adaptor. First of all the power cutter can easily be disconnected making the panel saw lighter and thereby easier to move around between job sites. Secondly and most importantly releasably connecting an independent power cutter to the power cutter holder by means of an adaptor enables that standard off-the-shelf power tools may be used in the portable automated panel cutter which means that the panel cutter no longer is categorised as "Dangerous machinery" and the authorisation procedure for such a portable automated panel cutter is much simpler and inexpensive. Standard power cutters are already safety approved whereby no further clearances or documentation is necessary which shortens the time-to-market period for the portable automated panel cutter. Furthermore, independent power cutters are readily available at a building site or in hardware stores and the power cutter can therefore easily be replaced in dependency of the specific job or in case of repair or breakdown.

Even further, a portable automated panel cutter is advantageous in that it can easily be moved between building sites and it may cut panel automatically without being manned during the cutting process.

Additionally, a rotating or reciprocating cutting blade can only cut in one direction and it is therefore advantageous that the power cutter holder is arranged to rotate around a holder rotation axis to enable that the power cutter may cut through the panel in different directions and that more complex cuts may be performed by the portable automated panel cutter.

In this context the term "panel cutter" should be understood as a machine for cutting panels such as plates, boards, sheets or the like into predetermined dimensions and/or pieces.

In this context, the term "independent power cutter" should be understood as any kind of off-the-shelf power tool capable of cutting such as any kind of angle grinder, circular saw, jigsaw, multi-cutter or other type of handheld cutting device which combines a drive train, power source and cutting blade into a single device.

In this context, the term "adaptor" should be understood as any kind of connecting device capable of releasably connecting a standard power tool to power cutter holder i.e. a device adapted to form bridge between the power cutter and the power cutter holder. Such an adaptor includes any form of rack, gripper, bracing, support, bracket, fitting or other type of structural element/mechanism for releasably connecting the power cutter to the power cutter holder. The adaptor could be designed such that it may connect different types of power cutters to the power cutter holder or different adaptors could be used for different power tools. Also, the adaptor should preferably connect the power cutter to the power cutter holder such that any forces and bending moments are transferred from the power cutter to the power cutter holder via the adaptor. The forces and bending moments may then be absorbed by a frame which supports the automated panel cutter.

In this context, the term "automated displacement means" should be understood as rack and pinion mechanism, gear mechanism, pulley system, actuators, belt drive/system, electro motors or other type of automated displacer for automatically moving the power cutter holder in a three-dimensional cartesian space.

In an aspect of the invention, the portable automated panel cutter comprises a controller arranged to control the operation of the automated displacement means in response to input from an operator.

It is advantageous to provide the portable automatic panel cuter with a controller which controls the operation in response to inputs from an operator in that the operator is able to perform other tasks while the controller controls the portable automatic panel cutter to manufacture e.g. a panel with a specific dimension or shape.

In an aspect of the invention, the portable automated panel cutter further comprises a support area arranged to support a panel during cutting of the panel.

It is advantageous to provide the portable automatic panel cutter with a support area for supporting a panel during cutting in that the cutting process may be performed more precise and stable.

In an aspect of the invention, the three-dimensional cartesian coordinate system comprises a X-direction and a Y-direction both being substantially parallel with the support area and a Z-direction being substantially perpendicular to the support area.

It is advantageous to provide an X-direction and a Y-direction of the cartesian coordinate system parallel with the support area and a Z-direction substantially perpendicular to it in that the XY plane is thereby substantially parallel with the support area whereby it is easier to determine at which point in space the cutting tool is cutting the panel. More specifically, the cut out of e.g. a rectangular panel could be performed at a constant Z-value and therefore triangulation is not necessary to calculate the position of the cutting tool in relation to the panel as would be necessary if the XY-plane was for example tilted in relation to the support area. Furthermore, it is not necessary to adjust the Z-position while cutting since this is, as mentioned, performed at a constant Z-value.

In an aspect of the invention, the controller comprises means for operating the automated displacement means in the X-direction and the Y-direction simultaneously.

It is advantageous if the controller comprises means for operating the automated displacement means in both the X- and Y-direction simultaneously in that more complex cutting patterns may be performed, e.g. a diagonal cutting of a rectangular panel.

In an aspect of the invention, the automated displacement means comprises X-direction drive means for driving the power cutter holder in a X-direction of the three-dimensional cartesian coordinate system, Y-direction drive means for driving the power cutter holder in a Y-direction of said three-dimensional cartesian coordinate system, Z-direction drive means for driving the power cutter holder in a Z-direction of the three-dimensional cartesian coordinate system and rotation means for rotating the power cutter holder around the holder rotation axis.

It is advantageous to provide drive means for X-, Y- and Z-direction movement of the power cutter holder and rotation means for rotating the power cutter holder around the holder rotation axis in that each movement is decoupled from the other whereby a variety of cutting patterns may be performed.

In an aspect of the invention, the holder rotation axis is parallel with the Z-direction.

It is advantageous if the holder rotation axis is parallel with the Z-direction in that the power cutter may be rotated around the Z-direction such that for example a curved cutting path may be obtained. Furthermore, providing the holder rotation axis parallel with the Z-direction means that the cutting plane is parallel to the XY-plane. Thus, the cutting path may be determined from X- and Y-coordinates which makes the it easier to control the point of cutting.

In an aspect of the invention, the X-direction drive means, the Y-direction drive means, the Z-direction drive means and/or the rotation means comprises an electric motor.

It is advantageous if the X-, Y-, Z-direction and/or the rotation means each comprises an electric motor in that an automated control of the respective movements may be more easily be achieved.

In an aspect of the invention, the independent power cutter is a stand-alone power cutter designed to be operated by hand.

It is advantageous to use a stand-alone power cutter in that it is an already developed fit-for-purpose tool comprising its own safety features, approvals and other. Furthermore, it is advantageous in that the user may easily switch between different power cutters depending on the task or replace the power cutter in case of repair or breakdown.

In an aspect of the invention, the independent power cutter comprises rotating drive shaft for rotating a circular cutting blade.

It is advantageous to provide the power cutter with a rotating drive shaft in that the circulating cutting blade cuts the workpiece by cutting chips or flakes which are then directed away from the cutting blade (and cutting area) due to the tangential velocity whereby the power cutter does not get stuck due to accumulated dust, chips and flakes.

In an aspect of the invention, the circular cutting blade is at least partly encircled by a shield.

It is advantageous to provide the circular cutting blade with a partly enclosing shield in that the surroundings and the panel cutter parts are protected from chips or flakes from the cutting process.

In an aspect of the invention, the portable automated panel cutter comprises an extraction device connected to the shield.

It is advantageous to provide the portable automated panel cutter with an extraction device connected to the shield in that chips or flakes from the cutting process are received therein and directed away whereby the panel cutter does not get stuck due to accumulated dust and chips.

It should be emphasized that the term "extraction device" is to be understood as an exhaust hose, vacuum cleaner, blower, fan or other type of device for directing the chips, flakes or dust from the cutting process away from the cutting area.

In an aspect of the invention, the circular cutting blade is a saw blade.

It is advantageous if the circular cutting blade is a saw blade in that such a saw blade is suitable for sawing panels made of hard materials such as wood, metal, stone, ceramic or other.

In an aspect of the invention, the independent power cutter comprises means for reciprocating a cutting blade.

It is advantageous if the independent power cutter comprises means for reciprocating a cutting blade in that e.g. a power cutter in the form of a conventional jigsaw may be used for cutting the panels. And using a reciprocating cutting blade for cutting the panels is advantageous in that tighter curves and more complex shapes may be cut out.

In an aspect of the invention, the portable automated panel cutter comprises an alignment tool arranged to align the cutter tool with the holder rotation axis.

It is advantageous to provide the portable automatic panel cutter with an alignment tool in that it hereby is possible to align the actual cutting position of the power cutter with the theoretical cutting position of the automated panel cutter to ensure a more precise cutting process.

In this context, the term "alignment tool" should be understood as an alignment plate, receiving hole, guide track or other type of tool for aligning or calibrating the cutter tool such that it is in alignment with the holder rotation axis at a specific distance from the support area. The alignment tool could be mounted temporary for the purpose of aligning the power cutter and the cutter tool with the holder rotation axis or it could be fixed to the power cutter, to the power cutter holder, or another location on the panel cutter.

In an aspect of the invention, the alignment tool is releasably connected to the power cutter holder.

It is advantageous if the alignment tool is releasably connected to the power cutter holder in that the alignment tool may be removed such that it does not interfere with the cutting tool or take up space.

In an aspect of the invention, the cutter tool comprises a cutter tool fixator arranged to fixate the cutter tool to the power cutter. The alignment tool comprises fixation means for being temporarily fixated to the cutter tool fixator during the alignment.

Forming the alignment tool as a device temporarily connected to the tool fixator—i.e. the tool holder—of the power cutter is advantageous in that it enables simple and efficient fixation of the alignment tool during the alignment process. And when the alignment is done the alignment tool can easily be removed and replaced by the cutter tool so that the cutter tool is aligned more precisely.

In an aspect of the invention, the portable automated panel cutter comprises a power socket. Power to the power socket is controlled by a power controller arranged to control the operation of the automated displacement means.

It is advantageous if the portable automatic panel cutter comprises a power socket in that the power cutter may be provided with power by plugging it directly to the power socket of the panel cutter, thus enabling that a completely standard off-the-shelf power tool may be powered by the panel cutter without modifications and when the power cutter is not mounted in the panel cutter it may thus be used as a normal power tool. Also, it is advantageous if the power to the power socket is controlled by a controller in that e.g. power could be supplied only when the panel cutter must operate whereby the panel cutter is more efficient.

In an aspect of the invention, the independent power cutter is provided with a power plug through which power is supplied to the power cutter.

It is advantageous if the independent power cutter is provided with a power plug through which power is supplied to it in that it enables that the supply of power to the power cutter can be controlled externally—e.g. by controlling the power to the socket to which the plug is connected—hereby enabling that a standard power tool may be used in an automated panel cutter. Furthermore, this enables that more standard off-the-shelf power cutter may be used.

In an aspect of the invention, the independent power cutter is an angle grinder, or a circular saw designed to be operated by hand.

It is advantageous if the power cutter is an angle grinder or a circular saw designed to be operated by hand in that such an independent power cutter is designed and a fit-for-purpose tool for cutting through a variety of materials. Furthermore, such cutters are designed for cutting panels and are therefore particularly suited for use in an automated panel cutter.

In an aspect of the invention, the drive train comprises at least a drive shaft and a gearbox.

It is advantageous if the drive train comprises at least a drive shaft and a gearbox in that the driveshaft may transmit the force generated at the power source to a cutting tool and the gearbox may reduce/increase the torsion or rotational speed via a specific gear ratio.

In an aspect of the invention, the portable automated panel cutter comprises a number of feet arranged to support the portable automated panel cutter against the underlying ground during normal use of the portable automated panel cutter. A contact surface of the feet forms a contact plane and the support area is arranged in an angle between 20 and 90, preferably between 45 and 86, and most preferred between 65 and 82 degrees in relation to the contact plane.

If the support area is closer to being vertical (during normal use of the automated panel saw) the panel may tip over and fall out of the support area and if the support area is closer to being horizontal (during normal use of the automated panel saw), the panel cutter takes more space and the panels may be harder to access and lift away because the operator must seize the panels in an awkward position. Thus, the above-mentioned ranges present an advantageous relationship between space consumption and being user-friendly.

It is advantageous to provide the portable automated panel cutter with a number of feet in that the weight of the panel cutter is more well-distributed and more stable.

In an aspect of the invention, the portable automated panel cutter is releasably assembled by several individual panel cutter parts, and wherein each of the individual panel cutter parts can be carried by hand.

It is advantageous if the portable automated panel cutter is releasably assembled by several panel cutter components in that it may be dis-assembled and re-assembled at different sites or positions which provides for more flexibility. Furthermore, it is advantageous if the individual components may be carried by hand in that no machinery (which there may not be available space for) is necessary in order to move the components to a different place for erecting the portable automated panel cutter there.

It should be emphasized that "carried by hand" is to be understood such that the individual parts have a weight which allow an operator to repeatably lift, move and lower the components without being subjected to too much exhaust or physical fatigue. I.e. each of panel cutter parts does not weigh more than 50 kg, preferably not more that 40 kg, and most preferred not more than 30 kg.

In an aspect of the invention, the power cutter comprises a power button and the power button is locked in an on state.

Since the standard power cutter comprises a power button and means to lock it in an on state anyway it is advantageous to lock it in on state in that the operating state of the power cutter may be controlled by control of the power supply itself whereby no complex actuating or start up mechanism for operating the power button is necessary.

In an aspect of the invention, the adaptor comprises adjustment means for adjusting a position of the independent power cutter in relation to the power cutter holder.

This is advantageous in that it is easier to adjust the point of cutting by locally adjusting the power cutter in relation to the power cutter holder instead of e.g. moving the panel to be cut or the entire power cutter holder.

In this context, the term "adjustment means" should be understood as an adjustment screw, small insertion plates, displaceable arms, spindle or other type of adjuster for adjusting the position of the power cutter relative to the power cutter holder.

In an aspect of the invention, the adaptor is arranged for being connected to the power cutter housing.

It is advantageous to connect the adapter to the power cutter housing in that the housing provides for a relatively stiff connection point for transferring forces and moments. Furthermore, this enables the use of independent power cutters which is advantageous in that fit-for-purpose power cutters may be connected to the adapter.

In an aspect of the invention, the adaptor comprises friction means for releasably connecting the independent power cutter to the power cutter holder by means of friction.

It is advantageous if the adaptor comprises friction means for releasably connecting the power cutter to the power cutter receiver by means of friction in that no subsequent tightening, or fastening with bolts, screws, clamps or other type of fixator is needed to secure the power cutter in that it is held in place by friction forces. Furthermore, friction means enable that power tools without fixation holes or the like can be firmly held.

In this context the term "friction means" should be understood as a wedge mechanism, grippers, flexible rubber holders or other kind of friction device for releasably connecting the power cutter to the power cutter holder.

In an aspect of the invention, the adaptor comprises screws or bolts for engaging one or more threaded holes in the independent power cutter.

Power cutters usually comprise some sort of hand grip for allowing the user to have a firm hand grip on the power cutter. Such a hand grip may be connected to the power cutter housing via e.g. a threaded hole and is therefore releasably connected. Or the power tool comprises guides, shields or other bolted to the power cutter housing by means of screws or bolts and if these have to be removed available threaded holes are presented. It is therefore advantageous if the adaptor comprises screws or bolts for engaging one or more threaded holes in that these are readily present in the housing and no further modification of the power cutter is therefore necessary.

In an aspect of the invention, the adaptor is adaptable to different embodiments of the independent power cutter.

It is advantageous if the adaptor is adaptable to different embodiments of the independent power cutter in that power cutters developed by different manufacturers may be used.

In an aspect of the invention, the adaptor is releasably connected to the power cutter holder.

Releasably connecting the adapter to the power cutter holder is advantageous in that the adapter may be removed for replacement, repair, calibration or other.

In an aspect of the invention, the portable automatic panel cutter comprises a button actuator arranged to mechanically engage a power button on the power cutter.

Actively engaging the power button of the power cutter with a button actuator is advantageous in that the power cutter is then only activated when it is needed. Furthermore, such a button actuator can relatively easily be provided with a return mechanism ensuring that the button actuator will automatically retract in case of a power outage. This is advantageous in that locking the power button in an always-on state can be problematic in relation to certain rules or laws.

Furthermore, the invention provides for a method for operating a portable automatic panel cutter. The method comprising the steps of:

releasably connecting an independent power cutter to a power cutter holder of the portable automatic panel cutter by means of an adaptor, placing a panel in the portable automatic panel cutter, providing cutting instructions from an operator to a controller of the portable automatic panel cutter, and cutting the panel into two or more panel parts by means of a controller controlling automatic displacement of the power cutter holder in a three-dimensional cartesian coordinate system and rotating the power cutter holder around a holder rotation axis parallel to an axis of the three-dimensional cartesian coordinate system.

It is advantageous to provide for a method for operating a portable automatic panel cutter according to the above-mentioned method in that the process of cutting a panel is more automated whereby the cutting process is more precise, and the personnel may perform other tasks while the panel cutter is operating. The adapter of the panel cutter provides an operator with the possibility of using already developed off-the-shelf tools whereby the panel cutter is flexible as regards the range of tasks and also cheaper in that the operator may use his own already purchased hand-held power tools.

Furthermore, the method provides for a safer cutting process in that the operator does not have to manually operate the machine. The operator may actually not even be at the vicinity of the panel cutter in that he could provide instructions while performing different tasks.

In an aspect of the invention, the method comprises the step of plugging a power plug of the power cutter into a power socket of the portable automatic panel cutter. The power socket provides power to drive the power cutter, and wherein power to the power socket is controlled by the controller.

This is advantageous in that a ready-for-use power tool may be mounted on the automatic panel cutter and plugged into the power source of the panel cutter whereby no modifications of the power tool electrical system are needed.

Furthermore, it is advantageous to provide the step of plugging a power plug of the cutter to a power socket of the panel cutter in that the panel cutter is provided with sufficient amount of power and that it may be controlled through control of the power to the power socket.

In an aspect of the invention, the power cutter comprises a cutter tool and an electrical cutter motor for driving the cutter tool through a drive train, and wherein the drive train and the electrical cutter motor is arranged in a power cutter housing.

This is advantageous in that the operator may provide the panel cutter with a readily-assembled power cutter comprising the necessary drive train and electrical motor.

In an aspect of the invention, the method comprises the step of aligning the cutter tool with the holder rotation axis during the connecting of the independent power cutter to the power cutter holder.

It is advantageous to align the cutter tool with the holder rotation axis in that a more precise and controlled cutting process is achieved. Furthermore, the calibration of the rotation axis is performed simultaneously with the mounting, which is more time efficient.

In an aspect of the invention, the alignment comprises adjusting a position of the independent power cutter in relation to the power cutter holder by means of adjustment means of the adaptor.

It is advantageous to adjust the power cutter in relation to the holder by means of adjustment means in that the operator on that aligning the power cutter locally—as opposed to e.g. re-aligning the axis or the entire coordinate system—provides for a simpler and more efficient alignment procedure.

The adjustment means may be used for aligning the actual cutting point to the theoretical cutting point of the panel cutter i.e. in relation to the origo point the cartesian coordinate system. The origo point is the point with coordinates (0,0,0) in the three-dimensional cartesian coordinate system—which in this case could be e.g. a lower left or right corner of the panel to be cut i.e. the inner corner of a guide or a fence ensuring that the lower left or right corner of the panel is always placed in the same location in the panel cutter. However, it should be emphasized that this origo point is not necessarily fixed in space. The origo point could merely serve as a reference point for the control algorithms and therefore may be moved depending on cutting task. For example, it could be displaced and/or a local origo could be formed in accordance with the specific use and cutting job.

In an aspect of the invention, the alignment comprises the steps of removing the cutter tool from a cutter tool fixator of the power cutter and fixating an alignment tool in the cutter tool fixator during the alignment.

This is advantageous in that the mounting plane or planes of the cutter tool—to which the cutter tool is connected during normal use—provides a well-defined reference point for an alignment tool—which furthermore by nature is provided with efficient fixation means (i.e. the means normally fixating the cutter tool to the power cutter). Thus, even if it is a bit laborious to disengage the cutting tool, mount the alignment tool, preform the alignment, disengage the alignment tool and reattach the cutter tool this procedure is advantageous in that the alignment tool may better represent the cutter tool such that the cutting point of the cutter tool is more precisely calibrated.

In an aspect of the invention, the method comprises the step of selecting a specific power cutter from a range of power cutters in accordance with specific cutting parameters.

Depending on the task and the material to be cut, different power cutters may be used. For example, gypsum panels may require one type of power cutters while wood panels may require another type of power cutters. Also, a specific type of power cutter may be more suitable for cutting a panel with a specific shape. It is therefore advantageous to select a specific power cutter in accordance with specific cutting parameters in that the power cutter suits the cutting task.

In this context, the term "cutting parameters" should be understood as panel thickness, panel material, targeted shape or other kind of parameters linked to the cutting task.

In an aspect of the invention, the specific cutting parameters comprises panel material and panel thickness.

It is advantageous if the cutting parameters comprise panel material and panel thickness in that a corresponding power cutter may be selected to accommodate the panel material and panel thickness, e.g. a power cutter with a certain blade size for accommodating the panel thickness and with a certain hardness for accommodating the panel material.

In an aspect of the invention, the method comprises the step of selecting an adaptor from a range of different adaptors in accordance with the selected power cutter.

It is advantageous to select an adaptor from a range of adaptors in accordance with the selected power cutter in that the operator may easily adapt the panel cutter to different kind of power cutters via the selected adaptor whereby the operator is provided with a range of cutting options.

In an aspect of the invention, the method comprises the step of adapting the adaptor to the selected power cutter.

This is advantageous in that a readily available power cutter may be used without further modification of the power cutter. Furthermore, adapting the adaptor to the power cutter is advantageous in that a more precise cutting may be achieved.

In an aspect of the invention, the method comprises the step of locking a power button of the power cutter in an on state.

This is advantageous in that the operation of the power cutter at all times can be controlled simply by controlling the power supply to the power cutter, thus avoiding having to modify the power cutter.

In an aspect of the invention, the method comprises the step of releasably assembling several individual panel cutter parts on-site to form the portable automatic panel cutter.

This is advantageous in that the operator may disassemble the panel cutter, move to a different position (e.g. construction site, factory, mill or other position) and re-assemble the panel cutter which provides for more flexibility.

In an aspect of the invention, each of the individual panel cutter parts are carried on-site by hand.

It is advantageous if the individual panel cutter parts are carried on-site by hand in that the panel cutter is portable by hand whereby no expensive machinery is needed to move it around to different positions.

In an aspect of the invention, the method for operating a portable automatic panel cutter is performed on a portable automatic panel cutter according to any of the previously described portable automatic panel cutters.

Using the previously described portable automatic panel cutters for carrying out the previously described method is advantageous in that it provides for a more efficient cutting process.

In an aspect of the invention, a portable automated panel cutter according to any of the previously described portable automatic panel cutters is used for cutting panels on a building, repair or restauration site.

It is particularly advantageous to use a portable automated panel cutter according to the present invention at a building, repair or restauration site because only small batches of the same type of panels are cut at each site making a standard CNC panel cutter too uneconomic an impractical and making a manual panel cutter too labour demanding and inflexible.

According to an exemplary embodiment of the invention, the portable automated panel cutter is collapsible. This is advantageous in that it has the effect, that the portable automated panel cutter is collapsible and thereby be folded into a small space and unfolded at the construction site without significant mounting effort from the user.

According to an exemplary embodiment of the invention, the portable automated panel cutter is at least partly collapsible. This is advantageous in that it has the effect, that the portable automated panel cutter is at least partly collapsible and thereby be at least partly folded into a small space and unfolded at least partly at the construction site without significant mounting effort from the user.

According to an exemplary embodiment of the invention, a cutting tool of the power tool is a sawblade.

THE DRAWINGS

For a more complete understanding of this disclosure, reference is now made to the following brief description of various combinable embodiments of the invention, taken in connection with the accompanying drawings and detailed description, wherein like reference numerals represent like parts:

Figure 6A:
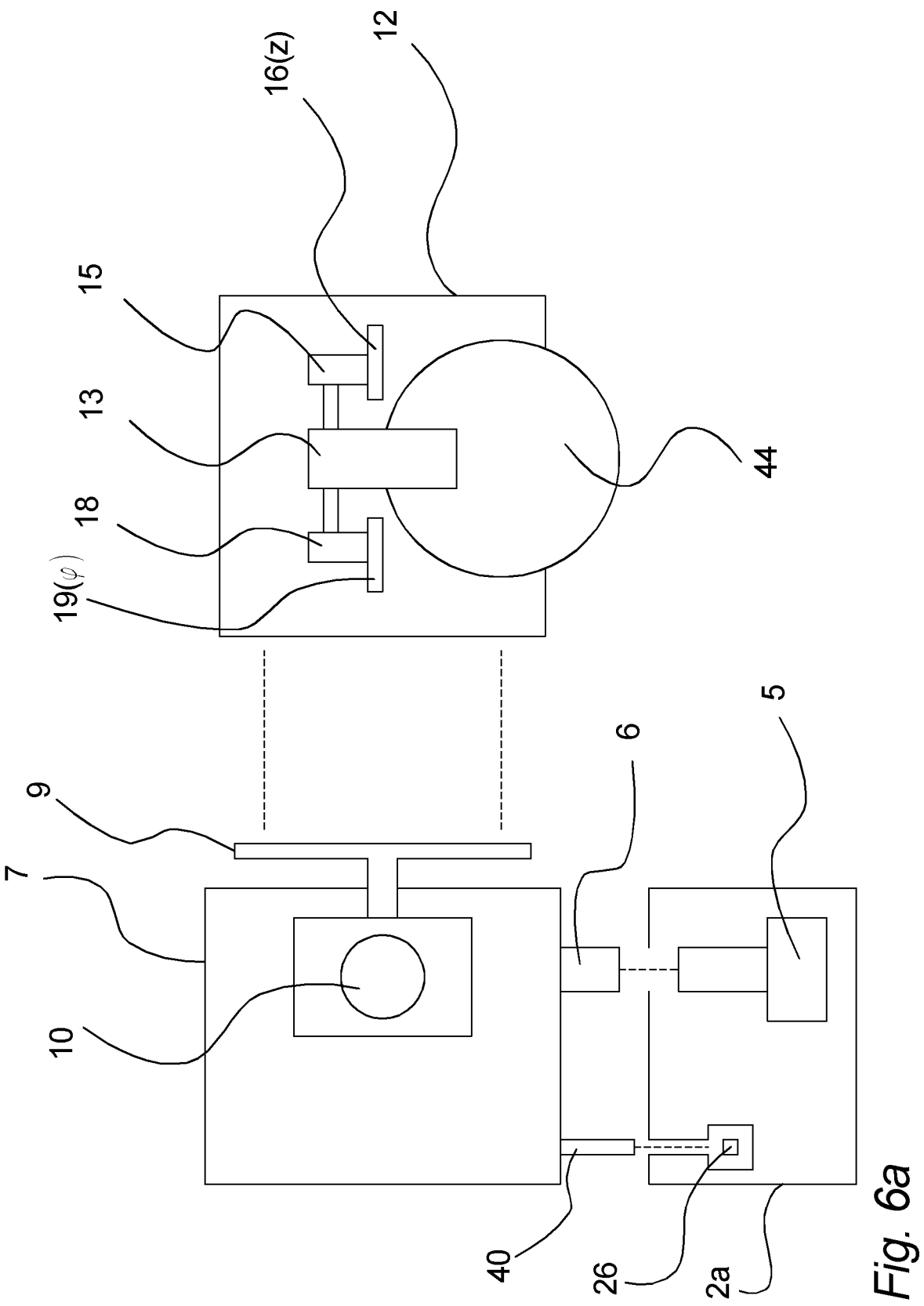
Figure 6B:
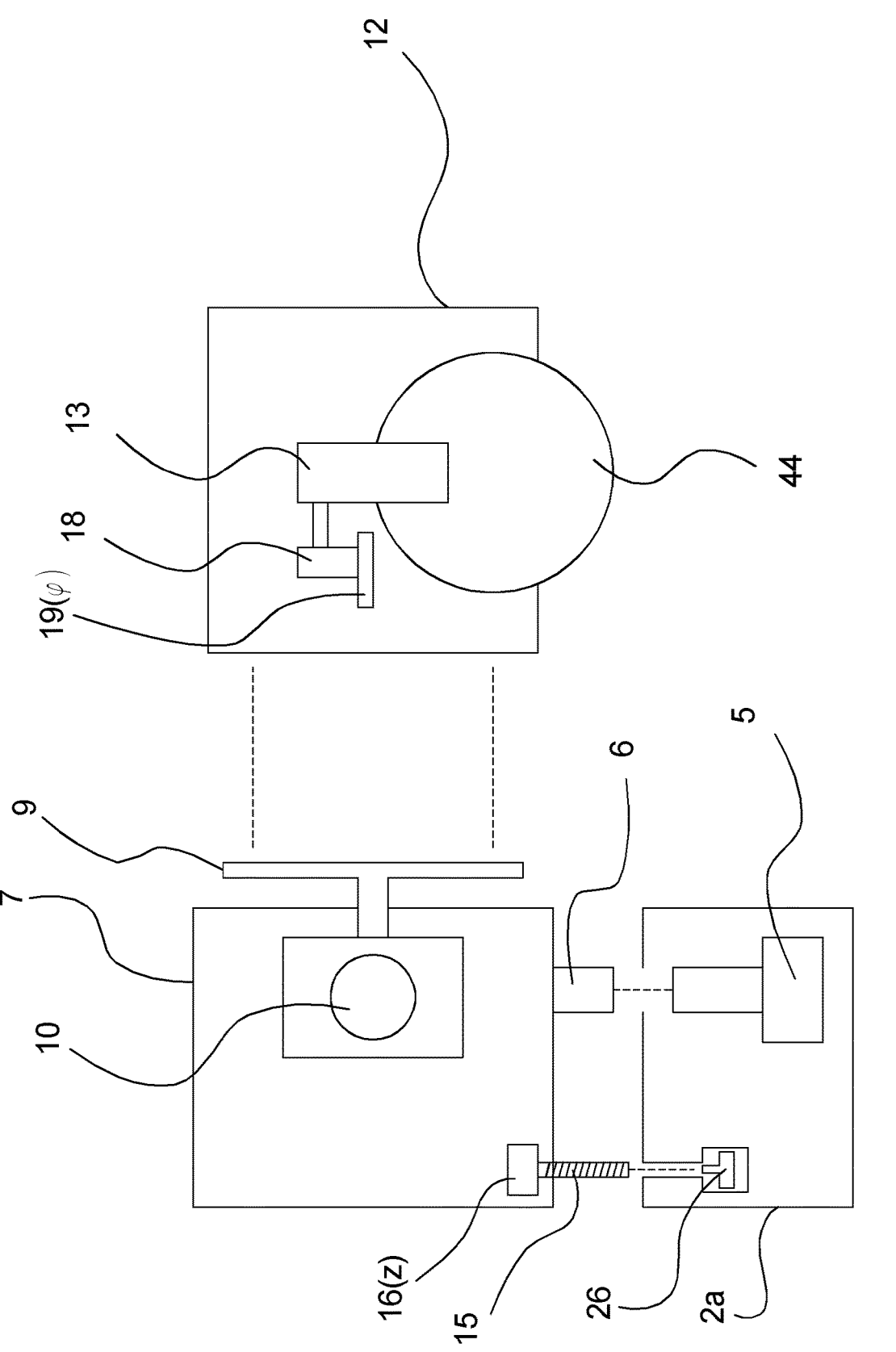
Figure 6C:
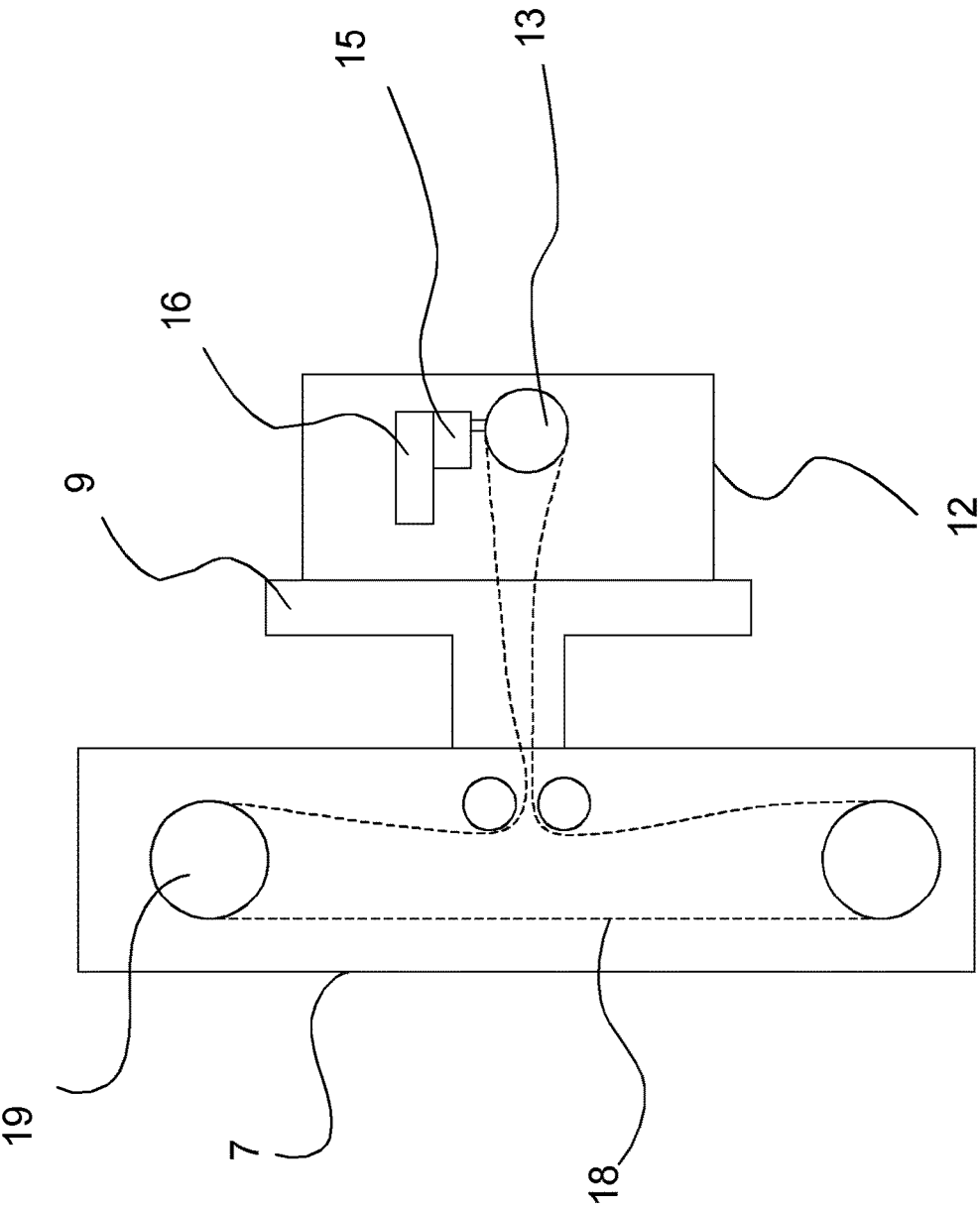
Figure 6D:
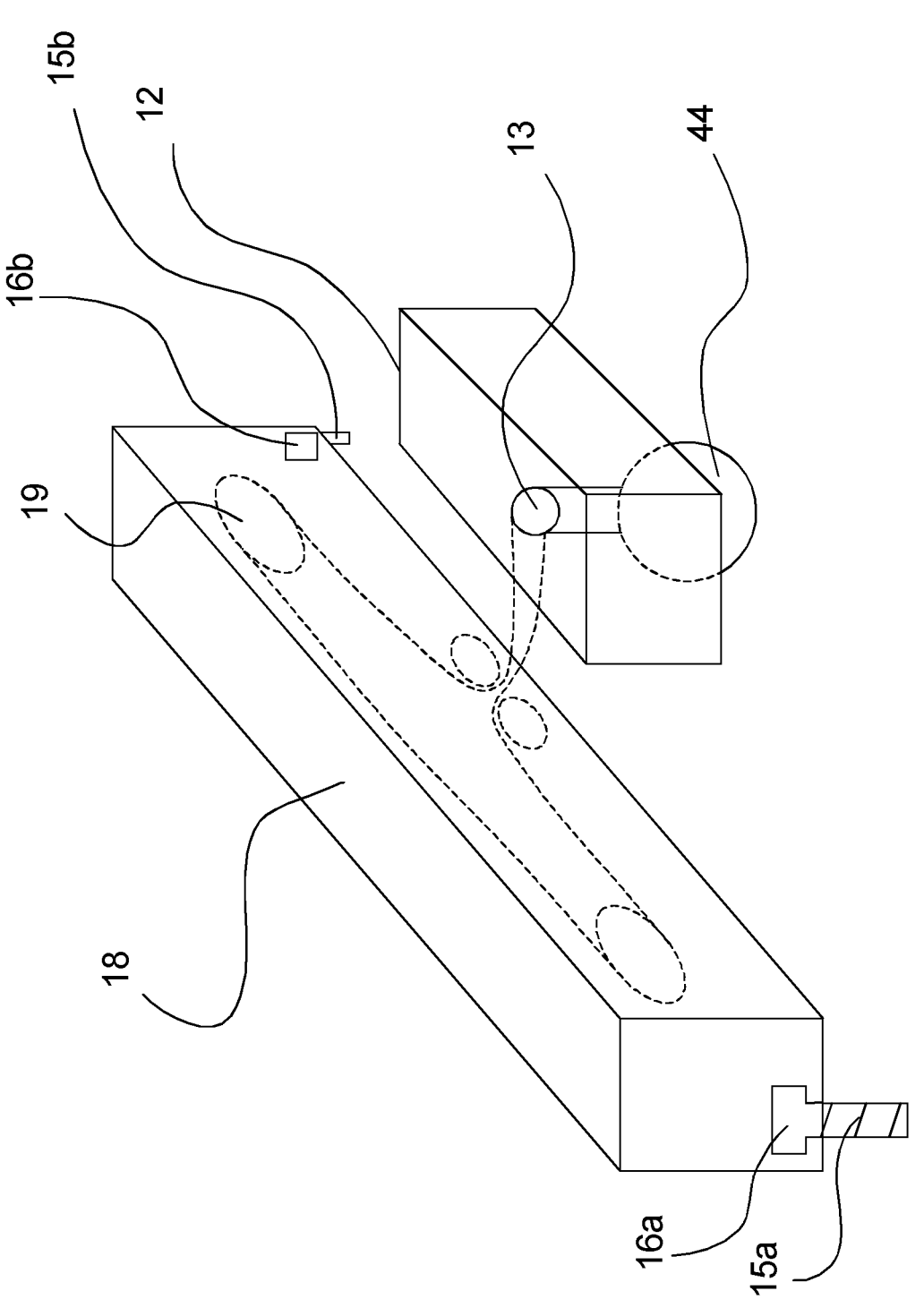
Figure 7:
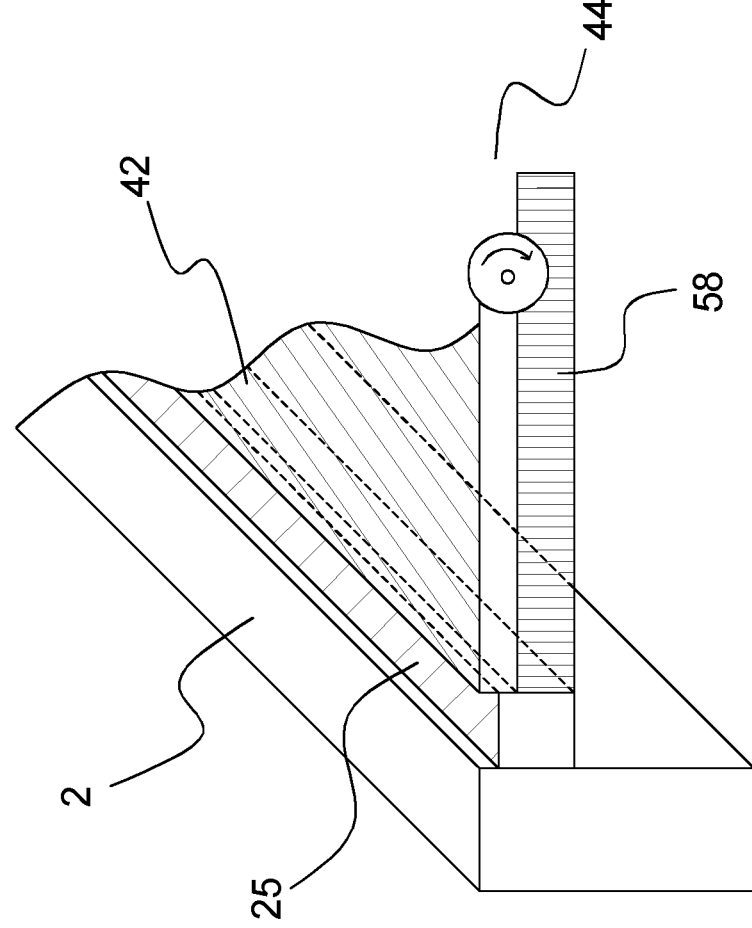
Figure 8:
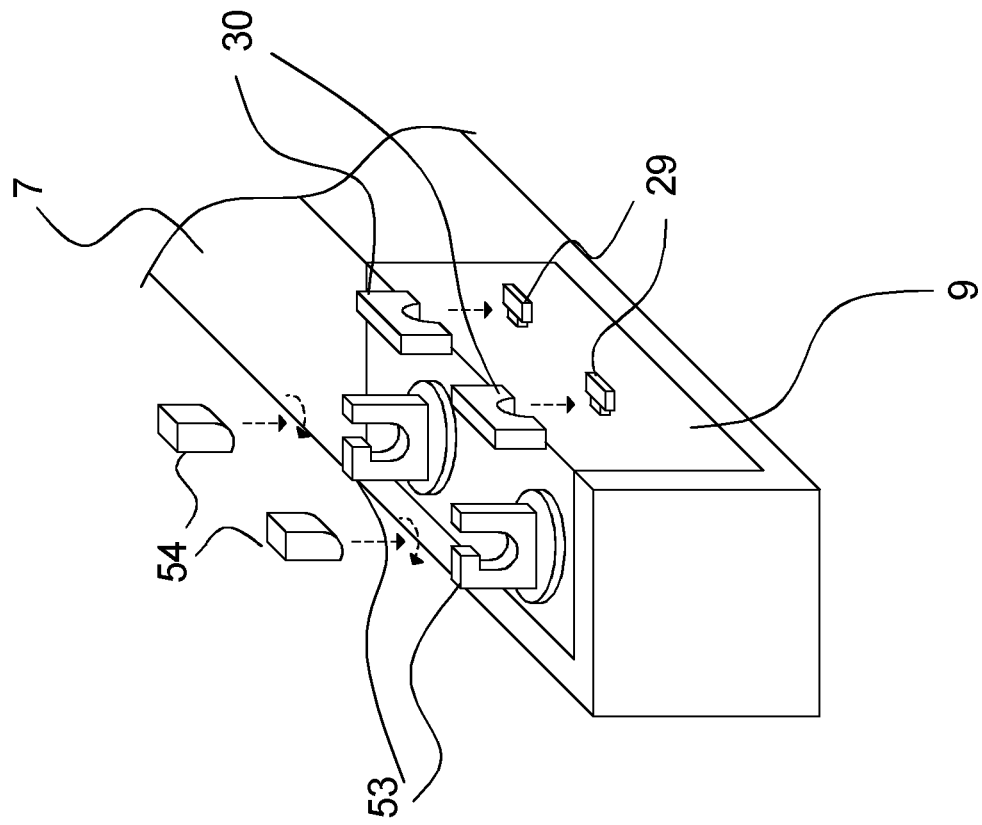
Figure 9:
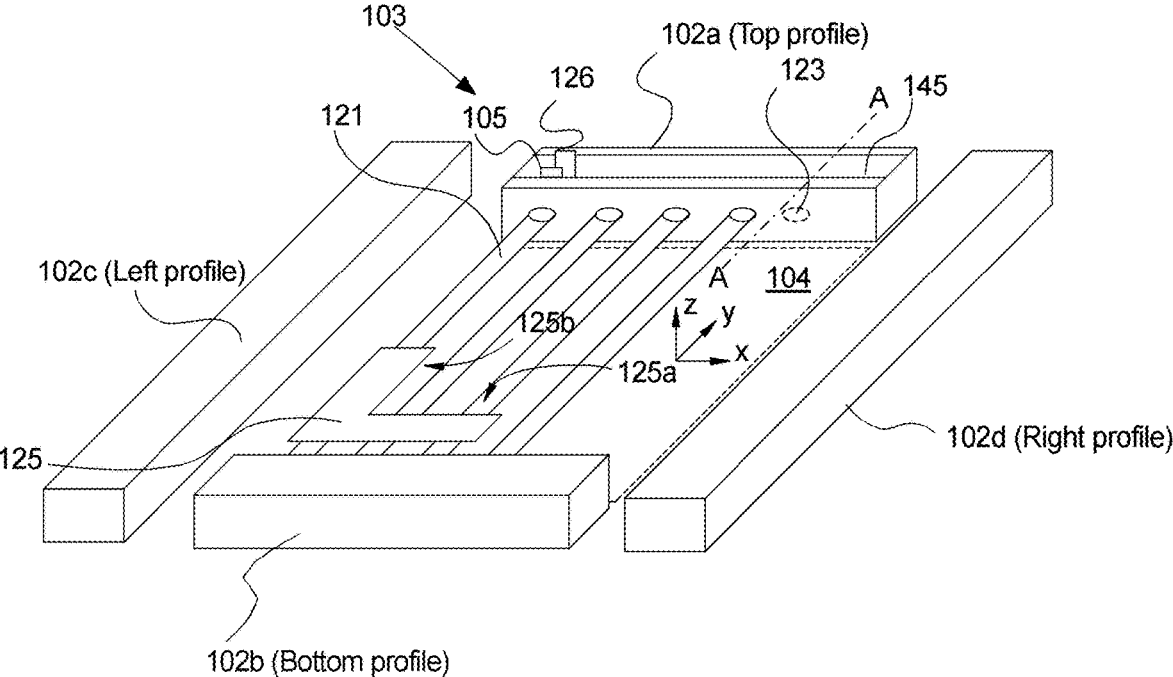
Figure 10:
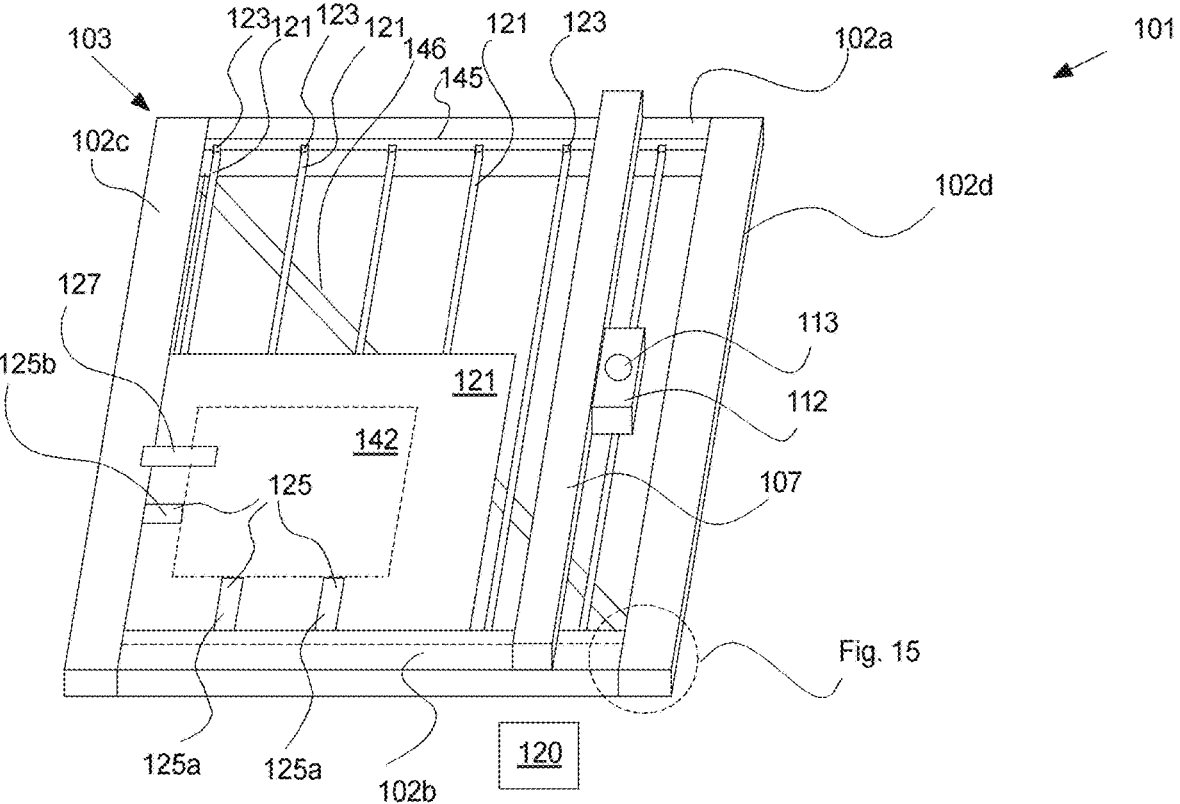
Figure 11:
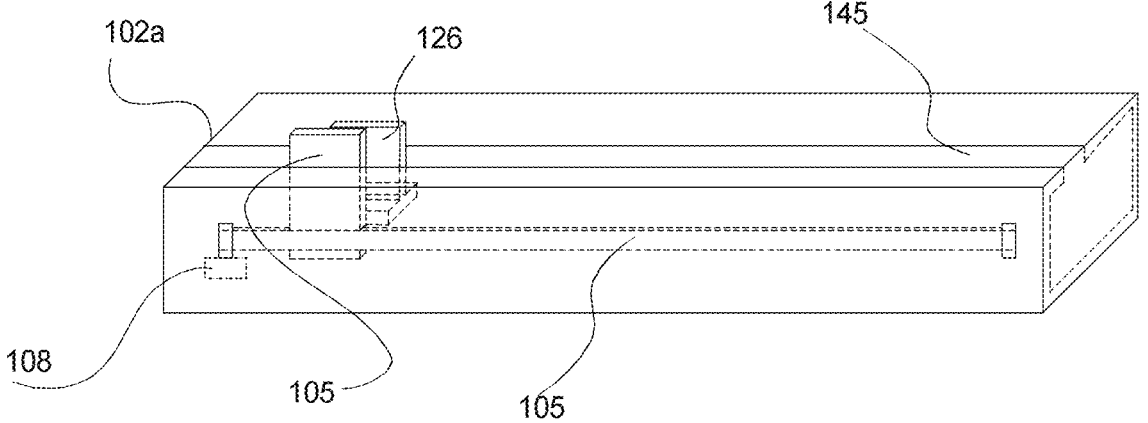
Figure 12:
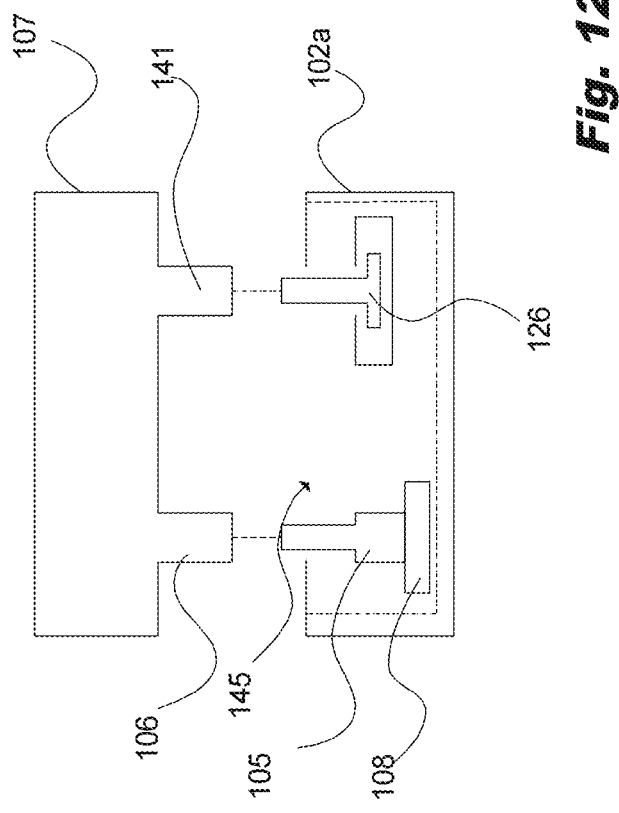
Figure 13:
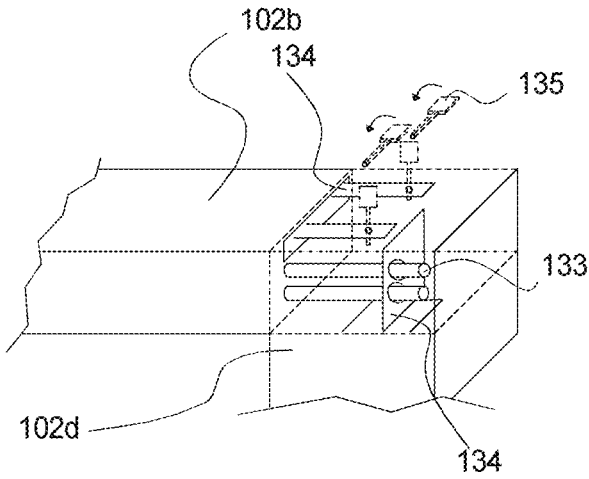
Figure 14:
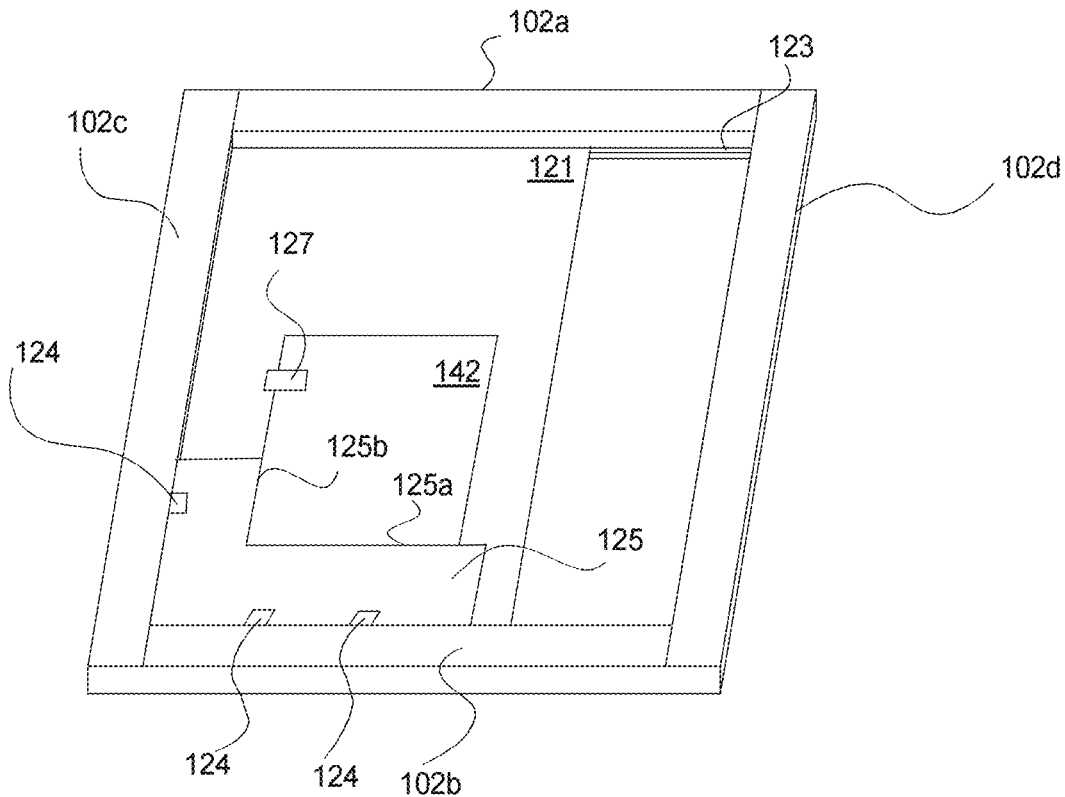
Figure 15:
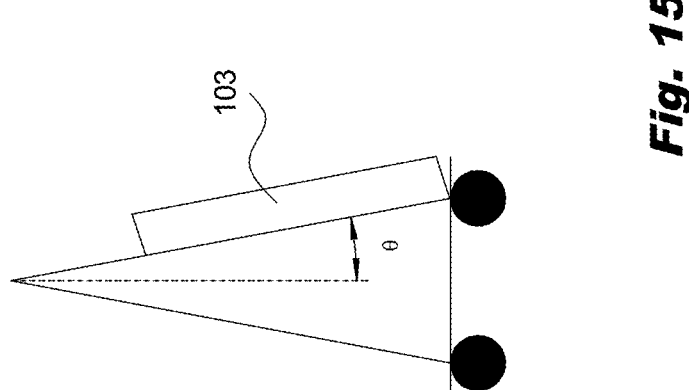
Figure 16:
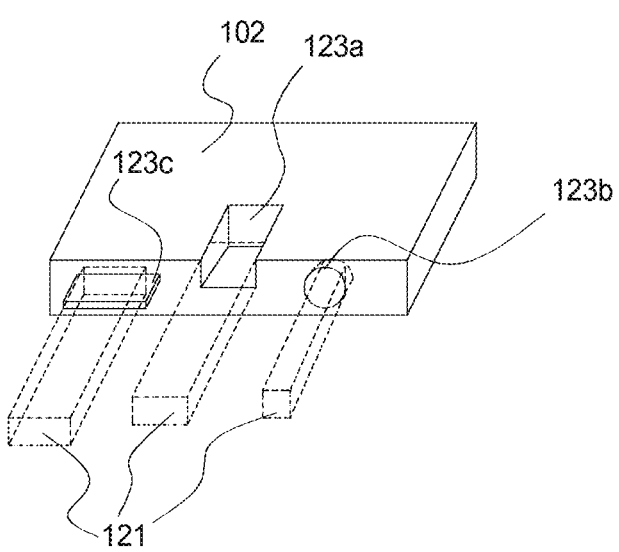
Figures 17A, 17B:
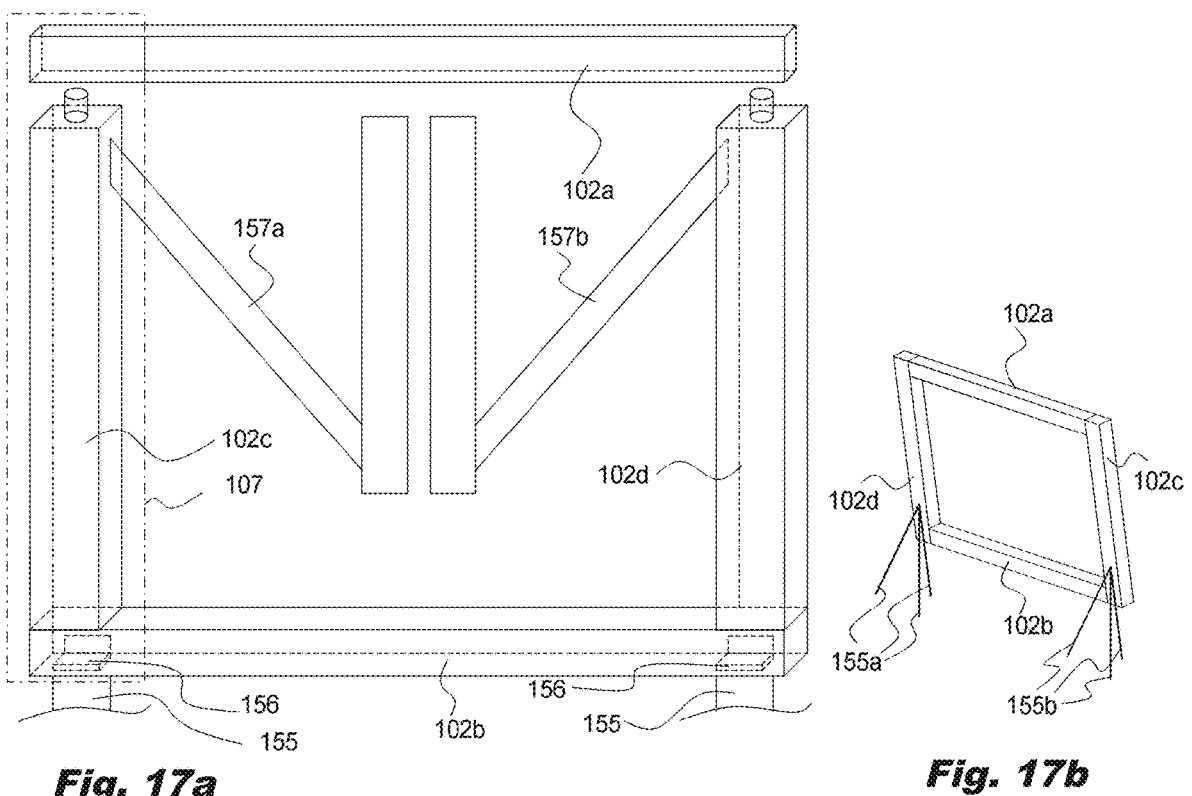
Figure 18:
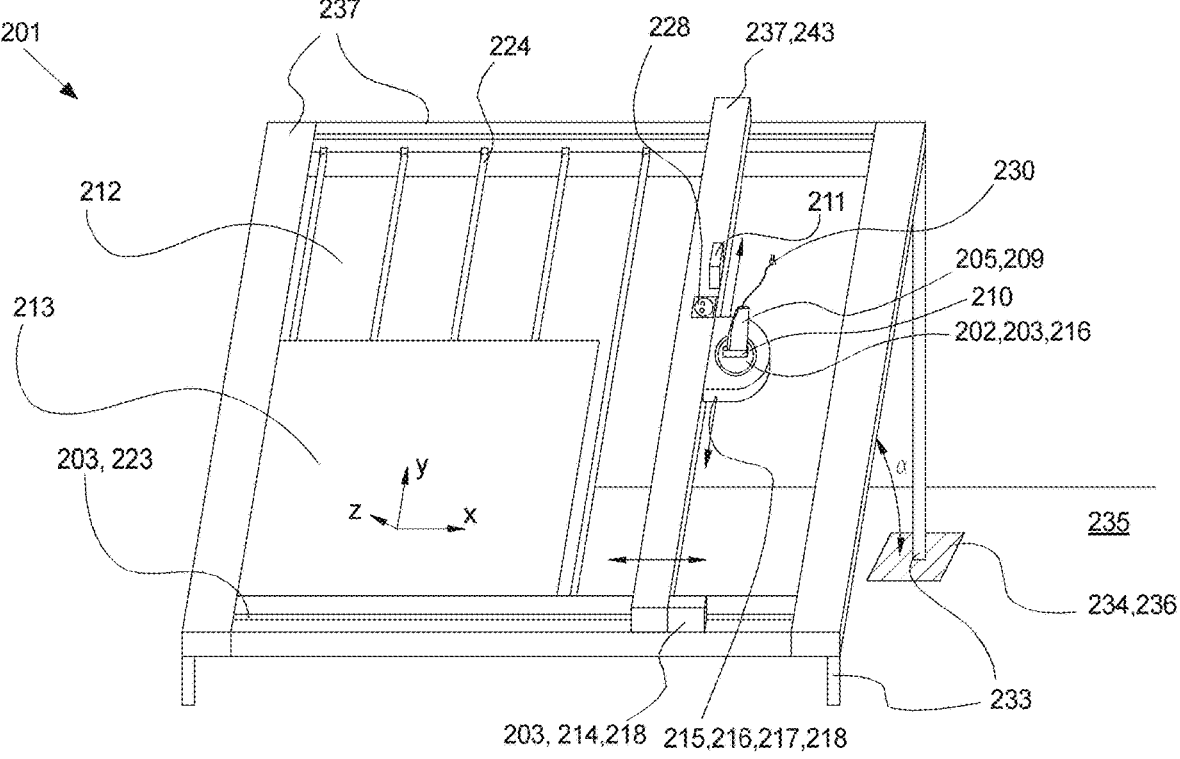
Figure 19:
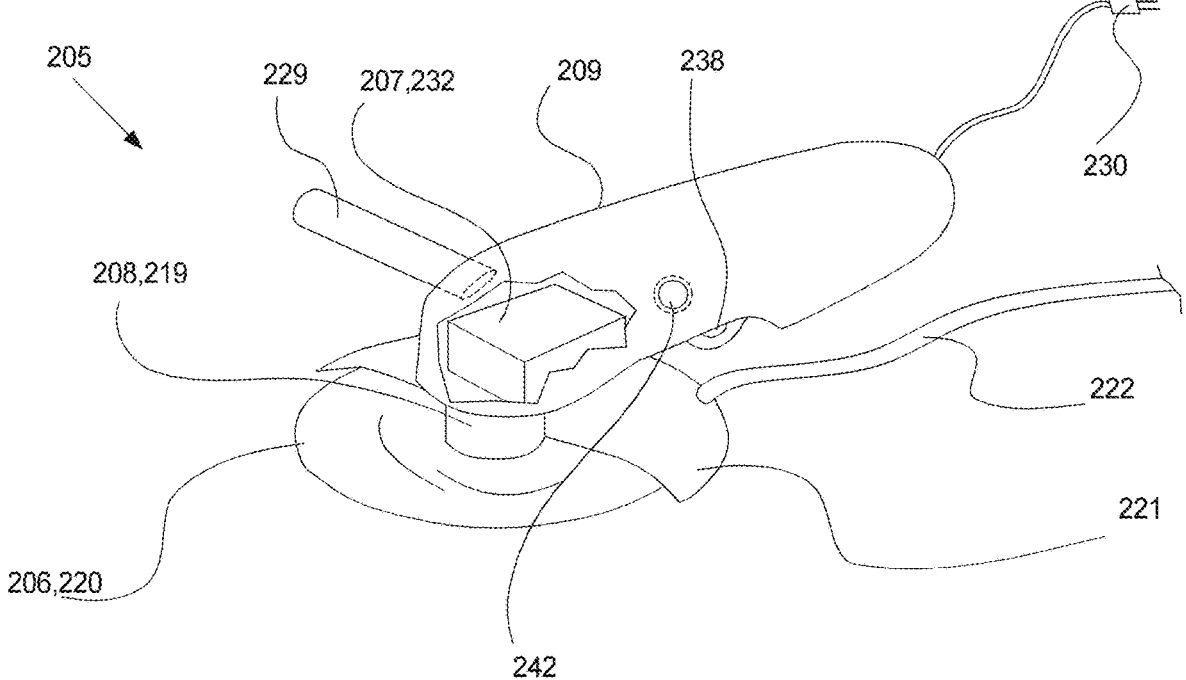
Figure 20:
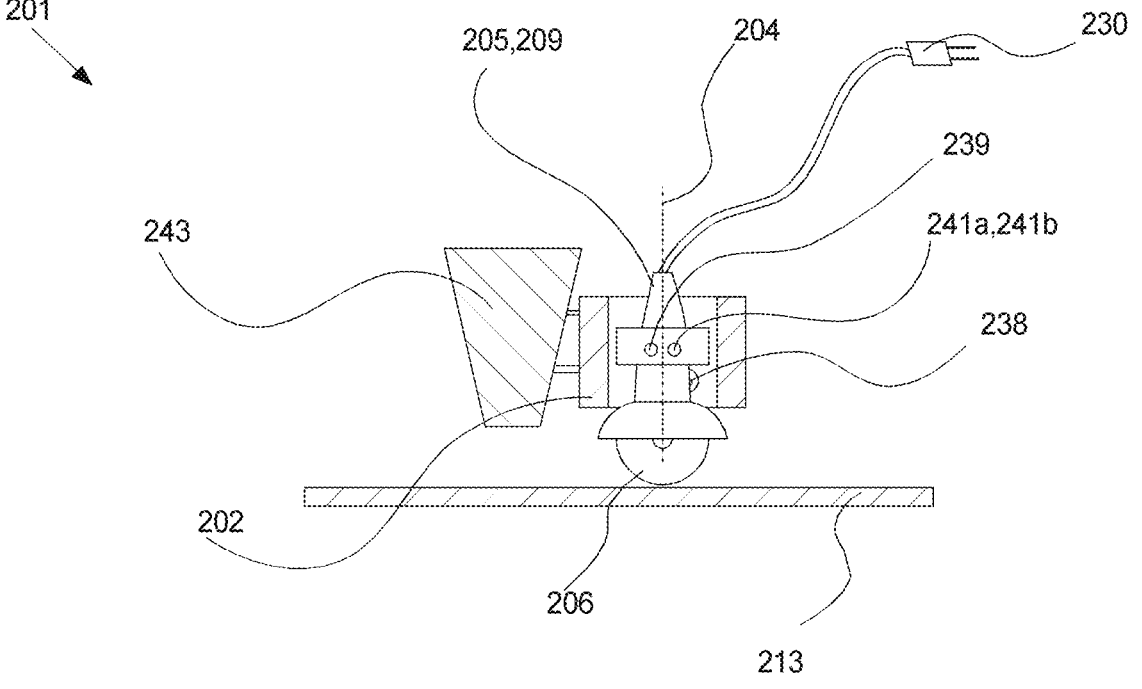
Figure 21:
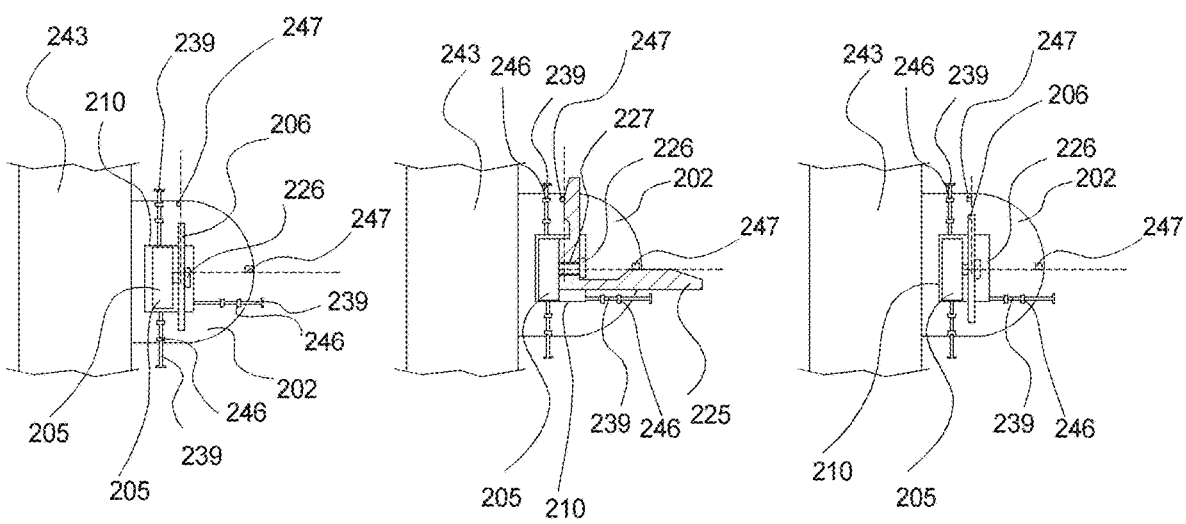
Figure 22:
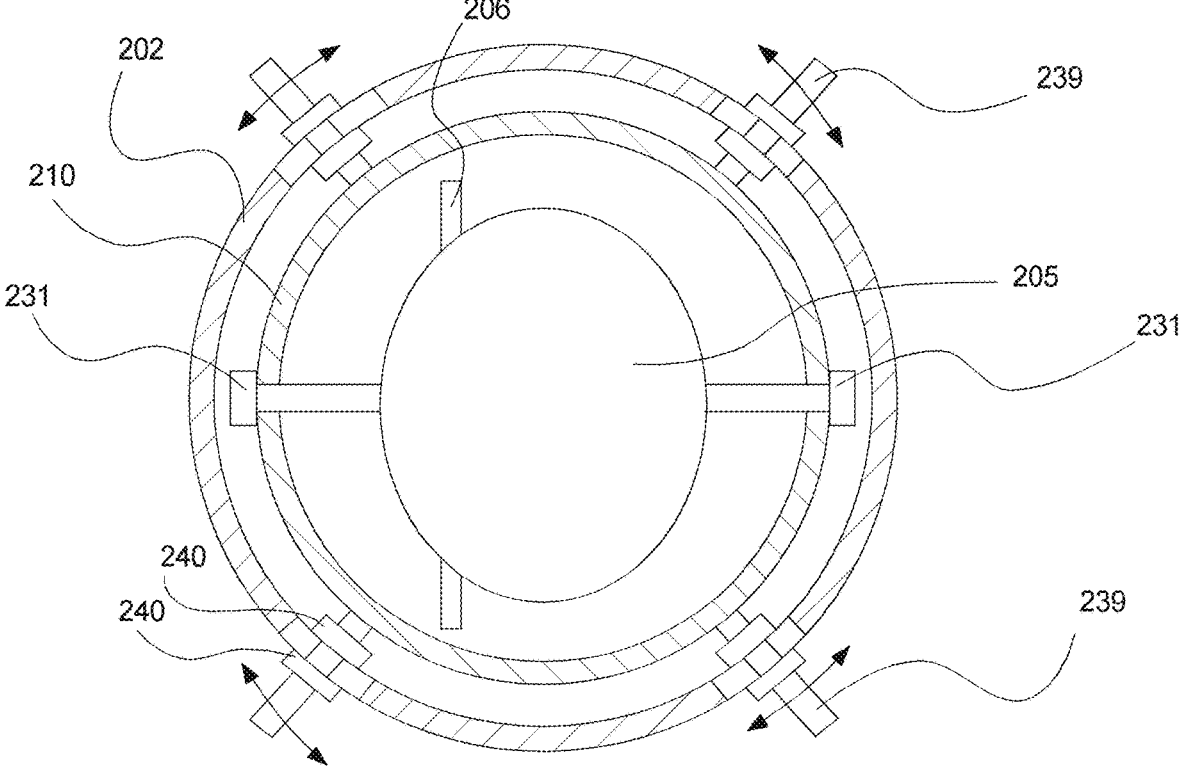

FIG. 6a-6d illustrates various alternatives for facilitating movement of the power tool in the Z and in the φ directions, FIG. 7 illustrates how an offering board is used to support the board to be cut, FIG. 8 illustrates an embodiment of the tool holder carriage and how the tool holder is fastened thereto, FIG. 9 illustrates parts of a portable automated panel cutter support frame, FIG. 10 illustrates an assembled portable automated panel cutter support frame, FIG. 11 illustrates a top frame profile, FIG. 12 illustrates a cross-sectional view of a top frame profile, FIG. 13 illustrates an example of mounting to frame profiles, FIG. 14 illustrates an assembled support frame, FIG. 15 illustrates a support frame resting in an upright position, FIG. 16 illustrates variations of board support fixation, FIG. 17a illustrates an alternative frame assembly, FIG. 17b illustrates an alternative frame assembly with tripod legs, FIG. 18 illustrates the portable automated panel cutter as seen in perspective, FIG. 19 illustrates an embodiment of the power cutter as seen in perspective, FIG. 20 illustrates a cross section through the middle of the power cutter holder, as seen from the bottom, FIG. 21a-21c illustrate an alignment process of the power cutter in the power cutter holder as seen from below, and FIG. 22 illustrates a cross section through a power cutter holder and adaptor, as seen from above.

DETAILED DESCRIPTION

Description of Portable Automated Panel Cutter

Figure 1A:
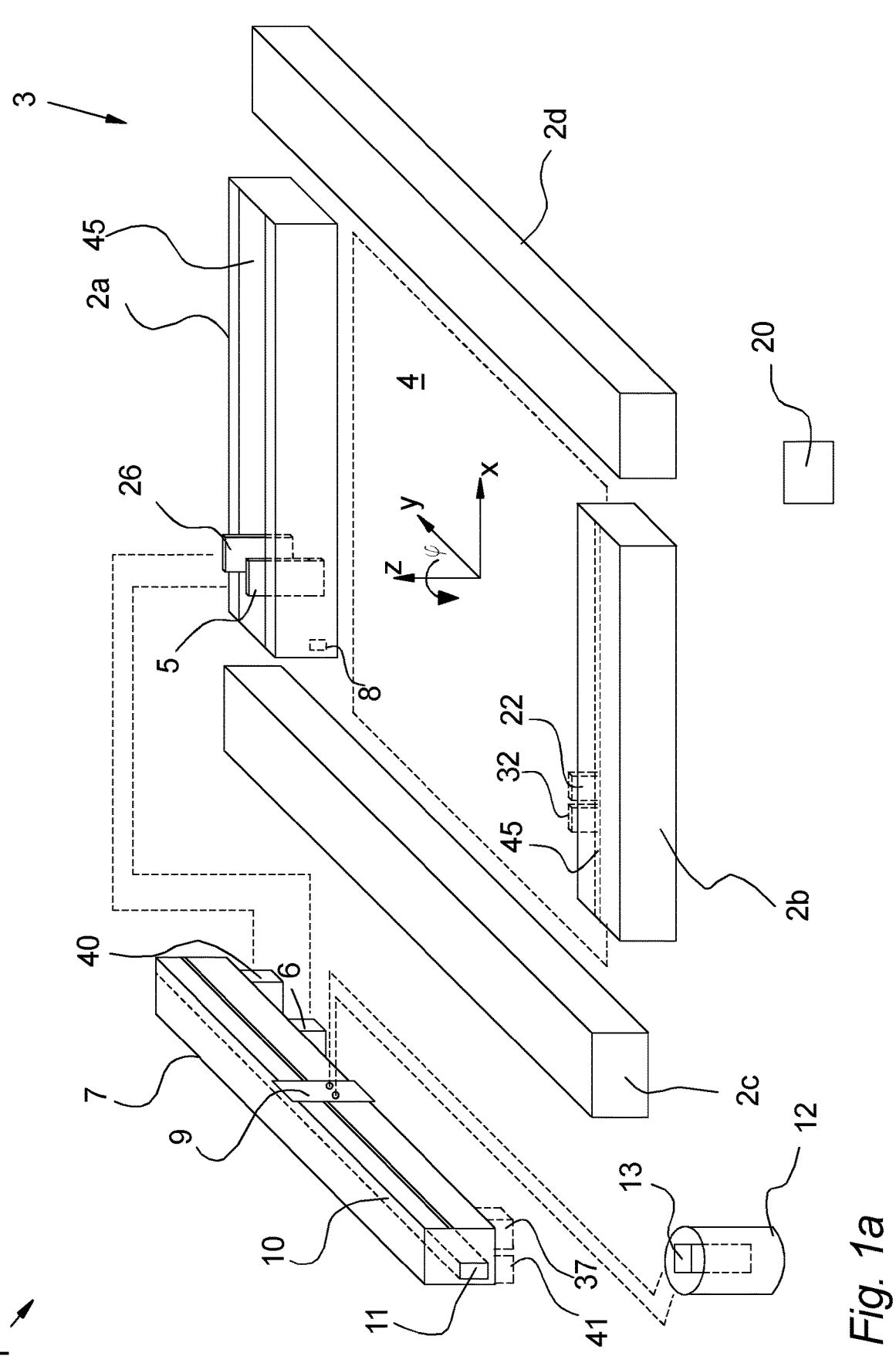
FIG. 1a illustrates parts of a portable automated panel cutter.
Figure 1B:
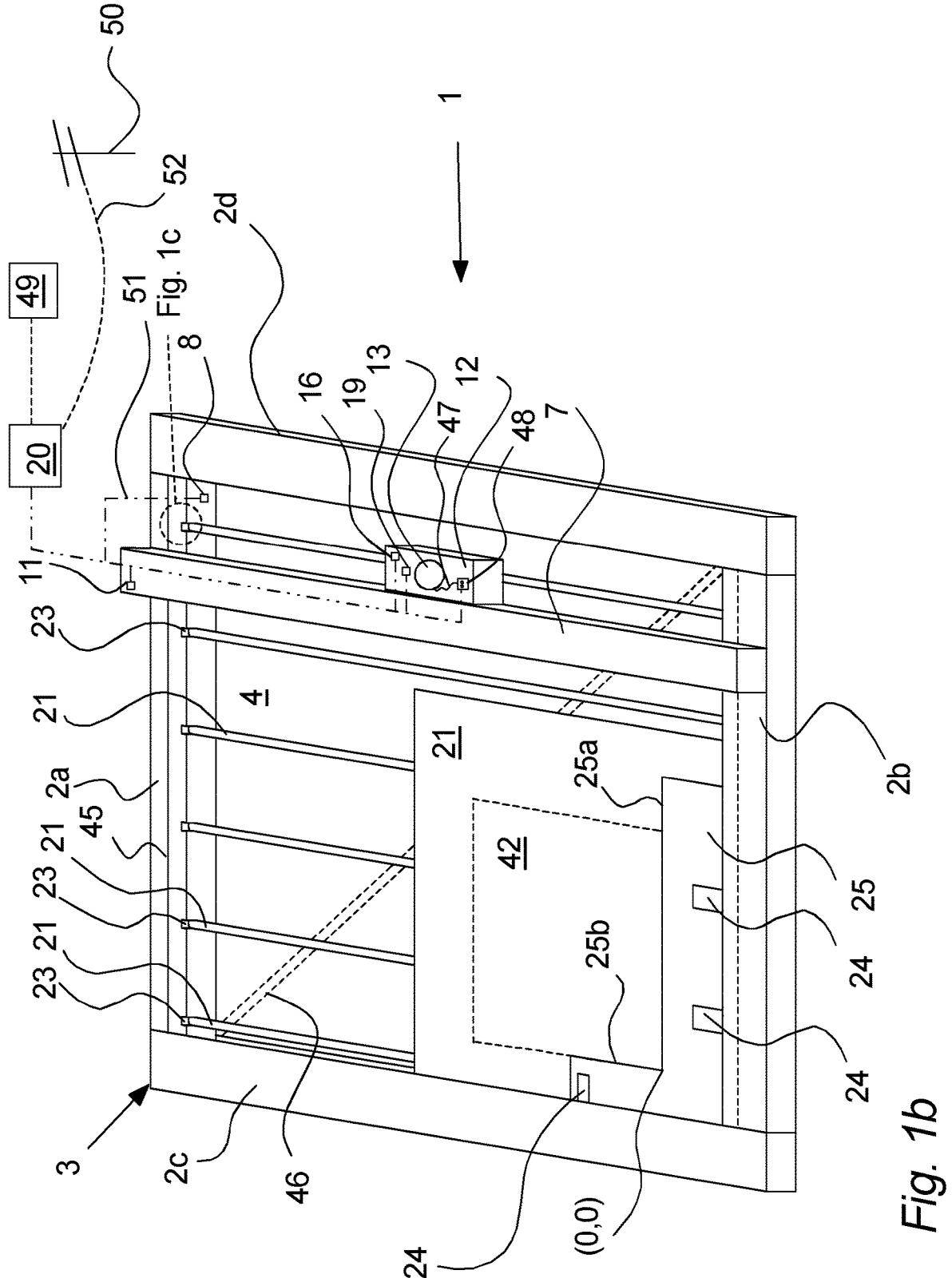
FIG. 1b illustrates an assembled portable automated panel cutter.
Figure 1C:
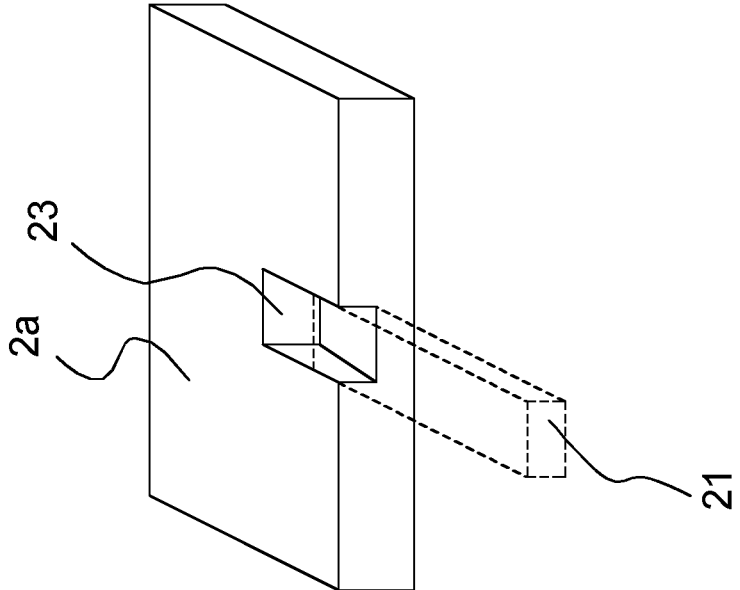
FIG. 1c illustrates fastening board support to frame.

FIG. 1a illustrates dissembled parts of a portable automated panel cutter 1 and FIG. 1b illustrates an assembled panel cutter 1 according to an embodiment of the invention. The panel cutter 1 is portable meaning that it can be packed away e.g. in bags when not in use. Accordingly, the panel cutter 1 is advantageous in that when it is not in used it can literally be stored on a shelf at a workshop or similar. When needed again it is easy to carry the dismantled panel cutter 1 to the site where it is needed. Further, craftsmen such as carpenter and bricklayers are often carrying a lot of building materials during the day. To protect their body, they are advised not to carry more than 14-20 Kg at the time. Therefore, the panel cutter 1 of the present invention is advantageous in that it can be dismantled in various parts which does not exceed the recommended weight.

The panel cutter 1 comprises a support frame 3 that is built from four frame profiles 2a-2d. Attachable to the support frame 3 via first and second carriage transmission part 5, 6, and first carriage bearing and receiver 26, 40 through a longitudinal opening 45 in the top profile 2a is a carriage 7 and attachable to a tool holder carriage 9 of the carriage 7 is a tool holder 12. The carriage 7 may as indicated also be connected to the bottom profile 2b here indicated by first carriage bearing receiver 40 and a longitudinal opening 45. Finally, attachable to the tool holder 12 is a power cutter 13. The inner support area 4 defined by the four frame profiles 2a-2d is at least partly covered by board support 21 supporting a board 42 to be cut (see FIG. 1b).

A controller 20 is controlling the operation of the panel saw 1 via input data received from a user. A user can be any person that needs to cut material. Carpenters and bricklayers are examples of persons that during a working day are cutting a lot of boards 42 and hence would benefit from an automation of their cutting processes. The movement of the carriage in the X direction is facilitated by control of a motor 8 mechanically connected to the first carriage transmission part 5. The movement of the tool holder 12 in the Y direction is facilitated by control of a motor 11 mechanically connected to a first tool holder drive part 10.

FIG. 1b illustrates an assembled panel cutter 1. In this embodiment, the board support 21 is in the form of both slats and a board. The board 42 to be cut is illustrated by stipulated lines on top of the board support 21. As an alternative or in addition to the slats, the board support can be in form of a diagonal support 46 (stipulate on FIG. 1*b*) which when mounted not only increases the stiffness/rigidness of the support frame 3 but also can be used as board support. Hence, board support in the form of a board resting on the diagonal support 46 and preferably also on one or more board support fixations 23 can be used to support the board 42. In this way, the mounting of the support frame can be made faster.

The panel cutter 1 is supplied with power from a power supply which in an embodiment is the voltage of the utility grid 50 obtained from power supply cables 52 connecting the panel cutter 1 to the utility grid 50. It could also be supplied from an energy storage 49 in the form of one or more batteries. Motor power supply cables 51 are preferably connecting the motors 8, 11, 16, 19 to the power supply 49, 50 and the controller 20 is controlling the current in these motor power supply cables 51 to facilitate the desired movement of the parts of the panel cutter 1.

In an embodiment, the tool holder 12 is equipped with a power socket 48 to which the electric wire from the power cutter 13 is connected. In this way the power cutter 13 can be controlled by controlling power to the power socket 48. The power socket 48 may also have other locations on the panel cutter 1, however the location on the tool holder 12 is preferred.

Hence, in this context the term "panel cutter" should be understood as a machine for cutting or sawing sheets into predetermined dimensions and/or numbers e.g. on a horizontal plane, slanted plane or vertical plane.

The orientation of the board 42 on the panel cutter i.e. which side/end of the board is left, right, top and bottom can be defined in software of the controller. Measures are typically made from left to right and from bottom to top. Accordingly, the measures provided to the controller 20 is handled according to the determined orientation of the board 42 orientated on the board support 21. In the examples below, the orientation is provided on the figures to avoid doubt.

In this document, a board 42 should be understood widely including any kind of lumber that can be cut by a power cutter as described below. Further, a board in this document also includes other materials than lumber, hence a board 42 should be understood as any of the following materials plywood, chipboard, gypsum, medium-density fibreboard, concrete, (precast) masonry, clinker, steel, fiber-cement board, etc.

As mentioned, the frame profiles 2 are intended to be used again and again as part of the panel cutter 1. Therefore, it is preferred that the material used for the frame profiles 2 does not wear out as fast as the board support 21. Further, it is also the reason why the panel cutter 1 does not cut in the frame profiles 2 as will be explained below.

The material also needs a sufficient strength to carry the carriage 7. Therefore, aluminum is a preferred material in that it complies with requirements to strength, wear and since it is widely used in many industries the price is also acceptable. Alternative materials could include carbon and steel.

As mentioned, that support frame 3 is established by connecting four frame profiles (2a, 2b, 2c, 2d). The panel cutter 1 can be operated both in a horizontal position laying on a support such as a table and in an upright position that is close to but not completely vertical. In the upright position, the frame 3 needs to have an inclination from vertical that facilitates resting of the board 42 on the board support 21 of the frame 3 without being fixed. It is possible to fixate the board 42, however this is not required nor preferred in that it takes time.

Figure 2:
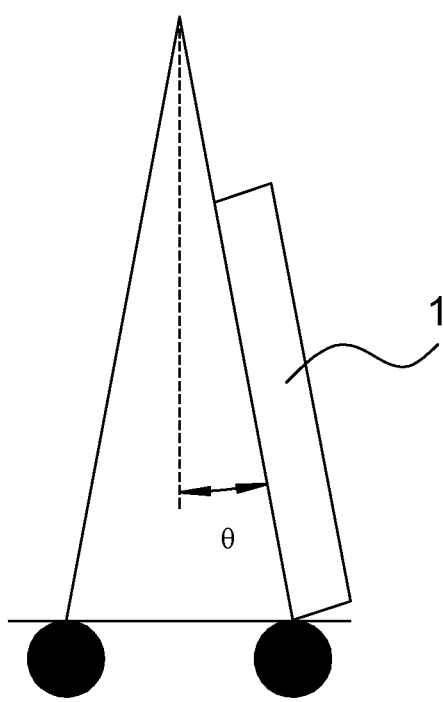
FIG. 2 illustrates the panel cutter in an upright position.

The preferred position of the frame 3 and thereby of the panel cutter 1, when the panel cutter 1 is in operation is in an upright position at least 10 degrees from vertical (this angle is in this document referred to as theta θ). This is because the handling of boards 42 to be cut is easier if they can be placed on/removed from the panel cutter 1 in the same orientation as lifted which are typically in an orientation close to vertical. A further advantage in positioning the frame 3 in an upright position is that gravity helps positioning/fixing the board 42 at a desired location with reference to the frame which will be explained below. FIG. 2 illustrates an embodiment where the panel cutter 1 is positioned upright supported against a wagon which are typically used for transporting and storing gypsum boards. Other ways of supporting the frame 3 such as a wall, a table, etc. could also be used.

When the support frame 3 is in its upright position, the first frame profile 2a is referred to as the top profile, the second frame profile 2b is referred to as the bottom profile, the third frame profile 2c is referred to as the left profile and the fourth frame profile 2d is referred to as the right profile. Hence, the top 2a and bottom 2b profiles are parallel extending their longitudinal axes in the first direction referred to as the X direction. These are spaced by the paralleled transvers left 2c and right 2d profiles extending their longitudinal axes in the second direction referred to as the Y direction.

Accordingly, the frame 3 defines a plan that mathematically can be referred to as the X-Y plane. Perpendicular, to this X-Y plane is the Z plane which is referred to as the third direction. Finally, a rotation around the Z plane is in this document referred to as a fourth direction i.e. movement in the fourth direction is referred to as an orientation in the angle Phi φ around the Z plane. Summing up, the frame 3 defines an inner support area 4 which no matter the inclination angle θ of the frame 3 is always in the X-Y plane. The maximum dimensions of the inner support area 4 is preferably less than 300 cm in length (X) times 200 cm in wide (Y). These measures in length and width ensures that boards having standard measures can be cut by the panel cutter 1. The height (Z) of the panel cutter 1 when the carriage 7 is mounted to the support frame 3 is preferably less than 50 cm.

This inner support area 4 is at least partly covered by a board support 21. The board support 21 can be implemented as a plurality of slats extending between either the top and bottom profiles 2a, 2b or the left and right profiles 2c, 2d. This is preferred over diagonal support in that then the slats can be of the same length making it faster to assemble to panel cutter 1. Alternative, the board support 21 can be a board e.g. as the type that has to be cut. The main function of the board support 21 to support the board 42 to be cut so that it remains in the X-Y plane also when the power cutter 13 is cutting and thereby applying a force in the Z direction to the board 42. Therefore, it is preferred if the board support 21 supports the entire board 42.

The board support 21 is releasably mounted to the frame profiles (top/bottom 2a, 2b or left/right 2c, 2d). This mounting is preferably facilitated by a board support fixation 23 in the form of one or more recesses/holes in or projections of at least two opposite frame profiles 2. On FIG. 1*b*, the board support fixations 23 are illustrated as a plurality of projections along the top frame profile 2a.

The material of the board support 21 has to be a material in which the cutting edge of the cutting tool 44 of the power cutter 13 is suitable for cutting. This is because when cutting a board 42, it is preferred if the cutting edge of e.g. a cutting disc of the power tool 13 cuts the whole way through the board 42 and thereby it is very hard (at least it cannot be guaranteed) not to cut in the board support 21. Accordingly, the material of the board support 21 should not damage or wear such cutting disc unnecessary. Therefore, one preferred material for the board support 21 is wood another is the material of the board 42 to be cut. Hence if the board 42 to be cut is a plywood board, the board support 21 could also be made of plywood.

Accordingly, the board support 21 is intended to be replace after several cuts in that after several cuts, the board support 21 may lose its function of supporting the board 42 in the X-Y plane. In many situations, since it is only one side of the board support 21 in which cuts are made, the board support can be used in the constructions as the cut board 43 or simply turned around and used on the other side.

One advantage of using a board as board support 21 over using slats is that suction of dust from the cutting operation only needs to be made from the front of the board. Further, if a board is used as board support 21, only a few slats are needed to support this board (if not one or more recesses/ protrusions 23 in the frame profiles can be used to support this board). If the board used as board support is of the same material as the board 42 to be cut it do not need to be carried along with the panel cutter 1 to the construction site and thereby the total weight of the panel cutter 1 and foot print when dismantled is reduced.

The board guide 25 is preferably positioned against the bottom profile 2b and the left profile 2c. The right profile 2d may also be used either together with the bottom profile 2b alone or together with the left profile 2c. The board guide 25 comprises a first guide area 25a guiding the board 42 to a predetermined position along the X direction and a second guide area 25b guiding the board 42 to a predetermined position along the Y direction. The board guide 25 may be implemented as one movable board where the first and second guide areas 25a, 25b meets or as several pieces of material that together guides the board 42 in the X and Y directions.

One function of the board guide 25 is to ensure that boards 42 to be cut are located at a predetermined position in the X-Y plane every time. This is advantageous in that the then controller 20 is able to always use the same point relative to the inner support area 4 as reference point for a particular part of the board 42. In a preferred embodiment, the bottom side of the board 42 is always positioned against the first guide area 25a and the left side of the board 42 is always positioned against the second guide area 25b. Thereby, the bottom left corner of the board 42 is always located at the same positioned relative to the inner support area 4 and that position can therefore be defined in the control software e.g. as X=0 and Y=0 i.e. (0,0).

The position of Z=0 can be determined based on knowledge of distance between top position of the power cutter 13 in the Z direction and position of the board support 21 and the diameter/radius of the cutting tool 44. The angle φ is in "0 degrees" position e.g. positioned to perform a cut parallel to the Y-axis. However, this can be configured from by the control software.

Alternatively, vision systems can be used to define (0,0)/ the location of the board 42 on the board support 21. However, the board guide 25 solves this problem in a simpler way and further it has the second function of ensuring that the power cutter does not cut in the frame profiles 2. This is advantageous in that these frame profiles

2 are part of the panel cutter 1 that can be used many times and therefore they should not be weakened by cuts from the power cutter 13.

The board guide 25 may be held in place on the board support 21 by means of board guide steering's 24. These may be implemented in various forms e.g. as aluminum blocks that is fastened to the frame profiles and corresponding to which recesses are made in the board guide 25. Several other implementations may be used including use of the board support 21.

The part of the board guide 25 supporting the board 42 may in an embodiment, be equipped with protrusions establishing a friction between the board 42 and the board guide 25. The protrusions may engage with the board and prevent it from sliding when cut by the panel cutter 13. In this way, the position of the board 42 on the board support 21 and thereby relative to the so-called (0,0) point ensured.

Figure 3:
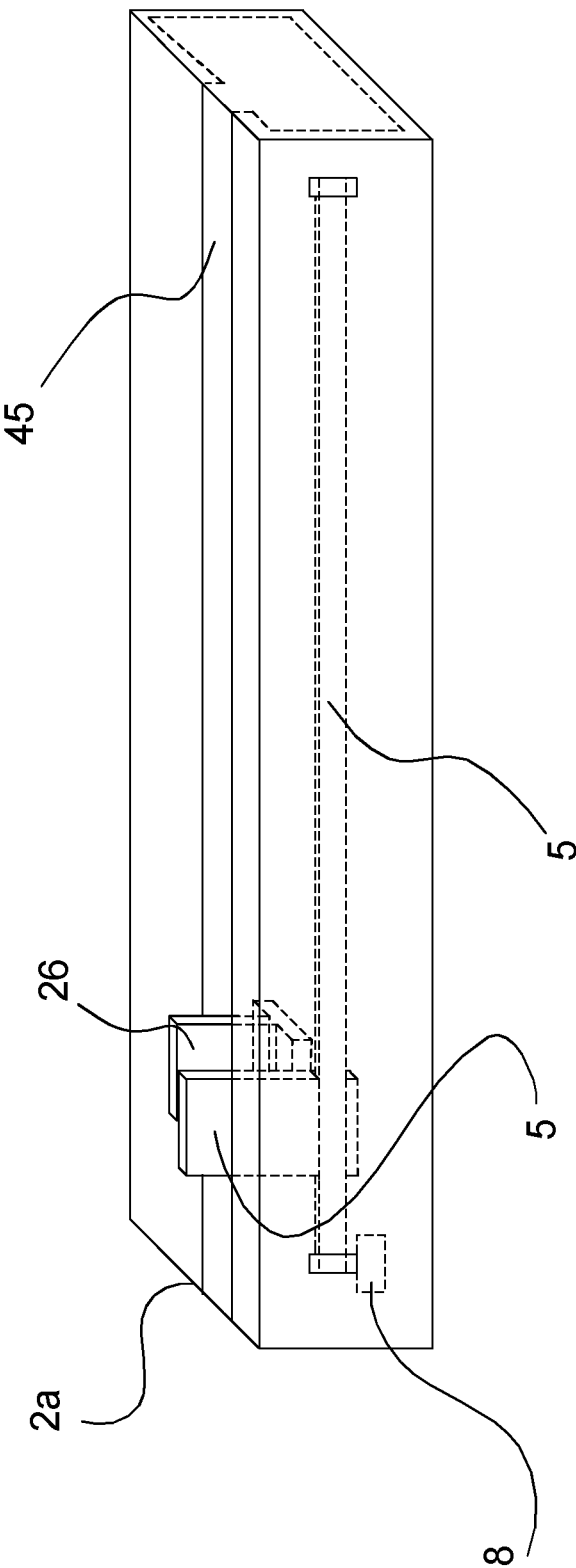
FIG. 3 illustrates the first frame profile in a side view.

In a preferred embodiment of the invention, at least the top profile 2a is a hollow aluminium profile as illustrated on FIG. 3. Embedded in the hollow top profile 2a is a first carriage transmission part 5 implemented as a linear belt drive to which a second carriage transmission part 6 of the carriage 7 can be removably attached. The connection between the first and second carriage transmission parts 5, 6 is made through a first longitudinal opening 45 in the top profile 2a. Thereby, movement of the linear belt drive is transferred to movement of the carriage 7 in the X direction. Preferably the line drive includes a first carriage motor 8 also embedded in the top profile 2a which is controlled by the controller 20. The motor 8 is preferably a servo or stepper motor dimensioned to be able to move the weight of the carriage 7 along the X direction at least together with the first carriage bearing 26. The first carriage bearing 26 may move in a track (not illustrated) made inside the top profile 2a adapted to fit the geometry of the first carriage bearing 26.

The releasable connection between the first carriage transmission part 5 and the second carriage transmission part 6 may in an embodiment be facilitated by a connection between threated/screw parts or clamping/lever arms suitable for connection between the slide of the portal axis toothed belt drive and the second carriage transmission part 6. In an embodiment, the slide has pins and threat and the second carriage transmission part 6 is designed to fit hereto and be locked hereto with screws or lever clamps. In the embodiment, where the second profile 2b is also equipped with a transmission part 22, the connection between carriage 7 and second profile 2b is preferably identical to the connection between the first profile 2a and the carriage 7. The first transmission part 5 may also be implemented as a toothed rack, a chain drive, a spindle, belt drive or similar. Although it is preferred to embed the motor 8 and the first transmission part 5 inside the profile, the motor 8 and first transmission part 5 may be located outside the top frame profile 2a. In the alternative embodiment where the first transmission part 5 is implemented as a toothed rack, the second transmission part 6 is a pinion that is controlled by a motor located inside (or outside) the carriage. In any of these option the first and second transmission parts 5, 6 can be referred to as rack and pinion.

Accordingly, the drives facilitating movement of the power cutter 13 in the X, Y, Z and φ direction in a three-dimensional cartesian space could be implemented as rack and pinion mechanism, gear mechanism, pulley system, actuators, belt drive/system, motors or other type of automated displacer for moving the power cutter.

No matter if the panel cutter 1 is used in a horizontal or an upright position it is preferred that the top profile 2a preferably also comprises a first carriage bearing 26 releasable mountable to a first carriage bearing receiver 40 of the carriage 7. The first carriage bearing 26 and the first carriage bearing receiver 40 can be connected through the first longitudinal opening 45 in the top profile 2*a*. In this way the weight of the carriage 7 can be distributed as desired between the first carriage transmission part 6 and the first bearing receiver 40. The first carriage bearing 26 is preferably running as friction less as possible in a recess in the top profile 2*a*. Hence, the bearing 26 may be designed having a spherical form distributing the force applied from the carriage 7 to the bearing equally independent of the position of the support frame 3.

The first carriage bearing receiver 40 facilitating a weight reducing releasably mounting of the carriage 7 to the first carriage bearing 26 and thereby to the first frame profile. As indicated, this is advantageous in that most of the weight of the carriage is transferred to the support frame via the first carriage bearing and hence not via the first transmission part.

It should be mentioned that the bottom profile 2*b* may also include a drive and/or a bearing as the top profile 2*a* if it is considered necessary (not illustrated). A third carriage transmission part 22 may be implemented in the bottom profile 2*b* as described above with reference to the first transmission part. Similarly, a second carriage bearing may be implemented in the bottom profile 2*b* as described above with reference to the first bearing transmission part. Hence, if transmission and bearing is part of the bottom frame profile 2*b*, the carriage 7 comprises a fourth carriage transmission part of releasably mount the carriage 7 to the third carriage transmission part 22 and second carriage bearing receiver releasably mounting the carriage to the second carriage bearing. In FIG. 1*b*, a longitudinal opening in frame profile 2*b* as a stipulated line. Having transmission and/or bearing in or at the bottom frame is advantages in that it is possible to control movement of both ends of the carriage 7. This leads to two minor line drives instead of one larger and a more aligned movement of both ends of the carriage 7 in the Y direction when the carriage 7 is moved in the X direction.

Hence, the first carriage transmission drive 5 can be implemented as a portal axis drive with internal guide and tooth belt i.e. a stepper motor driving a toothed belt to which a slide is clamped. The slide then facilitates a releasably mounting of the carriage 7 to the frame 3 e.g. by means of pins and thread and/or a clamping lever arm. Even though illustrated on some figures, it should be stressed that the need for bearings 26, 32 supporting the transmission parts 5, 22 depends on the design of the frame 3/carriage 7. Accordingly, the carriage 7 can be both moved and carried solely by the transmission part 5 i.e. the first carriage bearing 26 and/or second carriage bearing 32 are optional.

An example of a design which in most cases would make the bearings 26, 32 superfluous is if both the first and second frame profiles 2*a*, 2*b* includes a transmission part 5, 22. An opening for attaching the carriage 7 to the second frame profile 2*b* is illustrated by the stipulated line 45 on FIG. 1*a*. In this embodiment the second frame profile 2*b* as the first frame profile 2*a* includes a transmission part 5 as described above.

As mentioned, the ends of the frame profiles 2 are releasably mounted. Beside the mechanical releasably lock, the connections may also include steering's that positions the two frame profiles in the correct position prior to the releasably mounting. An example of such steering is that an end of a first profile includes steering pins and an end of an adjacent profile includes a hole plate. When the pins are in the holes of the hole plate, the connection of the two profiles are positioned correct and they can be locked/mounted in this position. The lock may be one kind of a pivotable lever arm fastener that is easy to lock by hand. Alternatively, part of the ends of the profiles may have opposite geometric contours that fits together so that they only can be positioned correct in one way and then subsequent to the positioning the two ends can be locked be a lock.

The releasable mounting of the ends of two profiles can be made without steering. In any case, the mounting can be made by use of a tool or by hand. If the mounting requires a tool it is typically because the mounting required tightening a nut or bolt. If the mounting can be done by hand it is typically because the mounting mechanism includes some kind of lever arm fasteners.

The mechanical connection of two ends of the four frame profiles (2*a*-2*d*) can be made by one or more hinges facilitating orienting one of the two ends in an angle between 0 [deg] and 90 [deg] relative to the other end. This is advantageous in that it has the effect, that the assembling of the frame is fast and easy in that a first part of the hinge located at an end area of a first profile is easy to mount to a second part of the hinge located at an end area of a second profile. The mounting of the two hinge parts can be easily made e.g. with the two profiles in a first position and fastened when moving the two profiles relative to each other so as to establish a 90 degrees connection between the two profiles. A third and a fourth profile can be connected also with hinges and the two times two hinge connected profiles can be mounted e.g. by steering pins and lever arms as described above. Finally, to strengthening the frame, a diagonal support preferably between the non-hinged corners for the frame can be mounted.

As described above, the carriage 7 comprises at least in one end second carriage transmission part 6 and preferably also a first carriage bearing receiver 40 for releasably connecting the carriage 7 to the top frame profile 2*a*. The second carriage transmission part 6 is typically a passive mechanical part that can be locked or mounted to the first carriage transmission part 5 of the top profile 2*a*. The design of this mechanical part is a consequence of the design of the first carriage transmission part 5. Similarly, with the first carriage bearing receiver 40, third and fourth carriage transmission part 22 37 and the second carriage bearing/receiver 32, 41 (see stipulated on FIG. 1*a*) if used to connect the carriage 7 to the bottom profile 2*b*, their design is also determined by the design for the respective counterparts of the top/bottom frame profiles 2*a*, 2*b*. Thereby movement of the carriage 7 in the X direction is made possible.

Figure 4:
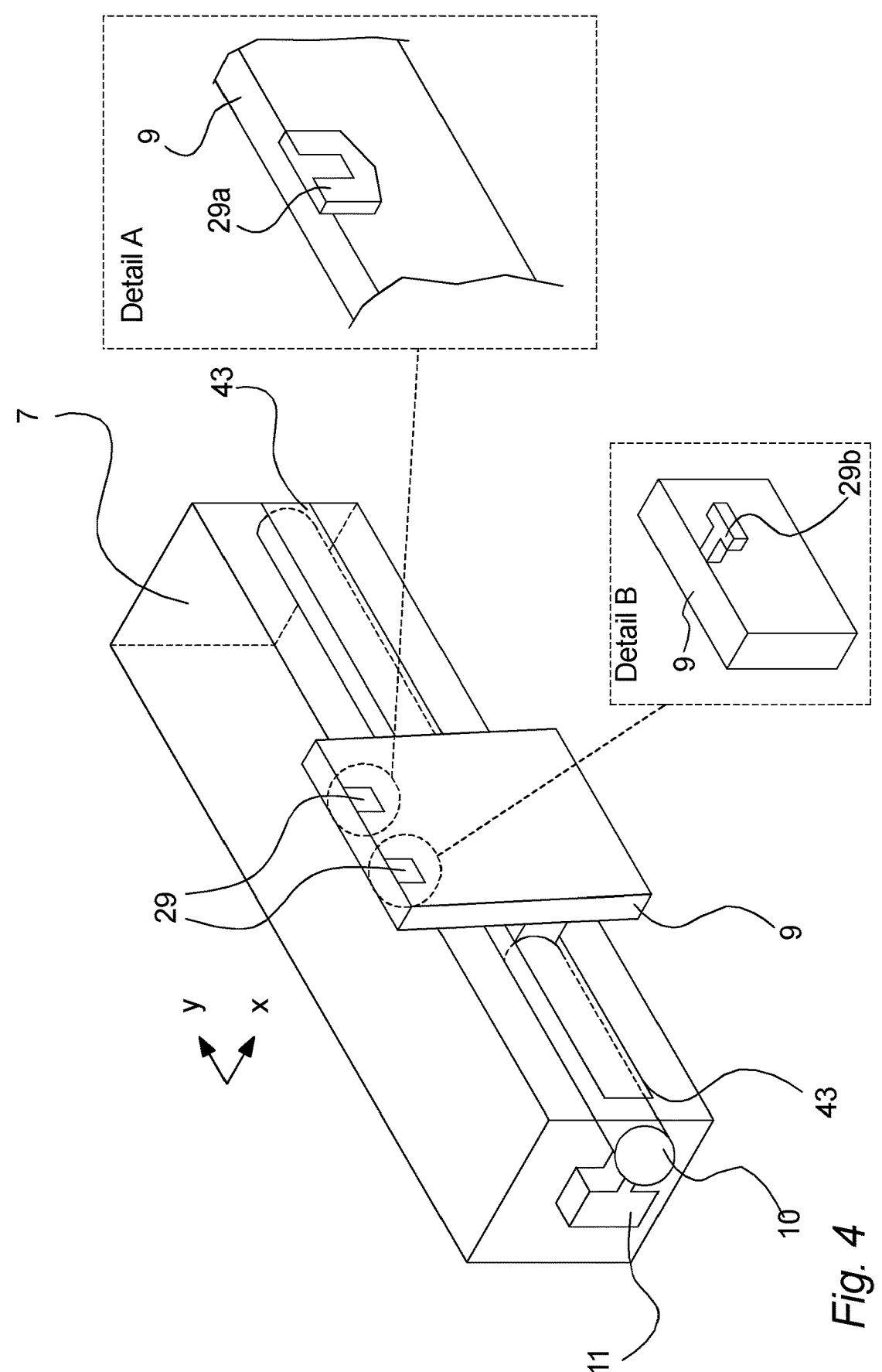
FIG. 4 illustrates a carriage.

FIG. 4 illustrates the middle part of the carriage 7. As illustrated, the carriage 7 comprises an embedded first tool holder drive part 10, a second carriage motor 11 and a tool holder carriage 9. The first tool holder drive part 10 is preferably implemented as a spindle the movement of which is controlled by the second carriage motor 11. The carriage 7 comprises a longitudinal opening 43 via which the tool holder carriage 9 is connected to the tool holder drive part 10. Hence, as the second carriage motor 11 is driving the tool holder drive part 10 movement hereof is transferred to the tool holder carriage 9 which thereby moves in the Y direction.

The tool holder drive part 10 may as the first carriage transmission part 5 be implemented in various ways as described above. The second carriage motor 11 may be a servo or stepper motor as described above with reference to the first carriage motor 8. As indicated, the movement of the carriage 7 in the X direction may be facilitated from the carriage 7 e.g. if the second carriage transmission part 6 is a pinion control by a motor in the carriage 7, the pinion engages with e.g. a toothed rack in or on the frame profile.

The tool holder carriage 9 may comprise carriage fastening points 29 facilitating releasably fastening the tool holder 12. These carriage fastening points 29 may either be implemented as recesses 29*a* or protrusions 29*b* or something third, matching the tool holder fastening points 30 (see FIG. 5*b*). The main function of the carriage fastening points 29 is to facilitate a releasably mounting of the tool holder 12 on the tool holder carriage 9. Using recesses 29*a* or protrusions 29*b* the mounting of the tool holder 12 can be made without tool simply by sliding the tool holder 12 fastening points 30 over the carriage fastening points 29 and letting gravity keep the two together.

Figure 5:
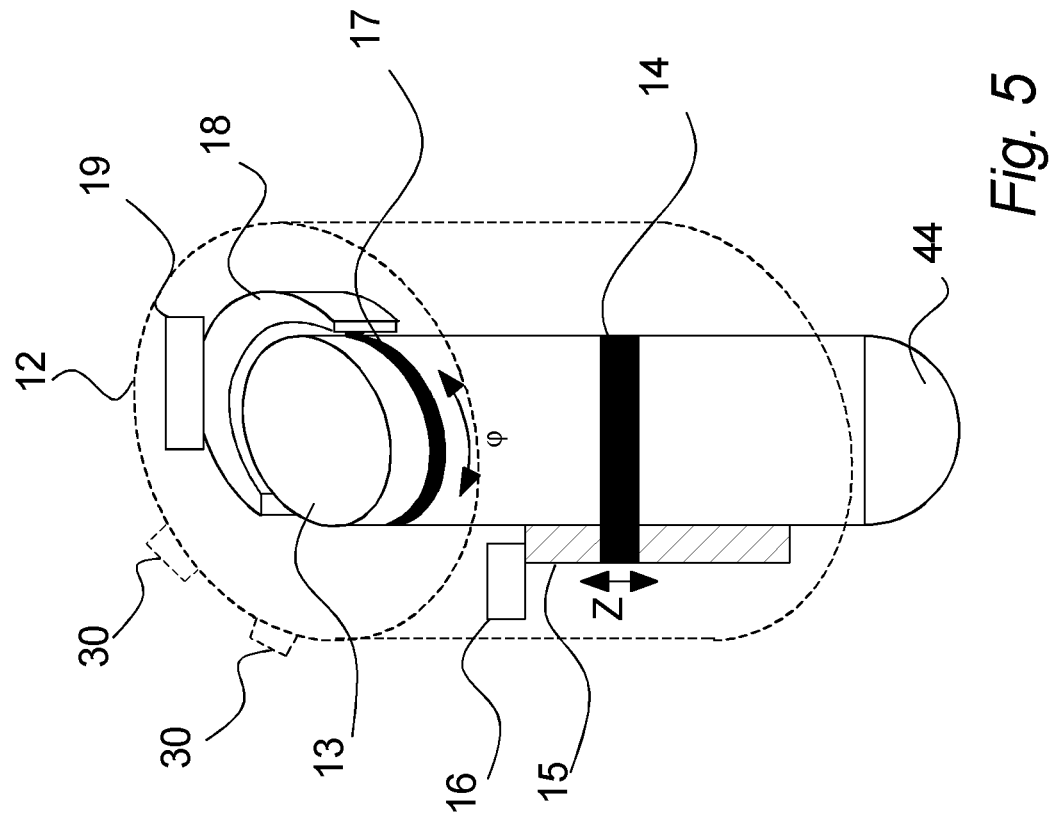
FIG. 5 illustrates a tool holder.

FIG. 5 illustrates a tool holder 12 according to an embodiment of the invention. As indicated, the tool holder 12 comprises tool holder fastening points 30 allowing releasably mounting to the tool holder carriage 9. In a preferred embodiment, the tool holder 12 comprises a first tool drive 15 controlled by first tool displacement means 16 and a second tool drive 18 controlled by second tool displacement means 19. A power cutter 13 is connected to the first a second tool drive 15, 18 and thereby controllable in the Z and φ directions by means of the first and second tool displacement means 16, 19.

The connection between the power cutter 13 and the first and second tool drive is preferably provided by one or more tool adaptors 14. The tool adaptor 14 facilitates releasably mounting one or more different power cutter 13 to the first and second tool drives 15, 18. It should be mentioned, that a second tool adaptor 17 may be necessary for releasably mounting the power tool 13 to the second tool drive 18.

On FIG. 5, the fastening is illustrated with two tool adaptors 14, 17 connected to each of the tool drives 15, 18. It is not important how the power cutter 13 is connected to the tool drives 15, 18 as long as the connection facilitates replacing or at least releasing the power cutter 13 from the tool holder 12. As mentioned only one adaptor may facilitates a connection that facilitates movement of the power cutter 13 in both the Z and φ direction.

Preferably, the tool holder 12 also comprises an adaptor for a vacuum cleaner (not illustrated) so that when a vacuum cleaner is mounted it facilitates sucking dust from the cutting operations.

The first tool displacement means 16 controlling the change of position of the power cutter in the Z direction can be implemented in various ways. A preferred implementation of the first tool displacement means 16 is illustrated in FIG. 6*a*. Here a first tool motor 16 is controlling a first tool drive 15 e.g. implemented as a spindle or threaded rod. Both the first tool motor 16 and the first tool drive 15 are located in the tool holder 12.

In an alternative embodiment illustrated on FIG. 6*b*, the change of position of the power cutter 13 in the Z direction can be implemented by regulating the carriage 7 in the Z direction. This can be done e.g. by implementing a first tool motor 16 in the first end of the carriage 7 and another first tool motor (not illustrated) in the other end of the carriage 7. The two first tool motors 16 may then each control one first tool drive 15. A preferred implementation of the first tool drives 15 would in this embodiment be as spindles. Hence, according to this embodiment, a first tool motor 16 would control a first tool drive 15 in one end of the carriage 7. A similar arrangement would be required in the second end of the carriage 7 (not illustrated). The first tool drives 15 would preferably be releasably attached to the carriage bearings 26 of two parallel frame profiles 2*a*-2*d*.

It should be mentioned, that the first tool motors 16 may also be movably mounted in the frame profiles 2*a*-2*d*, however this implementation would require that the motors are moving with the carriage 7 i.e. a relatively complicated implementation compared to other ways of facilitating a change of position of the power cutter 13 in the Z direction.

It should further be mentioned, that only one first tool motor 16 could be used to control the two first tool drives 15 if the two first tool drives 15 are mechanically connected with the motor 16 by means of e.g. a belt or chain.

Yet an alternative implementation (not illustrated) facilitating movement of the power cutter 13 in the Z direction would be controlling a first tool drive 15 located in the tool holder by e.g. a belt or chain. The movement of the first tool drive 15 and thereby the power cutter in the Z direction is in this implementation controlled by a first tool motor 16. The first tool motor 16 in this embodiment is preferably located in the carriage 7.

Accordingly, the first tool drive may be a motor located in the center of the axis of rotation or outside. If located outside the center of rotation, the rotation may be facilitated by one or more belt and pullies or compensated for in the software when controlling the movement of the tool.

The movement of the power cutter around the Z axis (also referred to as orientation φ an angle around the Z direction) is preferably provided in the tool holder 12 as illustrated in FIG. 6*a*. The power cutter 13 is preferably in the tool holder 12 in addition to the releasably mounting to the first tool drive 15 also releasably mounted to a second tool drive 18. The second tool drive 18 is in this embodiment implemented as a bearing or part of a bearing having one part fixed to the tool holder 12 and one part releasably mounted to the power cutter 13. Accordingly, when a second tool motor 19 applies a force the movable part of the second tool drive 18, the movable part of the second tool drive 18 facilitates rotation of the power cutter 13 in the angle φ.

As described above with respect to movement of the power cutter 13 in the direction of the Z axis, the rotation in an angle φ around the Z axis can also be implemented a mechanical connection e.g. using a belt or chain connecting the second tool motor 19 and the second tool drive 18. Hence the second tool motor 19 may be located in the carriage 7 driving e.g. a belt which via rollers or bearing are connected to the second tool drive 18 thereby facilitating movement of the power cutter in an angle cp.

The movement of the power cutter 13 in the angle φ via belt or chain as described above is illustrated in FIGS. 6*c* and 6*d*.

FIG. 6*c* illustrates an embodiment where movement in the Z direction is controlled from the tool holder 12 and the orientation in angle φ is controlled via the second tool motor 19 and second tool drive 18 in the form of e.g. a belt drive.

FIG. 6*d* illustrates an embodiment of the invention where both the movement of the of the power cutter 13 in the Z direction and the orientation hereof in the angle φ around the Z direction is facilitated by motors located outside the tool holder 12. In the embodiment illustrated in FIG. 6*d*, the movement in the Z direction is established as described in relation to FIG. 6*b* i.e. by changing position of the carriage 7 in the Z direction. The orientation of the power cutter 13 in the angle φ is in this embodiment implemented as described in relation to FIG. 6*c* i.e. via a belt or chain 18 driven be a motor 19 located in the carriage 7

The power cutter 13 is a standard handheld power cutter which when not mounted in the panel cutter 1 can be used for standard handheld power cutting. In this context, the term "power cutter" should be understood as an angle grinder, circular saw, jigsaw or other type of handheld cutting device. The power cutter 13 comprises a "cutter tool" 44 in the form of e.g. a saw blade, grinder blade, jigsaw blade or any other kind of cutting tool for attachment to a power cutter 13 and thereby facilitating cut or saw of a material by conducting a circulating, oscillating or reciprocating motion.

The power cutter 13 is preferably mounted so that its longitudinal axis is convergent with the Z axis of the Cartesian coordinate system.

Electric connections are established between the controller 20, the motors 8, 11, 16, 19, vacuum cleaner, sensors, etc. The control of the movement of the carriage 7, tool holder 12 and power tool 13 is preferably regulated by control of power to the motors 8, 11, 16 and 19. In addition, end stop switches may be used at least for ensuring stopping movement for safety reasons. Encoders may be used in the control of the motors 8, 11, 16, 19 to determine the "length" of movement in a certain direction by translation of revolutions of the motor axis and/or tool drive and/or transmission part to a coordinate in the Cartesian coordinate system or vice versa.

The electric components of the panel cutter 1 i.e. contactors, sensors, sockets (for power tool, vacuum cleaner, etc.), etc. is as far as possible gathered in or attached to an enclosure suitable for encapsulating electric components and protecting it from the dusty and sometimes also wet environment. Accordingly, since all/most electric connections to motors would origin from this enclosure, it is preferred that the power supply for the hole panel cutter 1 is connected to this enclosure. The power supply is in an embodiment the 230V obtained from power supply cables 52 connecting the panel cutter 1 to the utility grid 50 but it could also be an energy storage 49 in the form of one or more batteries.

The controller 20 is preferably a standard industrial programmable logic controller programmable with control software enabling the control of the motors/displacement means 8, 11, 16, 19, vacuum cleaner and power cutter 13. The vacuum cleaner may be powered when the power tool is started, this can be detected by monitoring power consumption of the power cutter 13 or it can be running continuously if desired. Preferably, the vacuum cleaner is powered from a plug controllable by the controller 20 similar to the powering of the power cutter. Thereby, the vacuum cleaner is controllable from the controller. Alternatively, the controller may control the vacuum cleaner via a Bluetooth connection, this is especially advantageous if the vacuum cleaner is powered by batteries.

The power cutter 13 may be powered when a user has initiated a cutting operation. Preferably, the controller 20 is controlling the power supply to the power cutter 13 via a relay. The relay controls power to a power socket 48 located on the panel cutter 1, to which the plug of the power cutter 13 (and vacuum cleaner) is connected. In this way, when the controller 20 powers up the power socket 48, power is supplied to the power cutter 13 which is then turned on. As one can understand, the embedded power switch normally turning the power cutter 13 on is in its on position when the power cutter 13 is mounted in the tool holder 12 for this way of turning on and off the power cutter is possible. The same is true for the power switch of the vacuum cleaner. The power socket may also be located e.g. on the control box and powering the power cutter 13 via an extension cord.

Alternatively, the panel cutter 1 comprises a button actuator arranged to mechanically engage a power button on the power cutter 13. Actively engaging the power button of the power cutter with a button actuator is advantageous in that the power cutter is then only activated when it is needed. Furthermore, such a button actuator can relatively easily be provided with a return mechanism ensuring that the button actuator will automatically retract in case of a power outage. This is advantageous in that locking the power button in an always-on state can be problematic in relation to certain rules or laws especially concerning safety.

Depending on the instructions provided by the user for where on the board 42 the cut has to be made, the controller 20 then controls the motors 8, 11, 16, 19 and thereby the movement of the power cutter 13 in the X, Y, Z and φ directions as described above. As can be understood this control includes operation of more than one motor at the time to be able to perform a slanting cut i.e. one definition of automated is that e.g. the motors controlling the movement of the power cutter in the X and Y direction are operated simultaneously. The speed of the individual motors is not necessarily the same, the speed depends e.g. of the inclination of a slanting cut.

It should be mentioned that the controller 20 may also be a cloud-based controller i.e. the panel cutter 1 does not have a physical controller. In this embodiment, the user communicates wirelessly with the cloud-based controller which again communicate wirelessly with the power cutter 1. This is advantageous in that then it is easy to update the control software on the panel cutters, however it requires a stabile wireless (internet) connection to operate the panel cutter 1.

The position of the power cutter 13 can be determined by measure the position of the carriage 7 and tool holder 12 on the support frame 3 via sensors. In this way, for each of the four axis, the end position is registered by a sensor and from these registrations and movements detected e.g. by encoders, the controller 20 is able to determine the position of the carriage 7, tool holder 12 and thereby of the power tool 13. Hence calibration in this embodiment is adjusting the end sensors so that they are precise aligned with a desired position of the inner support area 4.

The controller 20 receives input from a user via a user interface. The input relates to size and geometry of the board that is needed i.e. that is cut from the board 42. Hence, e.g. on a wall or floor to be built, from a drawing, etc. the user establishes measures of geometry of a board needed to cover a specific area. These measures preferably include one of the following length right side, length left side, length top and length bottom. When one or more of these measures are established, they are provided to the controller 20 via the user interface. The controller 20, based on the received input, then controls the motors 8, 11, 16, 19 and thereby the position and orientation of the power cutter 13 and powers on the power cutter 13 to cut a board complying with the established measures.

The user interface may be implemented as a screen or display via which the user can provide the established measures to the controller 20. The measures may be provided to the controller 20 via predetermined templates prepared for receiving particular measures in a particular sequence.

The user interface may be part of the panel cutter 1 or may be a portable user device 39 communicating with the controller 20 via a wireless communication channel 38. The portable user device 39 may be a tablet or a smartphone having appropriate software for receiving and communicating the measures from the user to the controller 20. If a smartphone is used for communication with the power cutter 1, the measures may be inputted via voice commands that is translated to software code machine readable language in the smartphone prior to communicating with the controller 20 or audio files may be sent to the controller 20 for the translation.

In an exemplary embodiment, a reference to a portable automated panel cutter 1 is a reference to a machinery that does not comprise a power cutter 13 i.e. the contrary to a standard CNC cutter. The power cutter 13 is a stand-alone operable tool that can be used to cut also when not mounted in the panel cutter and the tool holder 12 of the portable automated panel cutter 1 is designed to fit to and hold the power cutter 13. When mounting the tool holder 12 in the tool holder carriage 9, the power cutter 13 is mounted to the machinery/frame and the portable automated panel cutter 1 is able to cut a board to be cut 42. This is, in contrary to a CNC cutter done by moving the power cutter 13 including the motor driving the cutting tool 44 together with the cutting tool 44 when cutting the board to be cut 42.

In an exemplary embodiment, when a power cutter 13 is mounted in the automated panel cutter 1, the tool holder 12 (or indirectly the carriage 7) facilitates moving the complete power cutter 13 including cutting tool 44 and motor driving it both in the Z-direction and around the Z-direction i.e. the angle of rotation φ. Hence, the cutting tool 44 is able to be moved from front of board to be cut 42 towards the back of the board to be cut 42. In addition, the cutting tool 44 is able to be moved in an angle φ around the Z-axis. Such movement around the Z-axis (in combination with movement in the X and Y directions) ensures that the cutting tool in the form of a rotating (in the Z plane) or reciprocating blade can cut straight cuts in any angle and it distinguishes the present portable automated panel cutter 1 from known portable tools having a frame and a power tool in the form of a milling cutter.

The present portable automated panel cutter 1 distinguishes from known portable milling cutters in that these milling cutters does not need to be able to turn the cutting tool in this case the milling tool around the Z axis. This leads to a reduced complexity in control of the movement of the cutting tool and thereby of the power tool in that it only has to be moved in the X, Y and Z directions. However, compared to the use of a rotating (in the Z plane) cutting tool such as a saw blade, a milling tool (used as cutting tool) is slower to perform cutting operation and typically, the waste of the board to be cut would be larger (obviously depending on the diameter of the milling tool) and the milling tool is typically more expensive than a saw blade.

The angle is at least 180 degrees to facilitate complete freedom in cutting directions φ around the Z-axis. This is at least true in the embodiment, where the power tool is only allowed to cut from top of the board to be cut i.e. from the top frame profile 2a towards the bottom profile 2b. This direction of cutting is advantageous in that it ensures that the board to be cut is not lifting from the board support but instead is pushed by the cutting tool towards the board guide/bottom profile and thereby the cutting direction helps fixating the board to be cut.

In the embodiment, where the power tool is also allowed to cut towards the top profile, however this may require additional flexibility in the rotation around the Z-axis i.e. freedom above 180 degrees of movement up to 270 degrees.

In an exemplary embodiment, the portable automated panel cutter 1 is equipped with means for indicating that a board to be cut 42 is correct positioned on the board support 21 and thereby that the portable automated panel cutter 1 is ready to cut. Such means can be implemented as a button the user loading the panel cutter 1 with the board to be cut can push when done. Alternatively, such means can be implemented as one or more sensors positioned in the support frame 3. In any case, the means provides a "load" signal to the controller 20 which upon receiving the load signal allows the user to initiate a cutting.

In an exemplary embodiment, the inner support area 4 is at least partly covered by an offering board 58 or simply referred to as board. Preferably, at least the part of the inner support area 4 over which the power cutter can 13 cut a board to be cut 42 is covered by a board 58. This is because when cutting a board to be cut 42 positioned on top of a board 58 a minimum of dust will spread in the area around the panel cutter 1 originating from the side of the board to be cut 42 facing towards board 58. The dust originating from the side of the board to be cut 42 facing up and away from the board 58 is removed by suction from a vacuum cleaner a suction end of which mounted on the panel cutter 1/tool holder 12. The board 58 can be of the same type as the board to be cut 42.

In an exemplary embodiment, the board 58 may rest on one or more recesses of one or more of the frame profiles 2. Alternatively, the board 58 may rest on one or more recesses of one or more board guides 25. It should be mentioned that in embodiments where the cutting tool 44 is circular the board guides 25 are necessary on at least part of the two sides of the board to be cut 42. Preferably the board to be cut 42 is positioned against one of the ends and the bottom e.g. positioned against the left and bottom i.e. third and second frame parts denoted 2c and 2b to be able to cut to the edge of the board to be cut 42. This is because at least sometimes, for a circular cutting tool to be able to cut a board to be cut 42 completely through, one part of the circular cutting tool 44 would have to be moved outside the area of the board to be cut 42 i.e. passing the edge of the board 58. Hence, if no spacing arrangement such as a board guide 25 was present, the circular cutting tool 44 would cut into a frame part or cut into the open air which is not allowed due to safety. Further, dust from the cutting operation would not be as efficiently sucked away from the cutting tool which would have a negative impact on environment.

This is illustrated on FIG. 7. FIG. 7 also illustrates an exemplary embodiment where the cutting tool 44 is cutting the board to be cut 42 from the side facing away from the power tool 13 towards the side facing power tool 13. This means that in this exemplary embodiment the front of the board to be cut 42 is facing away from the power tool 13 and is left with the sharpest cutting edge whereas the back side of the board to be cut 42 facing the power tool risks being left with rough edges and thereby a less acceptable finish of the cut. This is particularly relevant if the board to be cut 42 is tiles but also gypsum boards and other types of boards. As mentioned, a board to be cut can be cut with either sides facing upwards. But if e.g. a square is to be cut by a circular cutting tool, the combination of rotation of the cutting tool and the orientation of the board to be cut having it front side facing downwards the offering board as illustrated on FIG. 7 ensures that the square including edges of the cutting is sharp and precise. Looking at the square from the back side of the board to be cut, the cutting tool would have removed additional material from the board to be cut, leaving additional work related to e.g. spackle of the square to obtain a satisfying finish of the square cut. This also servs to illustrate the "0" position in the Z-direction, which is preferably in plane with the upper side of the board to be cut.

No matter type of board, the board to be cut is held down against the board by the tool holder 12, more precisely by a protection cover for the cutting tool. This protection cover is spring loaded and would therefore push the board downwards. More specific, when the power tool is moving towards the board to be cut, the first contact is between the protection cover and the board to be cut. Then the downward movement (in Z-direction) continues and contact between the cutting tool and the board to be cut is established and the cutting tool starts to cut. When the cut is done and the power tool is moved up (in Z-direction), first the cutting tool loses contact with the board to be cut and do to the spring loaded protection cover, the protection cover remains in contact with the board to be cut for a certain distance of movement before contact is lost between the protection cover and the board to be cut and the protection cover, due to the spring, is completely closed.

Further, in an exemplary embodiment, if a cutting operation comprise several cuttings, or if several users are instructing the automated panel cutter 1 to cut, the controller 20 may give priority to each of the cuts. The priority of the cuttings may be based on or combined with layout or sequence of the cuttings so as to reduce the number of smaller cutting offs that may fall down from the frame, optimize lay out of cuttings to use the board to be cut optima, reduce the load from cutting offs on the remaining part of the board to be cut 42/on the cutting tool 44, etc.

In an exemplary embodiment, the cutting tool 44 of the power cutter 13 is by the first tool drive 15 moved to the same predetermined position in the Z direction. Therefore, no matter the thickness of the board to be cut 42, the panel cutter 1 will control the first tool drive 15 so as to positioning the cutting tool 44 in the same Z-axis level when cutting. Hence, no adjustments to the Z-axis are needed from the user if a thicker/thinner board 42 it to be cut. This possible with respect to safety due in that the protection cover surrounding the cutting tool is closed also from the plane facing the board to be cut. Only an opening wide enough for the cutting tool to pass is provided in the protection cover so as to allow the cutting tool to cut the board to be cut when moved towards it.

In an exemplary embodiment the thickness of the board to be cut is provided to the controller for the controller to be able to calculate the upper surface of the board to be cut. The lower surface is known as the plane on which the board to be cut is resting. The upper surface can be calculated if information of the thickness of the board to be cut is provided. If the protection cover is not closed in the plane facing downwards, the controller first start operation of the cutting tool when distance between the cutting tool and the upper surface of the board to be cut is so small that no fingers can pass. Such distance could e.g. be less than 7 millimeters, preferably less than 5 or 4 millimeters.

In an exemplary embodiment of the invention, the tool holder carriage 9 extents along both the X-axis and the Z-axis and is illustrated on FIG. 8. On the part extending along the Z-axis, the tool holder carriage 9 may by equipped with one or more protruding or recess carriage fastening points 29. These matches with corresponding protruding or recesses on the tool holder 12 so than gravity helps fixing the tool holder 12 on the tool holder carriage 9, at least when the support frame 3 leans backwards. In addition, the part extending along the X-axis is equipped with one or more quick lock receivers 53. The one or more quick lock receivers 53 are adapted to receive associated quick locks 54, which when turned is locking the tool holder 12 in the position defined by the matching pairs of carriage fastening points 29 and tool holder fastening points 30. The interconnection of tool holder carriage fastening points 29 and tool holder fastening point 30 and of quick lock receivers of the tool holder carriage and quick locks 54 of the tool holder is illustrated with stipulated lines without other parts of the tool holder to simplify the illustration.

It should be mentioned, that the transmission parts mentioned in his document, may be implemented as so-called line drives or line actuators i.e. an aluminum profile with embedded drive and belts for moving an object attached thereto.

The portable automated power cutter is dynamic in the sense that two subsequent cuts are different from each other. This is at least true for the majority of cuttings.

As found from the above, the present invention relates to a panel cutter 1. The panel cutter 1 is automated, which should be understood as being able to cut a board 42 without the help of a user i.e. being able to move a power cutter 13 along the X and Y axes simultaneously. With this said, the user may be needed to load and unload the board to the panel cutter and provide measures for the cutting of the board. The loading and unloading is done in an ergonomic optimal position to protect health of the user as much as possible. The panel cutter 1 is portable, which should be understood as being able to move by hand. To facilitate this, the panel cutter 1 can be dismantled preferably in the following parts: frame parts 2, carriage 7, tool holder 12 and board support 21. These parts can be moved in bags by a user complying with rules relating to working environment i.e. the weight of the individual parts is below 15-20 kg.

The panel cutter 1 does not include a power cutter 13/cutting tool 44 but it facilitates a releasably mounting of a power tool 13 comprising a cutter tool 44. The power cutter 13 can be operated by hand when not mounted to the panel cutter 1 i.e. the power cutter 13 is a standalone power tool having own motor, drive train, cutting tool, etc.

It should be mentioned that the figures disclose several embodiments of the present invention but features of the figures are not limited to a particular embodiment. Hence, features of one figure can be used on an embodiment of another figure.

Description of Portable Automated Panel Cutter Upright Support Frame

FIG. 9 illustrates dissembled parts of a portable automated panel cutter support frame 103. The panel cutter support frame 103 is portable meaning that it can be packed away e.g. in bags when not in use. Accordingly, the panel cutter support frame 103 is advantageous in that when it is not in used it can literally be stored on a shelf at a workshop or similar. When needed again it is easy to carry the dismantled panel cutter support frame 103 to the site where it is needed. Further, craftsmen such as carpenter and bricklayers are often carrying a lot of building materials during the day. To protect their body, they are advised not to carry more than 14-20 kg at the time. Therefore, the panel cutter support frame 103 of the present invention is advantageous in that it can be dismantled in various parts which does not exceed the recommended weight.

The panel cutter support frame 103 is built from four frame profiles 102a-102d as illustrated on FIG. 9. When the support frame 103 is in its upright position, the first frame profile 102a is referred to as the top profile, the second frame profile 102b is referred to as the bottom profile, the third frame profile 102c is referred to as the left profile and the fourth profile 102d is referred to as the right profile. Hence, the top 102a and bottom 102b profiles are parallel extending their longitudinal axes in the first direction referred to as the X direction. These are spaced by the paralleled transvers left 102c and right 102d profiles extending their longitudinal axes in the second direction referred to as the Y direction. Note, that the first and second profiles 102a, 102b may extend in length so that they cover the ends of the third and fourth profiles 102c, 102d i.e. opposite to what is illustrated on FIG. 9.

The support frame 103 of FIG. 9 further comprises board support 121 at least partly covering the inner support area 104. The board support 121 is releasably mounted on board support fixations 123. The board support 121 facilitates support of the board 142 to be cut. Further, the board support 121 facilitates support for a board guide 125 ensuring that the board 142 is positioned correct in the inner support area for the panel cutter 101 to cut the board 142.

At least the top frame profile 102a comprises first longitudinal opening 145 which facilitates access to a first carriage transmission part 105. The transmission part 105 facilitates a releasably mounting of a carriage 107 to the support frame 103, in fact the transmission part 105 facilitates moving the carriage 107 along the X direction i.e. parallel to the top frame profile 102a. Further, the first longitudinal opening 145 facilitates access to a first carriage bearing 126. The first carriage bearing 126 facilitates a releasably mounting of a carriage 17 to the support frame 13. The first carriage bearing 126 is not mandatory, even though it is preferred in that it helps carrying the weight of the carriage 107 when releasably mounted to the support frame 103.

In the embodiment illustrated on FIG. 9, the top frame profiled 102a may also comprises a second longitudinal opening (not illustrated) which may facilitate access to the first carriage bearing 126.

FIG. 9 illustrates only one opening 145 on the first side of the first frame profile 102a. The second opening is not illustrated. A cross-sectional view of the top profile 102a made at the line A is illustrated on FIG. 12. It should be mentioned, that if both openings are used, one of these openings could be on a second side of the top profile 102a. This is especially true in an embodiment where the support frame 103 is in an upright position, then the downward force applied to the weight carrying carriage bearing 126 and mounting hereof would be downward against the point of contact between the bearing 126 and support frame 103 instead of a point of contract between the bearing 126 and the side of the second opening. With this said, the bearing 126 may be designed having a spherical form distributing the force applied from the carriage 107 to the bearing equally independent of the position of the support frame 103.

FIG. 12 illustrates as mentioned a cross-sectional view of the top profile 102a and thereby of the releasably mounting of the carriage 107. As is illustrated, that the longitudinal opening 145 may give access to the entire inner volume of the top profile 102a or as indicated by the stipulated line, only to an enclosure comprising the first carriage transmission part 105 and motor 108 for driving it. The first carriage transmission part 105 comprises a drive preferably in the form of a belt, spindle or toothed rack/belt and an attachment/slide to this drive that facilitates removably mounting of the second carriage transmission part 106 of the carriage 107. Thereby, together at least partly facilitating the releasably mounting of carriage 107 to the support frame 103.

FIG. 12 further illustrates that the first carriage bearing 126 is movably mounted in the inner volume of the top profile 102a and accessible via the first opening 145. The first carriage bearing 126 may rest on a rail formed according to the geometry of the bearing 126. Preferably the form of the bearing 126 is spherical to reduce importance of angle θ of an upright support frame. The first carriage bearing 126 facilitates removably mounting of the second carriage bearing 141 and thereby together with the first and second transmission part 105, 106 facilitates the complete releasably mounting of the carriage 107 to the top profile 102a.

It should be noted, that it may be advantageous to equip the bottom profile 102b with one or both of the openings including transmission and/or bearing parts. In the embodiment where one or more of these are implemented this can be done as described above in relation to the top profile 102a.

More specifically, in an embodiment, the first carriage transmission drive 105 can be implemented as a portal axis drive with internal guide and toothed belt i.e. a stepper motor driving a toothed belt to which a slide is clamped. The slide then facilitates a releasably mounting of the carriage 107 to the frame 103 e.g. by means of pins and thread and/or a clamping lever arm, thumbscrews, etc. Even though illustrated on the figures, it should be stressed that the need for a bearing 126 supporting the transmission part 105 depends on the design of the frame 103/carriage 107. Accordingly, the carriage 107 can be both moved and lifted solely by the transmission part 105 i.e. the first carriage bearing 126 and/or second carriage bearing illustrated on FIGS. 9, 10, and 11 are optional.

An example of a design which in most cases would make the first carriage bearings 126 and the second carriage bearing (not illustrated) superfluous is if both the first and second frame profiles 102a, 102b includes a transmission part. An opening for attaching the carriage 107 to the second frame profile 102b is illustrated by the stipulated line on FIG. 10. In this embodiment the second frame profile 102b as the first frame profile 102a includes a transmission part 105 as described above.

As mentioned, the support frame 103 is part of a portable automated panel cutter 101. Hence, attachable to the support frame 103 is a carriage 107 and attachable to a tool holder carriage of the carriage 107 is a tool holder 112. Finally, attachable to the tool holder 112 is a power cutter 113. A controller 120 is controlling the operation of the panel cutter 101 via input data received from a user. A user can be any person that needs to cut material. Carpenters and bricklayers are examples of persons that during a working day are cutting a lot of boards 142 and hence would benefit from an automation of their cutting processes. Hence, in this context the term "panel cutter" should be understood as a machine for cutting or sawing sheets into predetermined dimensions and/or numbers e.g. on a horizontal plane, slanted plane or vertical plane. An example of such panel cutter 101 is illustrated on FIG. 10

The panel cutter 101 illustrated on FIG. 10 includes a diagonal support 146 which when mounted increases the stiffness/rigidness of the support frame 103. Further, the diagonal support 146 may be used as board support 121 even though board support in the form of slats are illustrated on FIG. 10, they can be replaced by board support in the form of a board resting on the diagonal support 146 and preferably also on one or more board support fixations 123. In this way, the mounting of the support frame can be made faster.

In a preferred embodiment of the invention, the top profile 102a is a hollow aluminium profile as illustrated on FIG. 11. Embedded in the hollow top profile 102a is a first carriage transmission part 105 implemented as a linear belt drive to which a second carriage transmission part 106 of the carriage 107 can be removably mounted. The connection between the first and second carriage transmission parts 105, 106 is made through a longitudinal opening 145 in the top profile 102a. Thereby, movement of the linear belt drive is transferred to movement of the carriage 107 in the X direction. Preferably the line drive includes a first carriage motor 108 also embedded in the top profile 102*a* which is controlled by the controller 120. The motor 108 is preferably a servo or stepper motor dimensioned to be able to move the weight of the carriage 107 along the X direction.

In this document, a board 142 to be cut by the portable automated power cutter 101 should be understood widely including any kind of lumber that can be cut by a power cutter as described below. Further, a board in this document also includes other materials than lumber, hence a board 142 should be understood as any of the following materials plywood, chipboard, gypsum, medium-density fibreboard, concrete, (precast) masonry, clinker, steel, fiber-cement board, etc.

The releasable connection between the first carriage transmission part 105 and the second carriage transmission part 106 may in an embodiment be facilitated by a connection between threated/screw parts or clamping/lever arms suitable for connection between the slide of the portal axis toothed belt drive and the second carriage transmission part 106. In the embodiment, where the second profile 102*b* is also equipped with a transmission part 122, the connection between carriage 107 and second profile 102*b* is preferably identical to the connection between the first profile 102*a* and the carriage 107.

The first transmission part 105 may also be implemented as a toothed rack, a chain drive, a spindle or similar. Although it is preferred to embed the motor 108 and the first transmission part 105 inside the profile, the motor 8 and first transmission part 105 may be located outside the top frame profile 102*a*. In the alternative embodiment where the first transmission part 105 is implemented as a toothed rack, the second transmission part 106 is a pinion that is controlled by a motor located inside (or outside) the carriage.

Accordingly, the drives facilitating movement of the power cutter 113 in the X, Y, Z and φ direction in a three-dimensional cartesian space could be implemented as rack and pinion mechanism, gear mechanism, pulley system, actuators, belt drive/system, motors or other type of automated displacer for moving the power cutter.

No matter if the panel cutter 101 is used in a horizontal or an upright position it is preferred that the top profile 102*a* preferably also comprises a first carriage bearing 126 releasable mountable to a first carriage bearing receiver 140 of the carriage 107. The first carriage bearing 126 and the first carriage bearing receiver 140 is connected through the second longitudinal opening 146 in the top profile 102*a*. In this way the weight of the carriage 107 can be distributed as desired between the first carriage transmission part 106 and the first bearing receiver 140. The first carriage bearing 126 is preferably running as friction less as possible in a recess/opening 146 in the top profile 102*a*.

It should be mentioned that the bottom profile 102*b* may also include a drive and/or a bearing as the top profile 102*a* if it is considered necessary (not illustrated). A third carriage transmission part may be implemented in the bottom profile as described above with reference to the first transmission part. Similarly, a second carriage bearing may be implemented in the bottom profile as described above with reference to the first bearing transmission part. Hence, if transmission and bearing is part of the bottom frame profile, the carriage comprises a fourth carriage transmission part of releasably mount the carriage to the third carriage transmission part and second carriage bearing receiver releasably mounting the carriage to the second carriage bearing. Having transmission and/or bearing in or at the bottom frame is advantages in that it is possible to control movement of both ends of the carriage. This leads to two minor line drives instead of one larger and a more aligned movement of both ends of the carriage in the Y direction when the carriage is moved in the X direction.

As discussed, the ends of the frame profiles 102 are releasably mounted. FIG. 13 illustrated an example of such releasable connection. Beside the mechanical releasable lock 135, the connections may also include steering's that positions the two frame profiles in the correct position prior to the releasably locking the two together. An example of such steering is that an end of a first profile includes steering pins 133 and an end of an adjacent profile includes a hole plate 134. When the pins 133 are in the holes of the hole plate 134, the connection of the two profiles are positioned correct and they can be locked/mounted in this position. Alternatively, part of the ends of the profiles may have opposite geometric contours that fits together so that they only can be positioned correct in one way and then subsequent to the positioning the two ends can be locked by a lock 135.

The lock 135 may be one kind of a pivotable lever arm fastener that is easy to pivot and lock by hand. The lock 135 may comprise some kind of pin which on FIG. 13 is engaging a hole plate 134 of the end of one opposite frame profile of that frame profile to which the lock is mounted. The locking may also be provided by friction e.g. a lever arm fastener may comprise some kind of projection that can be forced into a recess in the opposite frame profile by pivoting or tightening the lock 135. Other alternatives to locking the two frame profiles together also exists e.g. by use of thumbscrews.

The releasable mounting of the ends of two profiles can be made without steering. In any case, the mounting can be made by use of a tool or by hand. If the mounting requires a tool it is typically because the mounting required tightening a nut or bolt. If the mounting can be done by hand it is typically because the locking mechanism includes some kind of lever arm fasteners.

As mentioned, the frame profiles 102 are intended to be used again and again as part of the panel cutter 101. Therefore, it is preferred that the material used for the frame profiles 102 does not wear out as fast as e.g. the board support 121. Further, it is also the reason why the panel cutter 101 does not cut in the frame profiles 102 as will be explained below. The material also needs a sufficient strength to carry the carriage 107. Therefore, aluminum is a preferred material in that it complies with requirements to strength, wear and since it is widely used in many industries the price is also acceptable. Alternative materials could include carbon and steel.

As mentioned, that support frame 103 is established by connecting four frame profiles (102*a*, 102*b*, 102*c*, 102*d*). The panel cutter 101 can be operated both in a horizontal position laying on a support such as a table and in an upright position that is close to but not completely vertical. In the upright position, the support frame 103 needs to have an inclination from vertical that facilitates resting of the board 142 on the board support 121 of the support frame 103 without being fixed thereto. It is possible to fixate the board 142, however this is not required nor preferred in that it takes time.

The preferred position of the support frame 103 when the panel cutter 101 is in operation is in an upright position at least 10 degrees from vertical (this angle is in this document referred to as theta θ). This is because the handling of boards 142 to be cut is easier if they can be placed on/removed from the support frame 103 in the same orientation as lifted which are typically in an orientation close to vertical. A further advantage in positioning the support frame 103 in an upright position is that gravity helps positioning/fixing the board 142 at a desired location with reference to the frame which will be explained below. FIG. 15 illustrates an embodiment where the panel cutter 101 is positioned upright supported against a wagon which are typically used for transporting and storing gypsum boards. Other ways of supporting the frame 103 such as a wall, a table, etc. could also be used.

Accordingly, the support frame 103 defines a plan that mathematically can be referred to as the X-Y plane. Perpendicular, to this X-Y plane is the Z plane which is referred to as the third direction. Finally, a rotation around the Z plane is in this document referred to as a fourth direction i.e. movement in the fourth direction is referred to as an orientation in the angle Phi φ around the Z plane. Summing up, the support frame 103 defines an inner support area 104 which no matter the inclination angle θ of the support frame 103 is always in the X-Y plane. The maximum dimensions of the inner support area 104 is preferably 300 cm in length times 200 cm in wide. These measures in length and with complies with standard measures of most types of lumber boards examples of which are 120×90 [cm] or 240×90 [cm]. The height of the panel cutter 101 when the carriage 107 is mounted to the support frame 103 is less than 50 cm.

This inner support area 104 is as mentioned at least partly covered by board support 121. The board support 121 can be implemented as a plurality of slats extending between either the top and bottom profiles 102a, 102b or the left and right profiles 102c, 102d. This is preferred over diagonal support in that then the slats can be of the same length making it faster to assemble to panel cutter 101. Alternative, the board support 121 can be a board e.g. as the type that has to be cut. The main function of the board support 121 to support the board 142 to be cut so that it remains in the X-Y plane also when the power cutter 113 is cutting and thereby applying a force in the Z direction to the board 142. Therefore, it is preferred if the board support 121 supports the entire board 142.

The board support 121 is releasably mounted to the frame profiles (top/bottom 102a, 102b or left/right 102c, 102d). This mounting is preferably facilitated by a board support fixation 123 in the form of one or more recesses 123a, holes 123b in or projections 123c of at least two opposite frame profiles 102 as illustrated on FIG. 16.

The material of the board support 121 has to be a material in which the cutting edge of the cutting tool 144 of the power cutter 113 is suitable for cutting. This is because when cutting a board 142, it is preferred if the cutting edge of e.g. a cutting disc of the power tool 113 cuts the whole way through the board 142 and thereby it is very hard (at least it cannot be guaranteed) not to cut in the board support 121. Accordingly, the material of the board support 121 should not damage or wear such cutting disc unnecessary. Therefore, one preferred material for the board support 121 is wood another is the material of the board 142 to be cut. Hence if the board 142 to be cut is a plywood board, the board support 121 could also be made of plywood.

Accordingly, the board support 121 is intended to be replace after several cuts in that after several cuts, the board support 121 may lose its function of supporting the board 142 in the X-Y plane. In many situations, since it is only one side of the board support 121 in which cuts are made, the board support 121 can be used in the constructions as the cut board 143 or simply turned around and used on the other side.

One advantage of using a board as board support 121 over using slats is that suction of dust from the cutting operation only needs to be made from the front of the board. Further, if a board is used as board support 121, only a few slats are needed to support this board (if not one or more recesses/protrusions 123 in the frame profiles can be used to support this board). If the board used as board support 121 is of the same material as the board 142 to be cut it do not need to be carried along with the panel cutter 101 to the construction site and thereby the total weight of the panel cutter 101 and foot print when dismantled is reduced.

An embodiment of the support frame 103 using slats as board support 121 is illustrated on FIG. 9. An embodiment of the support frame 103 using slats as support for a board used as board support 121 is illustrated on FIG. 10 and an embodiment of the support frame 103 using a board as board support 121 where the board rests on a projection board support fixation 123 is illustrated on FIG. 14.

The board guide 125 is preferably positioned against the bottom profile 102b and the left profile 102c. The right profile 102d may also be used either together with the bottom profile 102b alone or together with the left profile 102c. The board guide 125 comprises a first guide area 125a guiding the board 142 to a predetermined position along the X direction and a second guide area 125b guiding the board 142 to a predetermined position along the Y direction. The board guide 125 may be implemented as one movable board where the first and second guide areas 125a, 125b meets or as several pieces of material that together guides the board 142 in the X and Y directions.

One function of the board guide 125 is to ensure that boards 142 to be cut are located at a predetermined position in the X-Y plane every time. This is advantageous in that the then controller 120 is able to always use the same point relative to the inner support area 104 as reference point for a particular part of the board 142. In a preferred embodiment, the bottom side of the board 142 is always positioned against the first guide area 125a and the left side of the board 142 is always positioned against the second guide area 125b. Thereby, the bottom left corner of the board -42 is always located at the same positioned relative to the inner support area 104 and that position can therefore be defined in the control software e.g. as X=0 and Y=0 i.e. (0,0).

The position of Z=0 can be determined based on knowledge of distance between top position of the power cutter 113 in the Z direction and position of the board support 121 and the diameter/radius of the cutting tool 144. The angle φ is in "0 degrees" position e.g. positioned to perform a cut parallel to the Y-axis. However, this can be configured from by the control software.

Alternatively, vision systems can be used to define (0,0)/ the location of the board 142 on the board support 121. However, the board guide 125 solves this problem in a simpler way and further it has the second function of ensuring that the power cutter does not cut in the frame profiles 102. This is advantageous in that these frame profiles 102 are part of the panel cutter 101 that can be used many times and therefore they should not be weakened by cuts from the power cutter 113.

The board guide 125 may be held in place on the board support 121 by means of board guide steering's 124. These may be implemented in various forms e.g. as aluminum blocks that is fastened to the frame profiles and corresponding to which recesses are made in the board guide 125. Several other implementations may be used including use of the board support 121.

the board support 125 may also be implemented as individual pieces of material having the same function as the board described in relation to FIG. 14. If individual pieces of material is chosen, at least two pieces are needed along the X direction to facilitate support when the frame is in its upright position. Whereas only one is needed along the Y direction, this is illustrated on FIG. 10.

The part of the board guide engaging with the board may be equipped with protrusions. This is advantageous in that it has the effect, that friction is established between the board and the board support so that when cutting in the board, it is less likely, that the board will slide on the board guide and thereby change position. It should be noted, that similar protrusions can be to the board support to prevent problems of moving boards when cut.

In case the board 142 cannot stand by itself on the support frame 103 it can be fastened by a board fixator 127 as illustrated on FIG. 10. Fixating the board 142 by one or more board fixators 127 may also be necessary in situations where the weight of the board 142 in combination with a cutting speed of a certain speed occurs. To prevent the board 142 from moving in the X direction in such situation, a mechanical stop block/end stop can be mounted.

In an exemplary embodiment, a reference to a portable automated panel cutter 101 is a reference to a machinery that does not comprise a power cutter 113 i.e. the contrary to a standard CNC cutter. The power cutter 113 is a stand-alone tool and the tool holder 112 of the portable automated panel cutter 101 is designed to fit to and hold the power cutter 113. When mounting the tool holder 112 in the tool holder carriage 109, the power cutter 113 is mounted to the machinery and the portable automated panel cutter 101 is able to cut a board to be cut 142. This is, in contrary to a CNC cutter done by moving the power cutter 113 including the motor driving the cutting tool 144 together with the cutting tool 144 when cutting the board to be cut 142.

In an exemplary embodiment, when a power cutter 113 is mounted in the automated panel cutter 101, the tool holder 112 (or indirectly the carriage 107) facilitates moving the power cutter 113 and thereby the cutting tool 144 both in the Z-direction and around the Z-direction i.e. the angle of rotation φ. Hence, the cutting tool 144 is able to be move from front of board to be cut 142 towards the back of the board to be cut 142. In addition, the cutting tool 144 is able to be moved in an angle φ around the Z-axis. Such movement around the Z-axis (in combination with movement in the X and Y directions) ensures that the cutting tool in the form of a rotating (in the Z plane) or reciprocating blade can cut straight cuts in any angle and it distinguishes the present portable automated panel cutter 1 from known portable tools having a frame and a power tool in the form of a milling cutter.

The angle is preferably at least 180 degrees to facilitate complete freedom in cutting directions φ around the Z-axis. This is at least true in the embodiment, where the power tool is only allowed to cut from top of the board to be cut i.e. from the top frame profile 2a towards the bottom profile 2b. This direction of cutting is advantageous in that it ensures that the board to be cut is not lifting from the board support but instead is pushed by the cutting tool towards the board guide/bottom profile and thereby the cutting direction helps fixating the board to be cut.

In an exemplary embodiment, the portable automated panel cutter 101 is equipped with means for indicating that a board to be cut 142 is correct positioned on the board support 121 and thereby that the portable automated panel cutter 101 is ready to cut. Such means can be implemented as a button the user loading the panel cutter 101 with the board to be cut can push when done. Alternatively, such means can be implemented as one or more sensors positioned in the support frame 103. In any case, the means provides a "load" signal to the controller 120 which upon receiving the load signal allows the user to initiate a cutting.

In an exemplary embodiment, the inner support area 104 is at least partly covered by an offering board 158 or simply referred to as board. Preferably, at least the part of the inner support area 104 over which the power cutter can 113 cut a board to be cut 142 is covered by a board 158. This is because when cutting a board to be cut 142 positioned on top of a board 158 a minimum of dust will spread in the area around the panel cutter 101 originating from the side of the board to be cut 142 facing towards board 158. The dust originating from the side of the board to be cut 142 facing up and away from the board 158 is removed by suction from a vacuum cleaner a suction end of which mounted on the panel cutter 101/tool holder 112. The board 158 can be of the same type as the board to be cut 142.

In an exemplary embodiment, the board 158 may rest on one or more recesses of one or more of the frame profiles 102. Alternatively, the board 158 may rest on one or more recesses of one or more board guides 125. It should be mentioned that in embodiments where the cutting tool 144 is circular the board guides 125 are necessary on at least part of the two sides of the board to be cut 142. Preferably the board to be cut 142 is positioned against one of the ends and the bottom e.g. positioned against the left and bottom i.e. third and second frame parts denoted 102c and 102b to be able to cut to the edge of the board to be cut 142. This is because at least sometimes, for a circular cutting tool to be able to cut a board to be cut 142 completely through, one part of the circular cutting tool 144 would have to be moved outside the area of the board to be cut 142 i.e. passing the edge of the board 158. Hence, if no spacing arrangement such as a board guide 125 was present, the circular cutting tool 144 would cut into a frame part.

In an exemplary embodiment, the support frame 103 comprises the following elements which is also illustrated on FIGS. 17a and 17b and can be assembled by one person according to the following steps. Note that none of the individual elements has a weight exceeding 16 kkg, to make them easy to handle by a single user. The weight requirement may be including package of the parts unless the package has e.g. wheels which can carry some of the weight and thereby the user when lifting the package does not lift more than 16 kg.

To ensure stability and easy assembly of the support frame by one user, the support frame 103 in this exemplary embodiment comprises two frame leg parts 155 that might be implemented as tripods see FIG. 17b. The tripods may be equipped with wheels for easier moving the panel cutter 101. Hence, the first step in assembling the support frame 103 is to erect the two leg parts 155b of which only part of the front leg is illustrated. A not illustrated back leg supporting the frame when leaning backwards is also needed if not the tripod solution is preferred. If not the end profiles i.e. the third 102c and fourth 102d frame profiles are attached to the leg parts 155 this has to be done as the second step in the assembling method. The end profiles can be attached to the legs/tripods simply by introducing a hook (some kind of protrusion) in the leg/tripod into a hole (some kind of recess) in the back of the end profiles and let gravity ensure the attachment.

The third and fourth step of assembling the support frame 103 is to connect the top and bottom profiles i.e. the first 102a and second 102b profiles to the end profiles 102c, 102d. Starting from the bottom profile, this can initially be placed on recesses 156 of the leg/tripods. Then the bottom profile 102b is connected to the first and second end profiles 102c, 102d respectively. Alternatively, the bottom profile can be positioned on the recess 156 prior to mounting the end frame parts 102c, 102d on the tripod and to the bottom profile.

Then the top profile 102a is placed resting on the top end of the end profiles 102c, 102d and moved sideways until connection points of the end and top profiles 102c, 102d, 102a are aligned and connection therebetween can be made. The order in mounting the top and bottom profile are not important. The four profiles 102a-102d can be mutually connected e.g. by means of a type of so-called quick locks (not illustrated).

It should be noted that a board guide 125 preferably is pre-mounted to one preferably two of the frame profiles. The board guides 125 are preferably releasably attached to the frame profiles and thereby changeable after having been used and thereby cut several times.

To the assembly of the frame 103 also belongs the mounting of power cables and control cables (if necessary) to drives and sensors that may be part of the frame 103. Sensors may alternatively communicate wirelessly, with the controller 120.

The fifth step is to unfold and mount frame support part 157. The frame support part 157 is in the FIG. 17 illustrated as two independent parts 157a, 157b comprising an upright and a cross sectional part. However, the frame support part 157 can also be implemented as one part depending on the size of the support frame. If the frame support part 157 is implemented in two parts, the two main parts 157a, 157b is preferably mounted to each other.

The sixth step is to mount the carriage 107 to the bottom and top frames parts. Alternatively, if the tool drives 115, 118 is in the end frame parts, the carriage 107 is mounted thereto. The mounting of the carriage 107 to the frame 103 includes mounting electric power cables and control cables (if necessary) between the carriage 107 and the controller 120.

The seventh step is to mount the power tool 113 in the tool holder 112 including power cable to the power tool 113 and any necessary control cables. The tool holder 112 is mounted to the tool holder carriage 109 e.g. as described above. Further as described above, one or more suction hoses connected to a vacuum cleaner are provided for removing dust generated from the cutting operation. The first end of the suction tube is provided in proximity of the cutting tool more specifically, it may be connected to a safety screen or enclosure protection the cutting tool 144. The second end of the suction tube is connected to e.g. an industrial vacuum cleaner. The suction tube may extend along various parts of the panel cutter 101 between the first and second ends thereof. The vacuum cleaner is preferably powered from a plug controlled by the controller of the panel cutter.

Note that the frame illustrated on FIGS. 17a and 17b may be the same however the legs 155 may be implemented differently so that it either has 4 contact point or 6 contact points (tripod solution FIG. 17b). further the frame support part is not illustrated in FIG. 17b, but may also be implemented in that embodiment.

Another exemplary embodiment is assembled following another sequence of steps, as explained in the following. None of the individual elements according to the embodiment has a weight exceeding 16 kg, allowing most steps to be carried out by a single user. However, the total weight may exceed 16 kg, and some steps may thus require more than a single user, e.g. two users.

In the embodiment, frame support parts 157a, 157b and frame leg parts 155a, 155b are preassembled with some of the frame profiles 102c, 102d, such that the third frame profile 102c is connected to one leg part 155a and one frame support part 157a, and the fourth frame profile 102d is connected to one other leg part 155b and one other frame support part 157b. Each of the two frame leg parts 155a, 155b are implemented as bipods, such that the assembled panel cutter 101 comprises a total of four legs.

As a first step, frame profiles 102a, 102b, 102c, 102d, including frame support parts 157a, 157b and frame leg parts 155a, 155b, are placed on a flat surface by the user.

As a second step, the second frame profile 102b as attached to the third frame profile 102c, the fourth frame profile 102d, and the frame support parts 157a, 157b using attachment means. The attachment means may for example be quick locks and quick lock receivers, respectively connected to one of two parts to be attached. Quick lock receivers may preferably be adapted to receive associated quick locks, which when turned locks the two parts to be attached mechanically. Note that the attachment means according to the invention are not limited to quick locks and quick lock receivers, and may be selected accordingly by a person skilled in the art. A variant of the quick locks are dovetail connectors which facilitate fast and easy assembly of parts of the frame and portable cutter As a third step, the first frame profile 102a is attached to the third frame profile 102c, the fourth frame profile 102d, and the frame support parts 157a, 157b using similar attachment means as in the second step.

As a fourth step, the assembled parts are erected to a standing position. This step is preferably performed by at least two users, due to the total weight of the assembled parts.

As a fifth step, each of the frame leg parts 155a, 155b are configured to ensure that the assembled parts may stand without support of users. In this embodiment, each of the bipods are fanned out to a preconfigured angle of approximately 45 degrees between the two legs of the individual bipod. In other embodiments, the preconfigured angle may be another angle, for example an angle in the range from 10 degrees to 45 degrees, or from 45 degrees to 90 degrees. In some other embodiments, the frame leg parts 155a, 155b do not have a preconfigured angle, but may still ensure that the assembled parts may stand without support of users.

As a sixth step, the carriage 107 is mounted to the bottom and top frames parts 102a, 102b, including mounting electric power cables and control cables (if necessary) between the carriage 107 and the controller 120.

As a seventh step, the power tool 113 is mounted in the tool holder 112 including connection of power cable to the power tool 113 and any necessary control cables. The tool holder 112 is mounted to the tool holder carriage 109 e.g. as described above. Further as described above, one or more suction tubes connected to a vacuum cleaner are provided for removing dust generated from the cutting operation. The first end of the suction tube is provided in proximity of the cutting tool more specifically, it may be connected to a safety screen or enclosure protection the cutting tool 144. The second end of the suction tube is connected to e.g. an industrial vacuum cleaner. The suction tube may extend along various parts of the panel cutter 101 between the first and second ends thereof.

The invention is not limited to the two presented assembly procedures presented above. Other embodiments of the invention may, for example, combine steps of the above procedures and steps not presented in the above procedures. For example, two frame leg parts 155a, 155b may first be attached individually to two frame profiles. Then these assembled parts may be erected. Then two additional frame profiles 102c, 102d are attached. Then frame support parts are attached. Then the carriage 107, and finally the power tool 113 are attached.

Furthermore, embodiments of the invention are not limited to having frame leg parts 155a, 155b which are either bipods or tripods. The frame leg parts 155a, 155b may preferably provide a stable foundation, suitable for assembly/disassembly for the portable automated panel cutter 101 and may be chosen accordingly by a person skilled in the art.

After having completed the assembly of the panel cutter 101 including mounting the power tool 113 in the tool holder 112 and it is powered up, the controller 120 is ready to execute a so-called homing sequence. The homing sequence is an initiating routine that ensures alignment of the cutting tool of the power cutter with the starting point of the coordinate system referred to by the controller 120 when instructing the power cutter 113 to cut. The initiating routine may be established by the controller driving the power tool 113 towards sensors defining ends of respective X, Y, Z axis and φ rotation. Alternatively, the user may physically place the power tool in a position and then inform the controller that the power tool is in a position which then is considered home.

Before initiating the first cutting operation, the so-called offering board 158 (above simply referred to as board) is positioned e.g. resting on board guides 125 or frame protrudings.

Prior to initiating a cutting sequence, a board to be cut 142 is positioned on the offering board 158 and aligned with the one or more board guides 125 and thereby the coordinate system of the controller. The positioning of the board to be cut 142 is registered by the controller 120 and a communication sequence is executed. The user can provide information related to geometry of the desired cutting out to the controller 120 which then is ready to initiate a cutting sequence.

The portable automated power cutter is dynamic in the sense that two subsequent cuts are different from each other. This is at least true for the majority of cuttings.

As found from the above, the present invention relates to a panel cutter 101. The panel cutter 101 is automated, which should be understood as being able to cut a board 142 without the help of a user i.e. being able to move a power cutter 113 along the X and Y axes simultaneously. With this said, the user may be needed to load and unload the board to the panel cutter and provide measures for the cutting of the board. The panel cutter 101 is portable, which should be understood as being able to move by hand. To facilitate this, the panel cutter 101 can be dismantled preferably in the following parts: frame parts 102, carriage 107, tool holder 112 and board support 121. These parts can be moved in bags by a user complying with rules relating to working environment i.e. the weight of the individual parts is below 15-20 kg.

The panel cutter 101 does not include a power cutter 113/cutting tool 144 but it facilitates a releasably mounting of a power tool 113 comprising a cutter tool 144. The power cutter 113 can be operated by hand when not mounted to the panel cutter 101 i.e. the power cutter 113 is a standalone power tool having own motor, drive train, cutting tool, etc.

It should be mentioned that the figures disclose several embodiments of the present invention but features of the figures are not limited to a particular embodiment. Hence, features of one figure can be used on an embodiment of another figure.

Description of a Portable Automatic Panel Cutter, a Method for Operating a Portable Automatic Panel Cutter and Use Thereof FIG. 18 illustrates the portable automated panel cutter 201 as seen in perspective.

The portable automated panel cutter 201 comprises a plurality of panel cutter parts 237 and each individual part 237 may be carried by hand. Thus, in this embodiment the operator may take the panel cutter 201 apart by unscrewing some screws or bolts, by disengaging interlocking parts, by releasing snap locks or the like and move the cutter parts 237 to any location in which the cutting work must be performed. This could for example be done by carrying the cutter parts 237 in in dedicated holder, by means of handles, in a bag or other. The cutter parts 237 are then assembled to form the panel cutter 201. Then, when a panel 213 is to be cut, it may be positioned in a support area 212 of the portable automated panel cutter 201 which is formed when the panel cutter parts 237 are assembled. Depending on the type of material of the panel 213 and the type of cutting to be performed, a specific power cutter 205 may be chosen. For example, if straight cuts are to be performed, e.g. if the panel 213 must be cut in just two pieces in a straight line, a circular saw may be used for such a purpose. The power cutter 205 is then connected to the adapter 210 which connects the power cutter 205 to the power cutter holder 202 which again is connected to the traverse beam 243. The traverse beam 243 is arranged to be movable in the x-direction by means of the automated displacement means 203 and when the traverse beam 243 moves in the x-direction, the power cutter holder 202, the adapter 210 and the power cutter 205 follow the same motion as these are connected to the traverse beam 243—in this case releasably connected to the traverse beam 243.

In this embodiment the power cutter holder 202 is a more complex structure surrounding the power cutter 205 but in another embodiment the power cutter holder 202 could be formed more as a plate, an arm, a bracket or other type of structure for supporting a power cutter 205 and adaptor 210 and connected to the traverse beam 243.

The movements in the respective cartesian coordinate axis (x, y and z) and the rotation around the holder rotation axis 204 may be achieved in numerous ways. In this embodiment, the x-direction movement is achieved by an electric motor 218 which moves the traverse beam 243 by e.g. a set of wheels (not shown) engaging a track 223. However, in another embodiment, the automated displacement means could be a magnetic system, belt drive, pulley system, a spindle drive, a rack and pinion or other kind of mechanism for moving the traverse beam 243 in the x-direction. And in an embodiment, instead of using the electric motor 218 for moving the traverse beam 243, a hydraulic actuator, pneumatic actuator, engine or other type of drive means could be used for the purpose of moving in the x-direction. This also applies to the y- and z-direction movements and the rotation means 217 for rotation around the holder rotation axis 204 i.e. in this embodiment the automated displacement means comprises four electrical motors 218 each driving one of the x, y and z direction and performing the rotation of the power cutter holder 202.

In this embodiment the rotation drive means 217 comprises a bearing (not shown) and an endless belt (not shown) encircling an inner opening of the power cutter holder 202 so that an inner part of the power cutter holder 202 is rotated when the belt is pulled by means of an electrical motor and a pulley.

In this embodiment the rotation drive means 217 are enclosed within the power cutter holder 202 but could also be outside or over the holder 202. In another embodiment the rotation could be achieved by a gear, pulley system, drive shaft or in any other suitable way for connecting the rotation drive means 217 to the power cutter holder 202 and rotate it around the holder rotation axis 204.

In this embodiment, the holder rotation axis 204 (see FIG. 20) is parallel with the z-axis. However, in another embodiment, the holder rotation axis 204 could be parallel with the x- or y-axis.

The power cutter 205 is connected to the adapter 210 such that the cutter tool 206 of the power cutter 205 points towards the support area 212 for cutting a panel 213. The adapter 210 is connected to the power cutter holder 202 such that the holder 202 and the adapter 210 with the power cutter 205 may displace in a z-direction e.g. for accommodating the thickness of the panel 213 or for moving the power cutter holder 202 in the cartesian coordinate system without colliding with the panel 213. The adapter 210 is arranged such that it may move in the z-direction independently from the power tool holder 202 such that calibration of the cutting point in the z-direction is possible but in another embodiment alignment of the z-direction is not possible in the a small difference in cutting depth only will mean that the cutter tool extends a little further into the support area 212. The power cutter 205 may also be moved independently from the adapter 210 and the power cutter holder 202 for example during calibration of the cutter tool 206 (see FIG. 19-21).

The power cutter 205 may be battery-driven or may need to extract power from a power socket. Therefore, in this embodiment, the power cutter 205 comprises a power socket 228 such that a power plug 230 of the power cutter 205 may be plugged directly to the power socket 228 of the panel cutter such that the operator does not have to extend the power plug 230 to a power socket in the factory, construction site, workshop or where ever it may be positioned for use. However, the power socket 228 could naturally also be provided in a nearby power source, for example in a power socket of a factory in which the panel cutter 201 is to be used.

Figure 23:
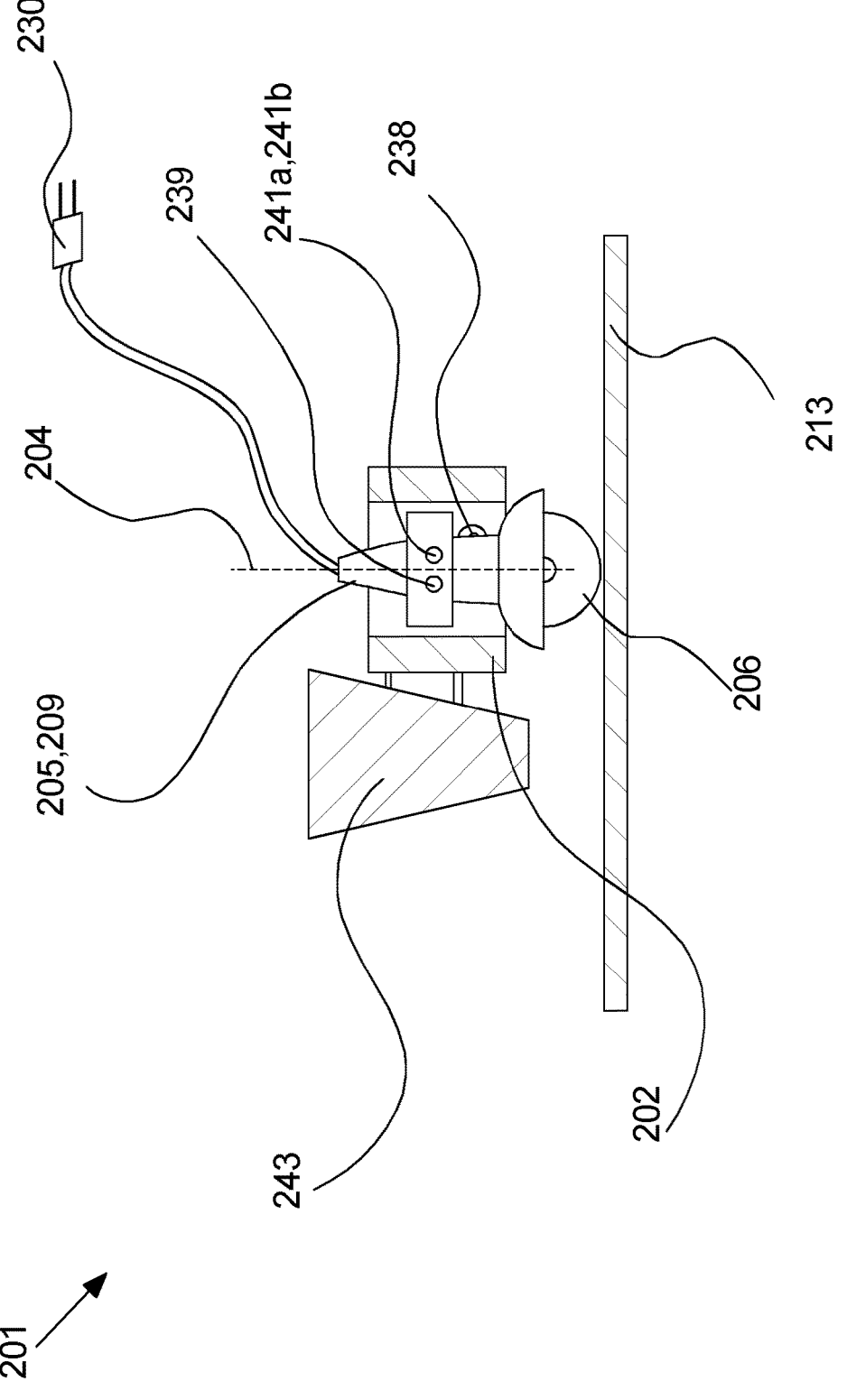
Figures 24A, 24B, 24C:
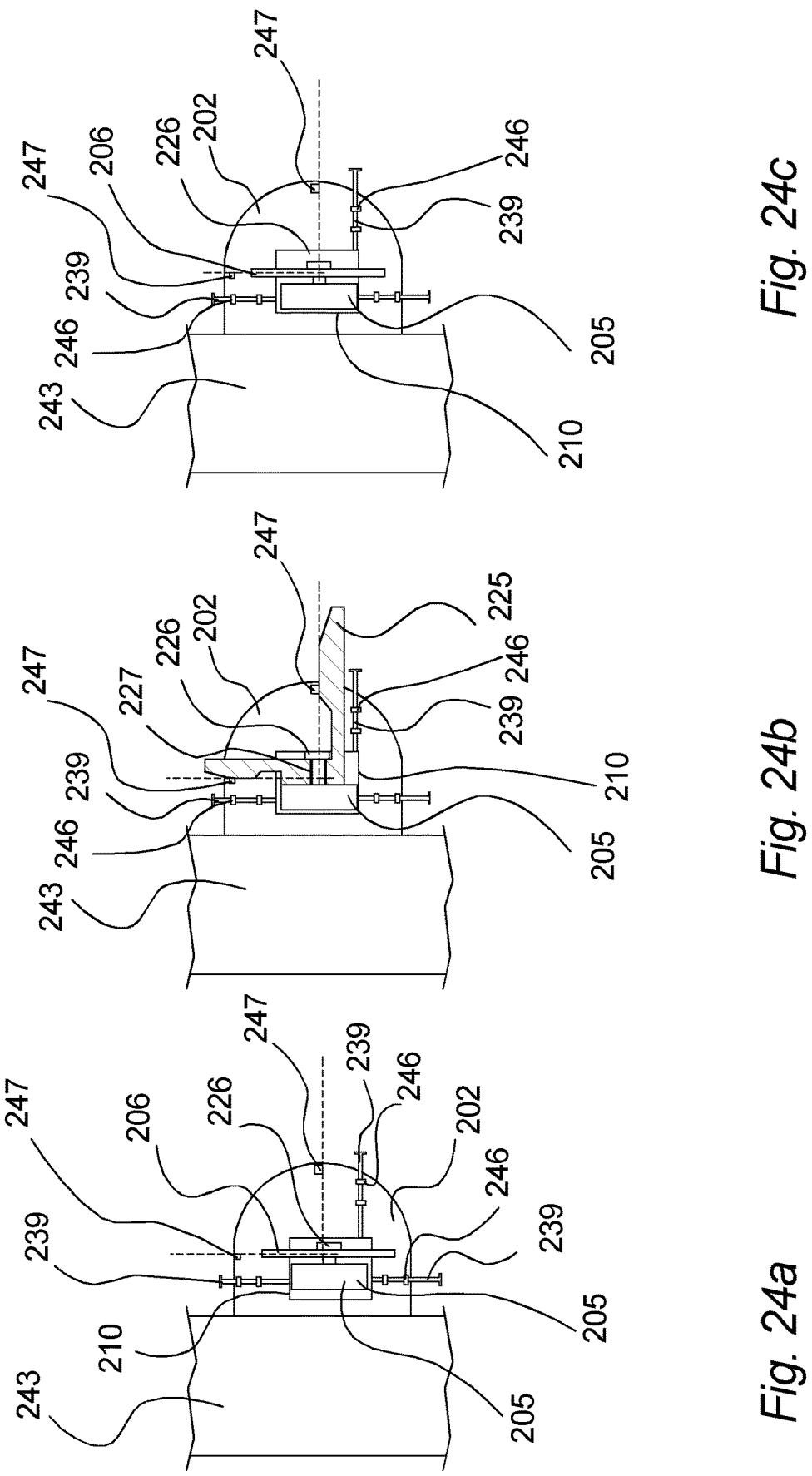
Figure 25:
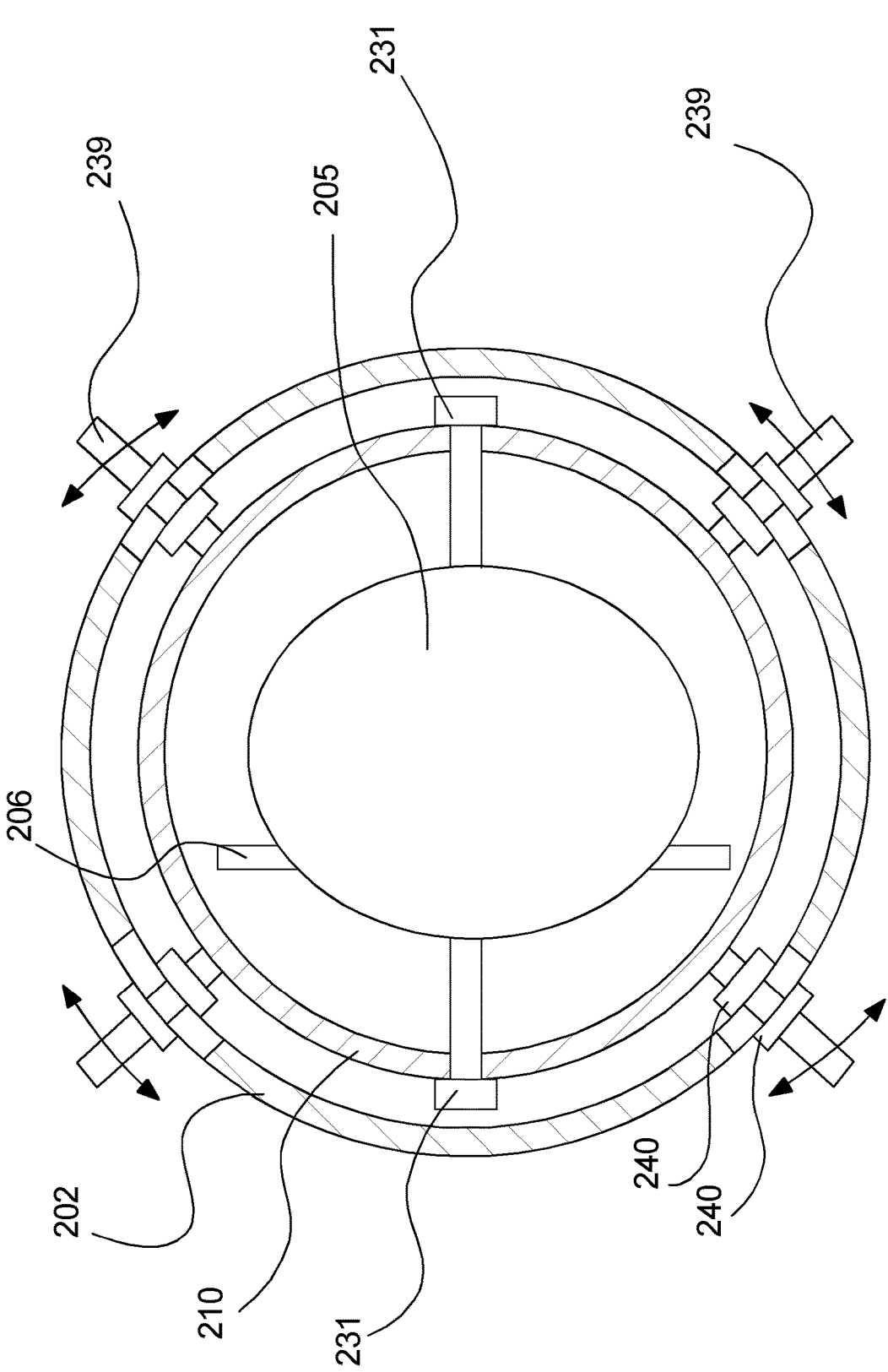

In this embodiment the panel cutter 201 comprises a controller 211 arranged to control the x-, y-, z-movement and the rotation around the holder rotation axis 204 and also the power to the power socket 228 such that the controller 211 may control the entire system, i.e. movement in the cartesian coordinate system and the cutting. For example, it may move the holder 202 to a particular (x, y) coordinate, apply power to the power socket 228 such that the power cutter 205 activates the cutter tool 206 and move the power cutter towards the panel in the z-direction to cut the panel 213. In this embodiment, the power cutter comprises a power button 238 (see FIGS. 19 and 20) which is always in the "on" state such that the power cutter 205 is controlled by the controller 211 controlling the power to the power socket 228. However, in another embodiment, the power cutter 205 may not necessarily always be in the "on" state. A power button actuating mechanism (not shown) could be designed such that the controller controls this part instead of (or in addition to) controlling the power to the power socket 228. Such a mechanism for actuating the power button 238 (see FIGS. 22 and 23) could be a simple relay switch, actuator, a spring-actuated arm, mechanism driven by compressed air, a solenoid or other kind of mechanism for actuating the power button 238 via the controller 211.

In this embodiment the controller 211 is placed on the traverse beam 243 but in another embodiment the controller 211 could be placed elsewhere on the panel cutter or it could be located in a separate stand, cupboard or the like.

The controller 211 may control the movement and power supply in response to instructions provided by an operator. Such instructions could be provided via a remote, handheld device (not shown) which transmits the instructions to the controller 211 either via a cable or wirelessly. The instructions could be provided to the handheld device via voice commands, a user interface or even by taking a picture of e.g. a targeted shape, which the controller could convert to a cutting path. The instructions could also be provided directly to the controller via a user interface in the panel cutter 201. In order to provide for complex shaped panels 213, the controller 211 could be provided with means for operating the displacement means 203 e.g. in the x- and y-direction simultaneously to make e.g. diagonal cuts or even cutting along a curve. The controller 211 could do this by controlling actuators, belt drives, pulley systems, rack and pinion mechanism or other means for the displacement means 203 in the x- and y-direction simultaneously.

In this embodiment, the support area 212 is comprised of a number of supporting rods 224 which extend between the upper frame part 244 and lower frame part 245. In another embodiment, the support area 212 could be a plate which e.g. completely fills out the space between the frame parts, a mesh or other type of support for supporting the panel(s) 213.

The portable automated panel cutter 201 comprises feet 233 which distribute the mass of the panel cutter 201 such that it is stable upon cutting operation. Furthermore, the contact surface of the feet 233 form a contact plane 236 and the panel cutter 201 is angled in relation to this contact plane 236 such that it does not take up too much space and so that panels 213 may more easily be placed in the panel cutter 201 and removed after cutting. In this embodiment the panel cutter 201 is arranged in an angle α at 75°. However, in another embodiment the angle α could angle the support area 212 more vertically or more horizontally.

In this embodiment the feet 233 comprises rods. However, in another embodiment, the feet 233 could comprise suction cups, wheels, shell structure, beam structure or other kind of feet for supporting the weight of the panel cutter 201 and stabilizing it.

In this embodiment the power cutter 205 is a standard of-the-shelf angle grinder provided with a cutting tool 206 (see FIGS. 19 and 20) in the form of a circular saw blade. Power cutters 205 of one manufacturer and different makes usually differ from angle grinders of another manufacturer and/or of other types. Thus, to ensure flexibility and manufacturer preferences, the adaptor 210 is in this embodiment connectable to different types of power cutters 205 irrespective of manufacturer or specific embodiments of the power cutter 205 (circular saw, jigsaw, angle grinder, power router etc.). However, in another embodiment different adaptors 210 could be provided for different types of power cutters 205.

Operating the portable automatic panel cutter 201 would comprise the steps of releasably connecting an independent power cutter 205 to a power cutter holder 220 of the portable automatic panel cutter 201 by means of an adaptor 210, placing a panel 213 in the portable automatic panel cutter 201, providing cutting instructions from an operator to a controller 211 of the portable automatic panel cutter 211, and cutting the panel 213 into two or more panel parts by means of a controller 211 controlling automatic displacement of the power cutter 205 holder in a three-dimensional cartesian coordinate system and rotating the power cutter holder 202 around a holder rotation axis 204 parallel to an axis of the three-dimensional cartesian coordinate system.

FIG. 19 illustrates an embodiment of the power cutter 205 as seen in perspective In a preferred embodiment, the power cutter 205 is handheld so that the operator may easily move it around. Also, since the automated portable panel cutter 201 is a dynamic system, it is important to keep the inertia as low as possible such that the resulting accelerations do not result in large forces which would require stiff supports, strong beams and also strong displacement means. The panel cutter 201 is designed such that the operator may easily remove the power cutter 205 and use the power cutter 205 for manual work by simply removing the power cutter 205 from the adapter 210.

More specifically, the power cutter 205 is in this embodiment an angle grinder. This type of power cutter 205 could be used for cutting gypsum plates and as this cutting process develops a lot of dust and flakes, the power cutter 205 will in this embodiment also comprise an extraction device 222 for venting the area at the vicinity of the cutting tool 206. Naturally, the extraction device 222 could be provided no matter which type of panel 213 is to be cut.

The drive train 208 of the power cutter 205 could comprise a plurality of shafts, gears, axles or other kind of mechanical components for transmitting a force from the motor 207 to the cutter tool 206. Thus, the drive train 208 could be designed such that the resulting movement is a rotational movement or a reciprocating movement depending on which type of cutter tool 206 is mounted on the power cutter 205. In this example, the drive train 208 comprises the drive shaft 219 which provides a rotational motion to the cutter tool 206. And in this embodiment, the force is provided, via a gearbox 232, from an electrical cutter motor 207 to the cutter tool 206, but in another embodiment the power could be provided pneumatically (e.g. via compressed air) or hydraulically. It could also be provided directly to the cutter tool, i.e. without any gearbox 232 or drive shaft 219. The power to the electrical cutter motor 207 itself is provided via a power plug 230 connected to a power socket but could also be provided by a battery (not shown) which could be positioned internally in the power cutter housing 209. The electric cutter motor 207 and drive train 208 are in this embodiment enclosed in the power cutter housing 209.

In this embodiment, the cutter tool 206 is an angle grinder cutting disc which cuts the panel 213 by conducting a rotational motion. However, in another embodiment it could be a saw blade, jigsaw blade, saw wire or any other kind of cutter for attachment to a power cutter 205 and thereby cut a material by carrying out a circulating, reciprocating or a continuous translating motion. In an embodiment, the power cutter 205 comprises means for reciprocating a cutter tool 206 instead of rotating it. Such a reciprocating motion could be provided by a rack mechanism, slider-crank mechanism, crankshaft, wheel-pinion mechanism or other type of mechanism for achieving a reciprocating motion. In an embodiment the power cutter 205 could instead be a power router—particularly if cutting more complex shapes was desired or if portions of the panel needed to be cut out away from the edges of the panel.

The drive train 208 is the group of components that deliver power from the electrical cutter motor 207 to the cutter tool 206 i.e. drive shafts, gearbox, gears and/or other.

The drive train 208 could also provide for a gear ratio such that for example torsion or rotational speed may be adjusted.

During the cutting process the cutter tool 206 may generate a lot of dust, flakes or chips. Therefore, the angle grinder comprises a shield 221 for protecting the operator but also for protecting the components of the panel cutter 201. Furthermore, the shield 221 improves the efficiency of the extraction device 222 in that the cutting residues are easier guided into the extraction device 222. In this embodiment, the extraction device 222 is a ventilation system which actively sucks the dust, flakes and chips away from the power cutter 205. The extraction device 222 could then lead the residues to a container or simply blow it out in the surroundings. But in another embodiment, the extraction device 222 could be a simple container (not shown) in which the cutting residues are disposed without actively sucking the residues towards the container. The container could then be emptied regularly.

In another embodiment the power cutter 205 would not comprise a shield 221 and/or the extraction device 222 would not be placed in the shield 221. Thus, in another embodiment an extraction device 222 could be formed elsewhere e.g. in the form of a space partly enclosing the cutter tool 206 and/or the power cutter 205 so that suction may be connected to this part-enclosure to remove dust during the cutting process, and/or the extraction device 222 may comprise local exhaust ventilation.

In this embodiment, the cutter tool 206 comprises a partly enclosing shield 221. However, in another embodiment, the power cutter 205 could comprise a more or less fully enclosing shield 221 and then comprise means for displacing a part of the shield 221 actively or as it engages the panel 213.

Some types of power cutters 205 comprise threaded holes 242 for receiving a support handle such that the operator may take a firm grip of the power cutter 205. Such a threaded hole 242 may also be used for connecting the power cutter 205 to the adaptor 210. Thus, instead of inserting a support handle 229 into the threaded holes 242 a screw 241, bolt 241b (see FIG. 20), pins or other type of connector may be received therein to connect the adaptor 210 to the power cutter 205.

In this embodiment, the power cutter 205 is an angle grinder but in another embodiment the power cutter 205 could be any other type of power cutter as mentioned earlier—i.e. the specific power cutter 205 may be chosen in dependency of the type of panels 213 to be cut, the desired cutting operation (straight or curving), precision or other.

The independent power cutter 205 may be powered by electric motor (battery, power socket), engine or compressed air.

FIG. 20 illustrates a cross section through the middle of the power cutter holder 202, as seen from the bottom.

In this embodiment, the adaptor 210 is connected to the threaded holes 242 of power cutter 205 via screws and/or bolts 241a, 241b. One or more screws 241a and/or bolts 241b may be used depending on the available threaded holes 242 and the size of the power cutter 205.

FIG. 21a, 21b, 21c illustrates an embodiment of an alignment process of the power cutter 205 in the power cutter holder 202, as seen from below. More specifically, this view is as seen from below the holder 202 and looking up towards the side of the cutter holder 202, which would face a panel 213.

In FIG. 21a, 21b, 21c is illustrated one or many methods by which the power cutter 205 could be aligned by using the alignment tool 225. In this embodiment the alignment process is performed by removing the cutter tool fixator 226 (see FIG. 21*a*) which fixates the cutter tool 206 to the power cutter 205. In another embodiment—e.g. in case of a jig-saw—the cutter tool fixator 226 would merely be released so that the cutter tool 206 could be removed. Thereafter, the alignment tool 225 may be mounted on e.g. the hub which supports an angle grinder saw blade (in the specific example of an angle grinder but the alignment tool 225 is not limited to such an embodiment of the power cutter 205). The alignment tool 225 may then be temporarily fixated by means of the cutter tool fixator 226 (FIG. 21*b*) extending through fixation means 227 in the form of a through hole in the alignment tool 225. However, in another embodiment the fixation means 227 could also or instead comprise guide pins, bolts, geometry suited for interlocking or other.

The alignment tool 225 is then used for guiding the power cutter 205 into a correct position by the aid of alignment marks 247. Position corrections in the x-, y- and z-direction may be performed by the adjustment means 239 (not shown for z-direction correction) of the adaptor 210 to which the power cutter 205 is connected. Also, the alignment tool 225 may be used to ensure that the cutter tool 206 is in alignment with the rotation axis 204. After the alignment process is finished, the cutter tool fixator 226 may be removed or released and the alignment tool 225 may be removed and replaced by the cutter tool 206 where after the panel cutter 201 is ready for precise cutting.

In this embodiment, the adjustment means 239 are adjustment screws which are inserted into the support brackets 246 rigidly connected to the power cutter holder 202. However, it is obvious to the skilled person that the adjustment means 239 could be formed in numerous other ways e.g. as disclosed in relation to FIG. 22.

In this embodiment, the cutter tool fixator 226 comprises a nut. However, in another embodiment the cutter tool fixator 226 could comprise a screw, a pin, a clamp or any other type of fixator for temporarily fixating the alignment tool 225 to the power cutter 205.

In another embodiment the alignment tool 225 could comprise lasers or distance sensors and provide an audio or visual signal in relation to the deviation from the desired position, the alignment tool 225 could comprise a shape enabling that it could only be mounted when the power tool is aligned correctly, the alignment tool 225 could comprise a permanently mounted bottom plate on the power cutter holder 202 including a slot through which the cutter tool 206 will extend when it is correctly aligned, the alignment tool 225 could comprise permanently mounted rulers or alignment arms on the power cutter holder 202 enabling that the cutter tool 206 may be visually aligned or other or any combination thereof.

FIG. 22 illustrates a cross section through a power cutter holder 202 and adaptor 210, as seen from above.

In this embodiment power cutter holder 202 holds the adaptor 210 through four adjustment means 239 of the adaptor 210 arranged to extend through elongated tracks in the power cutter holder 202. The elongated tracks allow the adaptor 210 to be rotationally aligned and the nuts 204 allows the adaptor 210 to be displaced in the x-direction and y-direction. In this embodiment the adaptor 210 cannot be adjusted in the z-direction, but in another embodiment a similar adjustment arrangement could be provided for the z-direction.

It would be obvious to the skilled person that in another embodiment the adaptor 210 and/or the adjustment means 239 could be formed in numerous other ways i.e. in ways comprising adjustable arms, set screws, spacers, lock mechanisms or other for either stepless adjustment or adjustment in increments of the position of the power cutter 205 in relation to the power cutter holder 202.

In this embodiment the adaptor 210 is releasably connected to the power cutter 205 by means of two connection means 231 in the form of bolts extending through holes in the adaptor 210 and into treaded holes in the power cutter 205 but in another embodiment the power cutter 205 could also or instead be releasably connected to the adaptor 210 through snap locks, interlocking geometry, clamps, grippers, belts, bands or other.

In an exemplary embodiment, a reference to a portable automated panel cutter 201 is a reference to a machinery that does not comprise a power cutter 205 i.e. the contrary to a standard CNC cutter. The power cutter 205 is a stand-alone tool and the power cutter holder 202 also sometimes referred to as tool holder of the portable automated panel cutter 201 is designed to fit to and hold the power cutter 205. When mounting the power cutter holder 202 to the transverse beam 243, in the power cutter may be mounted on a power cutter or tool holder carriage which is attached to a drive located inside the transverse beam 243 and thereby facilitating movement of the power cutter 205 in the x-direction, the power cutter 205 is thereby mounted to the machinery/frame and the portable automated panel cutter 201 is able to cut a board to be cut. This is, in contrary to a CNC cutter done by moving the power cutter including the motor driving the cutting tool together with the cutting tool when cutting the board to be cut.

In an exemplary embodiment, when a power cutter 205 is mounted in the automated panel cutter 201, the tool holder 202 (or indirectly the carriage) facilitates moving the power cutter 205 and thereby the cutting tool 206 both in the Z-direction and around the Z-direction i.e. the angle of rotation φ. Hence, the cutting tool 206 is able to be move from front of board to be cut towards the back of the board to be cut. In addition, the cutting tool 206 is able to be moved in an angle φ around the Z-axis. Such movement around the Z-axis ensures that circular cuts can be made and it distinguishes the present portable automated panel cutter 201 from known portable tools having a frame and a power tool in the form of a milling cutter. Using a milling cutter as power tool 205 reduces complexity in control of the movement of the power tool in that it only has to be moved in the X, Y and Z directions.

The angle is preferably at least 180 degrees to facilitate complete freedom in cutting directions φ around the Z-axis. This is at least true in the embodiment, where the power tool is only allowed to cut from top of the board to be cut i.e. from the top frame profile towards the bottom profile. This direction of cutting is advantageous in that it ensures that the board to be cut is not lifting from the board support but instead is pushed by the cutting tool towards the board guide/bottom profile and thereby the cutting direction helps fixating the board to be cut.

The portable automated power cutter is dynamic in the sense that two subsequent cuts are different from each other. This is at least true for the majority of cuttings.

The invention has been exemplified above with reference to specific examples of power cutter 205, cutter tool 206, feet 233, automated displacement means 203 or other. However, it should be understood that the invention is not limited to the particular examples described above but may be designed and altered in a multitude of varieties within the scope of the invention as specified in the claims.

LIST

1. Portable automated panel cutter
2. Frame profile a. First frame profile
b. Second frame profile
c. Third frame profile
d. Forth frame profile
3. Support frame
4. Inner support area
5. First carriage transmission part
6. Second carriage transmission part
7. Carriage
8. First carriage motor
9. Tool holder carriage
10. First tool holder drive part
11. Second carriage motor
12. Tool holder
13. Power cutter
14. First tool adaptor
15. First tool drive
16. First tool displacement means
a. motor
17. Second tool adaptor
18. Second tool drive
19. Second tool displacement means
a. motor
20. Controller
21. Board support
22. Third carriage transmission part
23. Board support fixation
24. Board guide steering
25. Board guide
a. First guide area
b. Second guide area
26. First carriage bearing
27. Board fixators
29. Carriage fastening points
a. Recesses
b. Protrusions
30. Tool holder fastening points
32. Second carriage bearing
37. Fourth carriage transmission part
40. First carriage bearing receiver
41. Second carriage bearing receiver
42. Board to be cut
43. Longitudinal opening of carriage
44. Cutting tool
45. First longitudinal opening
46. Diagonal support
47. Electric wire from power cutter
48. Electric socket powering the power cutter
49. Energy storage
50. Utility grid
51. Motor power supply cables
52. Power supply cable
53. Quick lock receivers
54. Quick locks
58. Offering board
101. Portable automated panel cutter
102. Frame profile
a. First frame profile
b. Second frame profile
c. Third frame profile
d. Forth frame profile
103. Support frame
104. Inner support area
105. First carriage transmission part
106. Second carriage transmission part
107. Carriage
108. First carriage motor 112. Tool holder
113. Power cutter
120. Controller
121. Board support
123. Board support fixation
124. Board guide steering
125. Board guide
a. First guide area
b. Second guide area
126. First carriage bearing
127. Board fixators
133. Stick
134. Hole plate
135. Lock
141. Second carriage bearing receiver
142. Board to be cut
145. First longitudinal opening of the first frame profile
146. Diagonal support
155. Frame leg parts
a. First frame leg part
b. Second frame leg part
156. Frame recess
157. Frame support part
a. First frame support part
b. Second frame support part
158. Offering board
201. Portable automatic panel cutter
202. Power cutter holder
203. Automated displacement means
204. Holder rotation axis
205. Power cutter
206. Cutter tool
207. Electrical cutter motor
208. Drive train
209. Power cutter housing
210. Adaptor
211. Controller
212. Support area
213. Panel
214. X-direction drive means
215. Y-direction drive means
216. Z-direction drive means
217. Rotation means
218. Electric motor
219. Drive shaft
220. Circular cutting blade
221. Shield
222. Extraction device
223. Track
224. Supporting rods
225. Alignment tool
226. Cutter tool fixator
227. Fixation means
228. Power socket
229. Support handle
230. Power plug
231. Connection means
232. Gearbox
233. Feet
234. Feet contact surface
235. Underlying ground
236. Contact plane
237. Panel cutter parts
238. Power button
239. Adjustment means
240. Nut
241(a) Screws 241(*b*) Bolts
242. Threaded hole
243. Traverse beam
244. Upper frame part
245. Lower frame part
246. Support bracket
247. Alignment mark
$\alpha$. Angle between support area and contact plane
X. First direction
Y. Second direction
Z. Third direction
$\varphi$. Angle of rotation
$\theta$. Angle of inclination of the panel cutter from vertical
The invention claimed is:

1. A portable automated panel cutter comprising:
a plurality of frame profiles releasably connected to form a support frame defining an inner support area, wherein at least a first frame profile of the plurality of frame profiles comprises a first carriage transmission part,
a carriage comprising a second carriage motor, a tool holder carriage movably mounted to a first tool holder transmission part and a second carriage transmission part,
   wherein the second carriage motor facilitates control of movement of the tool holder carriage in a second direction Y relative to the inner support area by control of the first tool holder transmission part, and
   wherein the carriage is releasably mounted to the first frame profile via a releasable connection between the second carriage transmission part and the first carriage transmission part,
a first carriage motor facilitating control of movement of the carriage in a first direction X relative to the inner support area by control of the first carriage transmission part,
a tool holder comprising at least a part of a second tool drive, the tool holder being releasably mounted to the tool holder carriage,
a power cutter releasably mounted to the tool holder at least partly via the part of the second tool drive, the power cutter comprising a circular saw blade,
a first tool displacer facilitating control of movement of the power cutter in a third direction Z relative to the inner support area by control of at least one first tool drive,
a second tool displacer facilitating control of movement of the power cutter in an angle $\varphi$ around the third direction Z by control of the second tool drive,
a controller configured for receiving input data and based hereon configured for controlling the first and second carriage motors and the first and second tool displacers and thereby a position (X, Y, Z) and orientation q of the power cutter relative to the inner support area, a board support, and
at least two of the plurality of frame profiles include a board support fixation, wherein the board support is releasably mounted on the board support fixation.

2. The portable automated panel cutter according to claim 1,
   wherein the portable automated panel cutter is an upright panel cutter positioned in an angle $\theta$ from a vertical position, and
   wherein the angle $\theta$ is below 90 degrees measured from a vertical plane.

3. The portable automated panel cutter according to claim 1, wherein the inner support area is at least partly covered by the board support.

4. The portable automated panel cutter according to claim 1, wherein the plurality of frame profiles comprises a third frame profile and a fourth frame profile, and wherein the third and fourth frame profiles are identical and define opposite sides in the second direction Y of the support frame.

5. The portable automated panel cutter according to claim 1, wherein at least two opposite frame profiles of the plurality of frame profiles comprise the board support fixation, supporting the board support that is at least partly covering the inner support area.

6. The portable automated panel cutter according to claim 1, wherein the tool holder carriage comprises carriage fastening points to which tool holder fastening points can engage thereby connecting the tool holder to the tool holder carriage.

7. The portable automated panel cutter according to claim 1, wherein the portable automated panel cutter is collapsible.

8. The portable automated panel cutter according to claim 1, wherein the board support rests on one or more board support fixations.

9. The portable automated panel cutter according to claim 1, wherein the board support is a sacrificial board.

10. The portable automated panel cutter according to claim 1, wherein the board support is a sacrificial slat.

11. The portable automated panel cutter according to claim 1, wherein a board guide is fixed to the portable automated panel cutter.

12. The portable automated panel cutter according to claim 1, wherein two board guides are fixed to the portable automated panel cutter in a mutually perpendicular orientation.

13. The portable automated panel cutter according to claim 1, wherein the support frame of the portable automated panel cutter is inclined in an angle $\theta$ between 45 and 85 degrees from a vertical direction when the portable automated panel cutter assembled.

\* \* \* \* \*